US012103841B1

(12) United States Patent
DeRaedt et al.

(10) Patent No.: US 12,103,841 B1
(45) Date of Patent: Oct. 1, 2024

(54) CONNECTOR ASSEMBLY

(71) Applicant: Bar Evolution LLC, Henderson, NV (US)

(72) Inventors: Peter DeRaedt, Henderson, NV (US); Bernd Witzany, Munich (DE); Felix Ballendat, Munich (DE)

(73) Assignee: Bar Evolution LLC, Henderson, NV (US)

( * ) Notice: Subject to any disclaimer, the term of this patent is extended or adjusted under 35 U.S.C. 154(b) by 35 days.

(21) Appl. No.: 18/179,567

(22) Filed: Mar. 7, 2023

Related U.S. Application Data

(60) Provisional application No. 63/322,526, filed on Mar. 22, 2022.

(51) Int. Cl.
*B67D 1/08* (2006.01)

(52) U.S. Cl.
CPC ......... *B67D 1/0829* (2013.01); *B67D 1/0801* (2013.01); *B67D 2001/0812* (2013.01)

(58) Field of Classification Search
CPC ............................ B67D 1/0829; B67D 1/0801
See application file for complete search history.

(56) References Cited

U.S. PATENT DOCUMENTS 2,864,534 A 12/1958 Wrenn
3,759,422 A 9/1973 Matheney
3,904,079 A 9/1975 Kross
4,496,081 A 1/1985 Farrey
4,687,120 A 8/1987 McMillin
4,898,303 A 2/1990 Large et al.
4,913,316 A 4/1990 Richter
5,344,051 A 9/1994 Brown
5,750,216 A 5/1998 Horino et al.
6,202,878 B1 3/2001 Cook
7,197,377 B2 3/2007 Knepler
7,918,368 B2 4/2011 Crisp et al.
8,340,815 B2 12/2012 Peters et al.
8,442,674 B2 5/2013 Tilton et al.
8,515,574 B2 8/2013 Studor et al.
8,565,916 B2 10/2013 Zhang et al.
(Continued)

FOREIGN PATENT DOCUMENTS

EP 1295844 A1 3/2003

OTHER PUBLICATIONS

Webpage: http://www.bevmo.com/fireball-whisky-firebox-2-1-75-2-pk-1-751tr-.html; downloaded from internet on Oct. 4, 2016; 2 pages.

*Primary Examiner* — Kevin R Barss
(74) *Attorney, Agent, or Firm* — Endurance Law Group PLC; James R. Yee

(57) ABSTRACT

A connector assembly controllably couples a box having a plurality of containers containing a liquid, is provided. Each container has a fitment. The connector assembly includes a housing, a valve assembly, actuator and a locking plate. The valve assembly includes a plurality of fitment receptacles. The actuator is rotatably coupled to the housing and is movable between an open position, a closed position and an engaged position. The locking plate assembly includes a plurality of opening corresponding to each fitment. The opening has a first diameter when the actuator is in the open position. The first diameter of the opening is configured to allow entry of the fitments into the opening. Movement of the actuator from the open position to the closed position closes the opening to a second diameter.

36 Claims, 44 Drawing Sheets

(56) References Cited

U.S. PATENT DOCUMENTS

| | | | |
|---|---|---|---|
| 8,676,376 | B2 | 3/2014 | Quartarone et al. |
| 8,739,840 | B2 | 6/2014 | Mattos et al. |
| 8,894,599 | B2 | 11/2014 | Kataria |
| 8,952,784 | B2 | 2/2015 | Katerberg et al. |
| 9,056,759 | B2 | 6/2015 | Hourmand et al. |
| D781,632 | S | 3/2017 | Kaytas et al. |
| 11,053,113 | B2 | 7/2021 | Tomforde et al. |
| 2008/0314927 | A1 | 12/2008 | Martin |
| 2009/0069932 | A1 | 3/2009 | Rudick |
| 2009/0277516 | A1 | 11/2009 | Winkler et al. |
| 2012/0035761 | A1 | 2/2012 | Tilton et al. |
| 2014/0107835 | A1 | 4/2014 | Biasi et al. |
| 2014/0109526 | A1 | 4/2014 | Taylor et al. |
| 2019/0071298 | A1 | 3/2019 | Tomforde et al. |

FIG. 9A
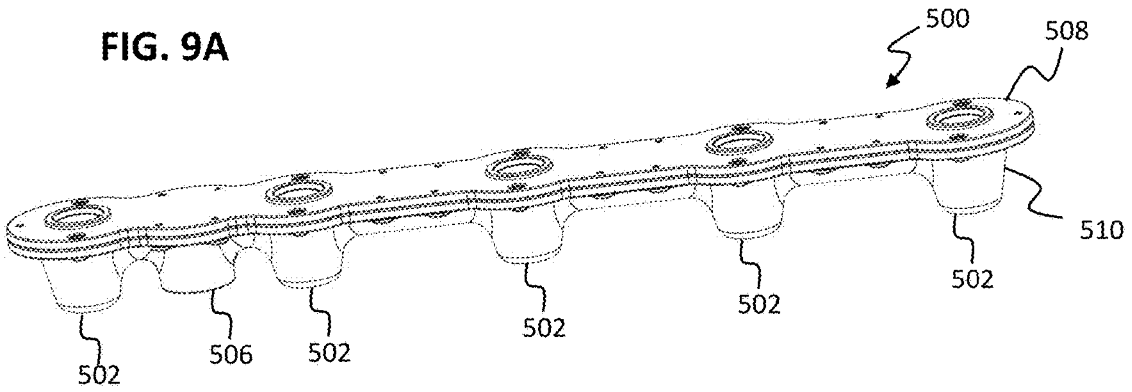
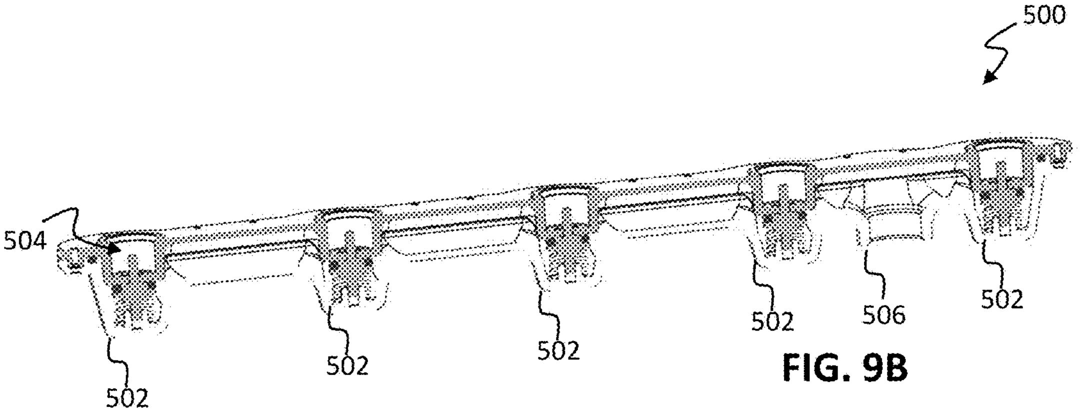
FIG. 9B
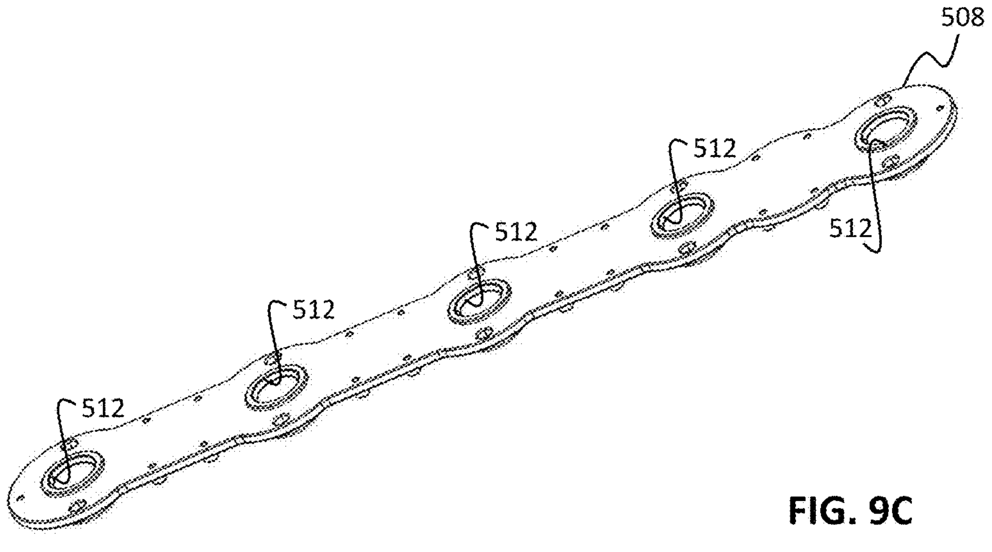
FIG. 9C

CONNECTOR ASSEMBLY

CROSS REFERENCE TO RELATED APPLICATIONS

This application claims priority to Provisional Patent Application U.S. 63/322,526 filed on Mar. 22, 2022, the entire disclosure of which is hereby incorporated by reference and relied upon.

BACKGROUND OF THE INVENTION

Field of the Invention

The present disclosure relates generally to beverage dispensing solutions, and more specifically, to a connector assembly for use in a system for dispensing alcoholic beverages.

Background of the Invention

Regulations vary from country to country on how distilled spirits can be distributed, not only the volume but also packaging, labeling, filling, etc. In the United States, the Department of Treasury Alcohol & Tobacco Tax & Trade Bureau (TTB) regulates the bottle sizes for distilled spirits. Further, the Internal Revenue Code of 1986 authorizes regulations on the kind and size of containers for distilled spirits. According to the TTB, the purpose of the regulations establishing uniform standards of fill for alcoholic beverages is "to prevent a proliferation of bottle sizes and shapes which would inevitably result in consumer confusion and deception with regard to the quantity and net contents of the alcohol beverage package." In addition, the "uniformity in bottle sizes required by these standards also facilitates the proper calculation of Federal excise tax." A key issue related to these concepts is the potential loss of water and the resulting increase in alcohol concentration or "proof" which may be affected by the packaging.

The maximum volume of packaging of spirits may be limited in some jurisdictions. For example, in the United States, the maximum volume of packaging in which spirits can be shipped or distributed is currently 1.8 liters. This limitation has a significant impact for places where spirits are distributed or consumed in large quantities such as clubs, large events, bars, conferences, etc.

The current way to address this regulatory restriction is to create pump rooms filled with racks in which bottles are turned upside down and collectors channel the liquid through tubes to pumps and ultimately, to the dispensing device(s). This multiplies the capacity of a specific distilled spirit by the number of bottles used. However, this method requires significant real estate to support the bars in the property. It further has an impact on labor, space, weight, time and also the disposal process that generates a lot of waste. As a result, this solution creates significant inefficiencies.

The present disclosure is aimed at solving one or more of the problems identified above.

BRIEF SUMMARY OF THE INVENTION

In a first aspect of the present invention, a connector assembly for controllably coupling a container containing a liquid is provided. The container has a fitment. The fitment has a channel and is configured to releasably connect the container to the connector assembly. The assembly includes a housing, a valve assembly, an actuator and a locking plate assembly. The housing has a recess for receiving the container. The valve assembly includes a fitment receptacle and has a liquid flow channel and an outlet. The liquid flow channel couples the fitment receptacle to the outlet. The actuator is coupled to the housing and is movable between an open position, a closed position and an engaged position. The locking plate assembly is coupled to the actuator and forms an opening corresponding to the fitment. The opening has a first diameter when the actuator is in the open position. The first diameter of the opening is configured to allow entry of the fitment into the opening. Movement of the actuator from the open position to the closed position closes the opening to a second diameter. The second diameter is smaller than the first diameter and smaller than a diameter of the fitment.

In a second aspect of the present invention, a connector assembly for controllably coupling a plurality of containers containing a liquid, is provided. Each container has a fitment. Each fitment has a channel and is configured to releasably connect a respective container to the connector assembly. The containers are housed in a box with the fitments being arranged in predetermined relative locations. The connector assembly includes a housing, a valve assembly, actuator and a locking plate. The housing has a lower portion and an upper portion. The upper portion extends from the lower portion. The lower portion and the upper portion form a recess for receiving the box. The valve assembly includes a plurality of fitment receptacles. Each fitment receptacle is associated with a respective fitment. The plurality of fitment receptacles are arranged in a pattern coinciding with the predetermined relative locations of the fitments. The valve assembly has a liquid flow channel and an outlet. The liquid flow channel couples the fitment receptacles to the outlet. The actuator is rotatably coupled to the housing and is movable between an open position, a closed position and an engaged position. The locking plate assembly has a first locking plate and a second locking plate. The first and second locking plates are coupled to the actuator and form an opening corresponding to each fitment. The opening has a first diameter when the actuator is in the open position. The first diameter of the opening is configured to allow entry of the fitments into the opening. Movement of the actuator from the open position to the closed position closes the opening to a second diameter. The second diameter is smaller than the first diameter and is smaller than a diameter of the fitments.

In a third aspect of the present invention, a connector assembly for controllably coupling a plurality of containers containing a liquid is provided. Each container has a fitment. Each fitment has a channel and is configured to releasably connect a respective container to the connector assembly. The containers are housed in a box with the fitments being arranged in predetermined relative locations. The connector assembly includes a housing, a guide plate, a valve assembly, an actuator, a locking plate assembly and a scale. The housing has a lower portion and an upper portion. The upper portion extends from the lower portion. The lower portion and the upper portion form a recess for receiving the box. The guide plate is configured to bear the weight associated with the containers and is inclined downward towards a back end of the housing. The valve assembly includes a plurality of fitment receptacles. Each fitment receptacle is associated with a respective fitment. The plurality of fitment receptacles are arranged in a pattern coinciding with the predetermined relative locations of the fitments. The valve assembly has a liquid flow channel and an outlet. The liquid flow channel couples the fitment receptacles to the outlet. The actuator is rotatably coupled to the housing and is movable between an open position, a closed position and an engaged position. The locking plate assembly has a first locking plate and a second locking plate. The first and second locking plates are coupled to the actuator and form an opening corresponding to each fitment. The opening has a first diameter when the actuator is in the open position. The first diameter of the opening is configured to allow entry of the fitments into the opening. Movement of the actuator from the open position to the closed position closes the opening to a second diameter. The second diameter is smaller than the first diameter. The second diameter is smaller than a diameter of the fitments. The locking plate assembly is configured to move towards the housing in response to the actuator being moved from the locked position to the engaged position. The scale is coupled to the back frame and is configured to detect a weight associated with the containers within the box. The scale is also configured to responsively provide a visual indication of the detected weight.

BRIEF DESCRIPTION OF THE SEVERAL VIEWS OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified. These and other features and advantages of the present invention will become more readily appreciated when considered in connection with the following detailed description and appended drawings.

FIG. 9A is a view of a valve assembly for use with the MBC assembly of FIG. 5A. according to an embodiment of the present invention.

FIG. 9B is a cut-away view of the valve assembly of FIG. 9A.

FIG. 9C is a perspective view of a top portion of the valve assembly of FIG. 9A.

DETAILED DESCRIPTION OF THE INVENTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

With reference to the drawings and in operation, the present invention relates to a connector (or multi-bag connector) assembly 110 for use with a beverage system 100. As discussed in further detail below, the multi-bag connector assembly 110 is configured to controllably connect a beverage dispensing package or box 104 with the beverage system 100.

Figure 1:
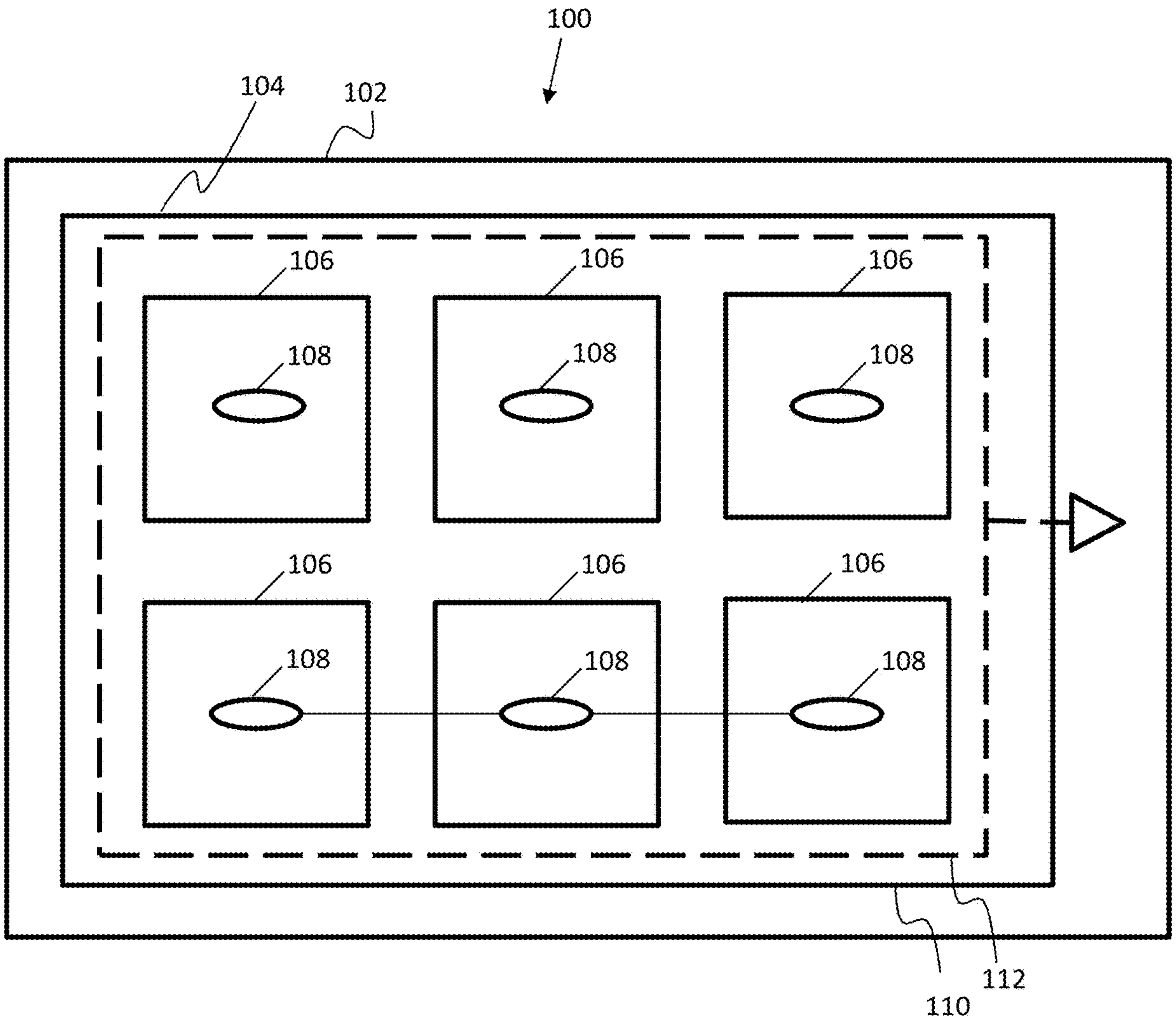
FIG. 1 is a block diagram of a beverage dispensing system that may be used to dispense alcoholic beverages.

With specific reference to FIG. 1, the present disclosure particularly describes exemplary beverage dispensing systems 100 and packages (e.g., boxes) 104 that may be used to dispense liquids or beverages. As used herein, the term beverage" refers to any beverage or liquid with or without alcoholic content that is meant for human consumption. FIG. 1 is a block diagram of an exemplary beverage dispensing system 100 that may be used to dispense liquids, such as alcoholic beverages. In one embodiment, the beverage dispensing system 100 is a bartender station (or is included therein) at a bar. Alternatively, the beverage dispensing system 100 may be used with, or incorporated within, any suitable location such as a kitchen, a bar, a reception area, or may be a portable station that may be used to serve alcoholic beverages in any suitable location.

Each box 104 may include one or more dividers (see below) that form two or more compartments within each box 104. Each compartment is designed to hold an inner container (e.g., a bag) 106 which holds an alcoholic beverage. Each bag 106 includes a fitment 108 that is attached to the bag 106 for dispensing the alcoholic beverage. Each fitment 108 is separated from each other fitment 108 so that the contents of each bag 106 do not mix or flow together until a connector assembly (see below) is attached. An alignment plate, or other suitable structure, may be used to align the fitments of the bags in preparation for attaching to the connector assembly 110.

In some embodiments, a separate alignment plate is utilized. In other embodiments, a separate alignment plate is not utilized. The box 104 may be composed primarily of cardboard with an integral structure that performs the function of the alignment plate. For instance, in one embodiment, the box 104 may include an inner box and an outer box. The inner box has a top surface with apertures for receiving a respective fitment for maintaining the correct spatial relationship there between.

As shown diagrammatically in FIG. 1, a connector assembly (or multi-bag connector or MBC) 110 is configured to receive the box 104. The connector assembly 110 includes a valve assembly 112 adapted to be coupled to the fitments of each bag within the box 104. The valve assembly 112 fluidly couples the bags 106, via each respective fitment 108, in the box 104 to the common outlet 112.

The embodiments described herein comply with the Department of Treasury Alcohol & Tobacco Tax & Trade Bureau (TTB) regulations in that the alcoholic beverages contained in the bags are shipped in a "divorced" state (i.e., the outlets of the bags are not connected together) so that each bag is a self-contained bag that may hold the maximum amount of an alcoholic beverage. The embodiments also enable significant efficiencies to be realized for distributors and end users of the alcoholic beverages. For example, larger quantities of alcoholic beverages may be shipped to a destination and may be efficiently and conveniently prepared for use as compared to prior art systems where individual bottles of alcoholic beverages are shipped. In one example, according to an embodiment described herein, a box may include four bags that each holds up to a maximum allowable volume, e.g., 1.8 liters of an alcoholic beverage. Accordingly, a single box may include 7.2 liters of an alcoholic beverage that is able to be quickly attached to a connector assembly for dispensing at an end user location. Other boxes may be used with other suitable numbers of bags to enable distributors to have a wide variety of options in the amount of alcoholic beverages to include within a box. For example, boxes with 6 or 8 bags (or any suitable number) may be used to provide 10.8 liters or 14.4 liters of alcoholic beverages (or any suitable amount) as desired. For example, in one embodiment, the bags may be arranged in two rows, each with a predetermined number of bags, e.g., 2. In other embodiments, each container contains a predetermined number of bags, e.g., 4 in a single row.

In one embodiment, the beverage dispensing system 100 includes a cabinet or housing 102 and a plurality of beverage dispensing packages 104 positioned within housing 102. Beverage dispensing system 100 may be placed in a bar, a kitchen, or in any other suitable location to enable a user to dispense alcoholic beverages from the system 100. For example, a bartender may use beverage dispensing system 100 to dispense alcoholic beverages from each of the beverage dispensing packages 104 during operation.

In one embodiment, each beverage dispensing package 104 is a box or other suitable container that includes a plurality of beverage dispensing bags, for example. Each bag is designed to hold 1.8 liters of alcoholic beverage as specified by the applicable regulations. For clarity of description, beverage dispensing packages 104 may be referred to herein as boxes 104, although it should be recognized that beverage dispensing packages 104 may be any suitable container other than a box. Similarly, for clarity of description, boxes 104 are described as including a plurality of beverage dispensing bags (or "bags") 106. However, it should be recognized that any suitable internal containers may be used instead of bags.

Figure 2A:
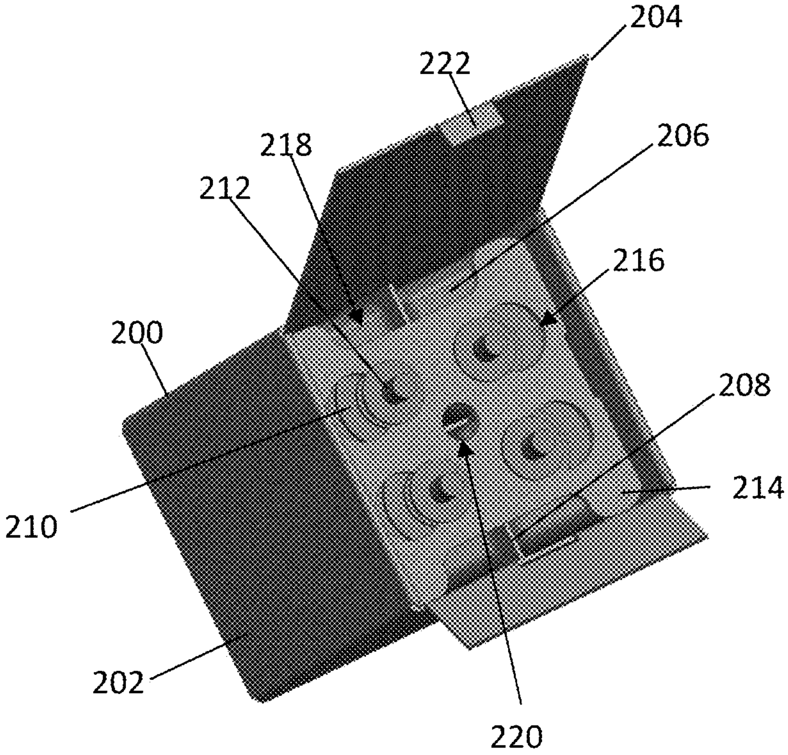
FIG. 2A is a perspective view of an exemplary beverage dispensing package that may be used with the beverage dispensing system shown in FIG. 1.

FIG. 2A is a perspective view of an exemplary beverage dispensing package 200, such as a box 200, that may be used with beverage dispensing system 100 (shown in FIG. 1). While the package 200 is described herein as a box, it should be recognized that any suitable package or container may be used.

In an exemplary embodiment, the box 200 is a cardboard box that includes sides 202 and a top cover 204. The top cover 204 is removable to expose or to cover a plurality of compartments (not shown in FIG. 2) that include a plurality of inner containers, such as beverage dispensing bags 206. The compartments are formed by one or more dividers 208 positioned within box 200.

In an exemplary embodiment, two dividers 208 are positioned within box 200 to form four substantially equally sized and shaped compartments. More specifically, in the exemplary embodiment, each compartment has a square-shaped cross-section that houses a respective bag 206 that also has a substantially square-shaped cross-section. Alternatively, any suitable number and shape of compartments and bags 206 may be used with box 200. In addition to creating compartments within box 200, dividers 208 provide stability and support to box 200.

Each bag 206 includes an outlet (not shown in FIG. 2) that enables liquid (e.g., an alcoholic beverage) to be dispensed from bag 206. A container fitment 210 or another suitable connector is securely fit onto an outlet 224 of each bag 206 to enable the outlet 224 of each bag 206 to be releasably coupled to a connector assembly 110. Accordingly, in the exemplary embodiment, each outlet 224 is initially separated from each other outlet 224 until the connector assembly 110 is attached to the fitments 210. In this manner, the outlets 224 of each bag 206 may be transported in a "divorced" manner (i.e., not in fluid communication with each other) to satisfy applicable governmental regulations and may then be connected together by a connector assembly 110 at the final destination to provide one common fluid dispensing line that dispenses the contents of each bag 206 through the common dispensing line.

In one embodiment, each fitment 210 may include a removable cap 212 that prevents the contents of each bag 206 from spilling or leaking out during transport. Caps 212 also may be included for health reasons, for example, to prevent contamination of fitments 210. In a more specific embodiment, each cap 212 may be glued or otherwise attached to top cover 204 of box 200 during shipping so that when a user opens top cover 204, each cap 212 will be automatically removed to expose the fitments of each bag 206. Alternatively, the caps 212 may be connected together by a string or another suitable connection to enable a user to quickly remove all caps 212 at the same time or in quick succession. In one embodiment, caps 212 may be used to visibly determine whether bags 206 or fitments 210 have been tampered with or opened. For example, caps 212 may have a detachable ring or another suitable portion that may detach from caps 212 when caps 212 are first removed. Accordingly, a user may determine that caps 212 have been removed or fitments 210 have otherwise been tampered with by determining whether the ring (or other portion) of caps 212 is no longer attached. Alternatively, a seal (not shown) that is removable, penetrable, or may be broken, to facilitate or allow alcohol to flow, may be used. Other suitable indicators may be used to determine whether caps 212 have been removed or tampered with in other embodiments.

In one embodiment, an alignment plate 214 (see FIGS. 2A and 2B) is coupled to a top portion of box 200 and is secured to box 200 by two or more latches (not shown) on opposing sides of alignment plate 214. Alignment plate 214 includes a plurality of fitment openings 216 to enable the outlets of each bag 206 to extend through alignment plate 214. Alignment plate 214 also includes two or more grip openings 218 to enable a user to grasp a portion of alignment plate 214 when attaching a connector assembly to alignment plate 214 and bags 206. Alignment plate 214 also includes a locking member opening 220 for receiving a locking member to removably attach alignment plate 214 to the connector assembly.

In one embodiment, the alignment plate 214 is transparent to enable a user to view bags 206 underneath alignment plate 214. In a further embodiment, the bags 206 are transparent to enable a user to view the contents of bag 206 and/or a fill level of bags 206.

In one embodiment, the top cover 204 is foldable or otherwise movable to either cover, or expose the top portion of box 200. For example, top cover 204 may be folded down into a closed position for shipping or transport. Additionally, or alternatively, the top cover 204 may be removable by a user to expose the top portion of box 200. For example, the top cover 204 may be removably attached to the box 200 by a perforated or pre-scored hinge that a user may tear off to remove top cover 204. In the closed position, the top cover 204 hides the alignment plate 214 and fitments 210 from view and protects the alignment plate 214 and the fitments 210 during transport. The top cover 204 may be latched in the secured position by a tab or latch 222. The top cover 204 may also be removed or folded up into an open position when a user wants to access fitments 210 or alignment plate 214, for example, in preparation for dispensing the contents of bags 206.

With specific reference to FIG. 1A, in an exemplary embodiment, the alignment plate 214 includes a plurality of fitment openings 216 and a locking member opening 220. In one embodiment, the fitment openings 216 are key-hole shaped to enable fitments 210 of each bag 206 to be easily inserted (through the larger portion of each opening 216) and to enable fitments 210 to be secured in a final attachment position (the smaller portion of each opening 216) to facilitate coupling fitments 210 to the connector assembly. Alternatively, fitment openings 216 may have any suitable shape.

The locking member opening 220 may be shaped to receive a portion of a locking member of the connector assembly 110. In one embodiment, the locking member opening 220 is circular. Alternatively, the locking member opening 220 may be any suitable shape.

Figure 2B:
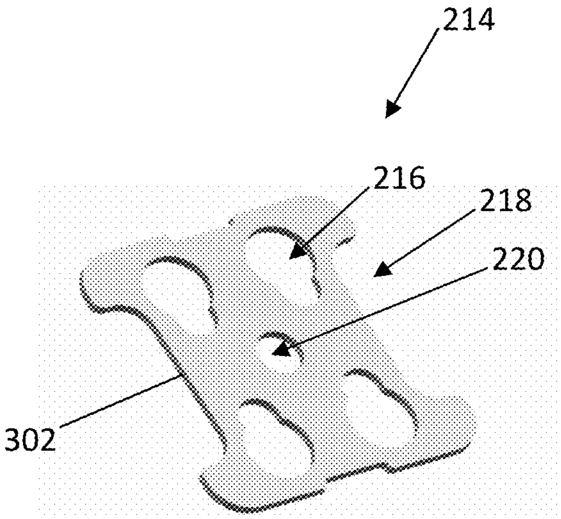
FIG. 2B is a perspective view of an exemplary alignment plate that may be used with the beverage dispensing package shown in FIG. 2.

In the illustrated embodiment, the alignment plate 214 also includes two grip openings 218 defined therein to enable a user to grasp a grip portion 226 of the alignment plate 214. While two grip openings 218 are shown in FIG. 2B, it should be recognized that any suitable number of grip openings 218 may be formed in alignment plate 214.

Figure 2C:
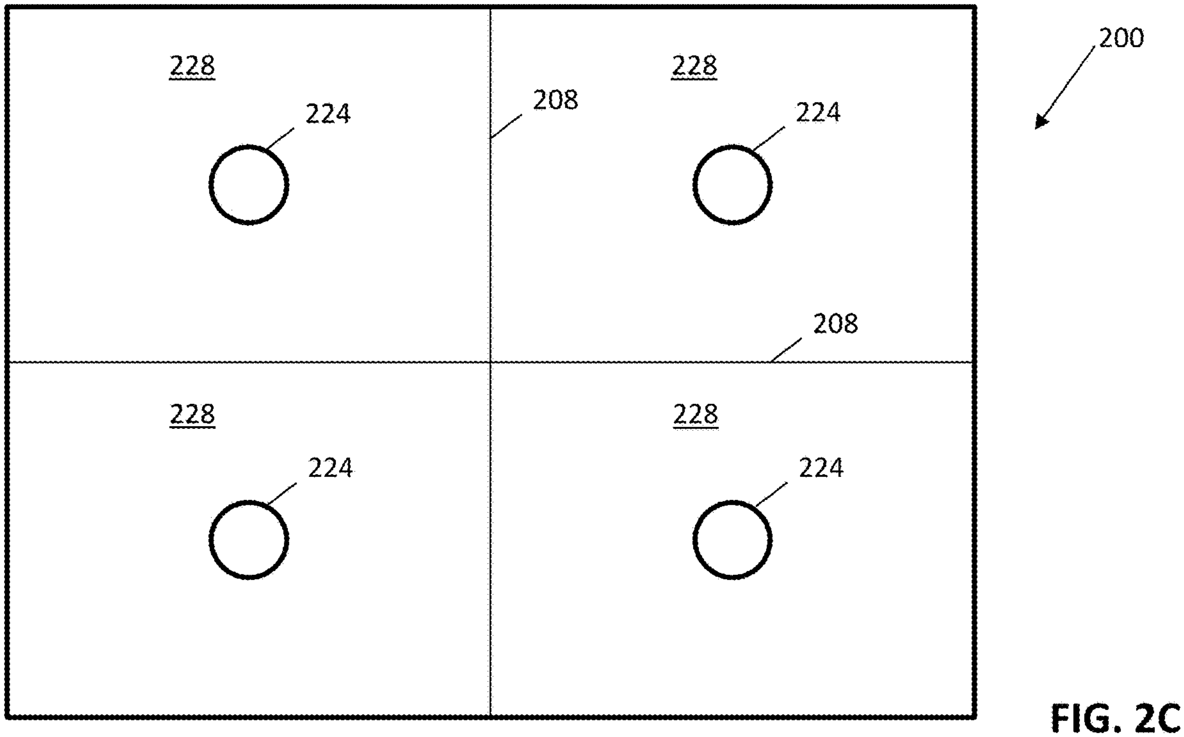
FIG. 2C is a block diagram showing a top view of the beverage dispensing package of FIG. 2 with an alignment plate and fitment caps removed.

FIG. 2C is a block diagram showing a top view of the beverage dispensing package or box 200 with the alignment plate 214 and the caps 212 removed. As illustrated in FIG. 2C, the box 200 may include a plurality of dividers 208 that form a plurality of compartments 228 within the box 200. While two dividers 208 are shown as forming four compartments 228, it should be recognized that any suitable number of dividers 208 and compartments 228 may be included within each box 200.

In an exemplary embodiment, a separate bag 206 is positioned within each compartment 228. Each bag 206 includes a respective outlet 224 for dispensing the contents of bag 206 (e.g., alcoholic beverages). Each outlet 224 is separated from each other so that the outlets 224 (and therefore, the contents of each bag 206) are not in fluid communication with each other. This is sometimes referred to as being in a "divorced" state.

As illustrated in FIG. 2C, the box 200, compartments 226, and bags 206 may have a substantially square or rectangular cross-section to enable bags 206 and boxes 200 to be stacked on top of each other during transport or during operation (i.e., during the dispensing of the alcoholic beverages). Alternatively, the boxes 200, compartments 228, and bags 206 may have any suitable shape or cross-section as desired. Further examples of box 200, compartments 228, and bag 206 shapes are illustrated in FIGS. 5 and 6A-6D.

FIGS. 3A-3B illustrate an alternative embodiment of a box 300 having elongated rectangular compartments 302 that may be used with beverage dispensing system 100 (shown in FIG. 1). While six rectangular compartments 302 are illustrated in FIGS. 3A-3B, any suitable number and shape of compartments 302 may be used with the box 300.

Figure 3:
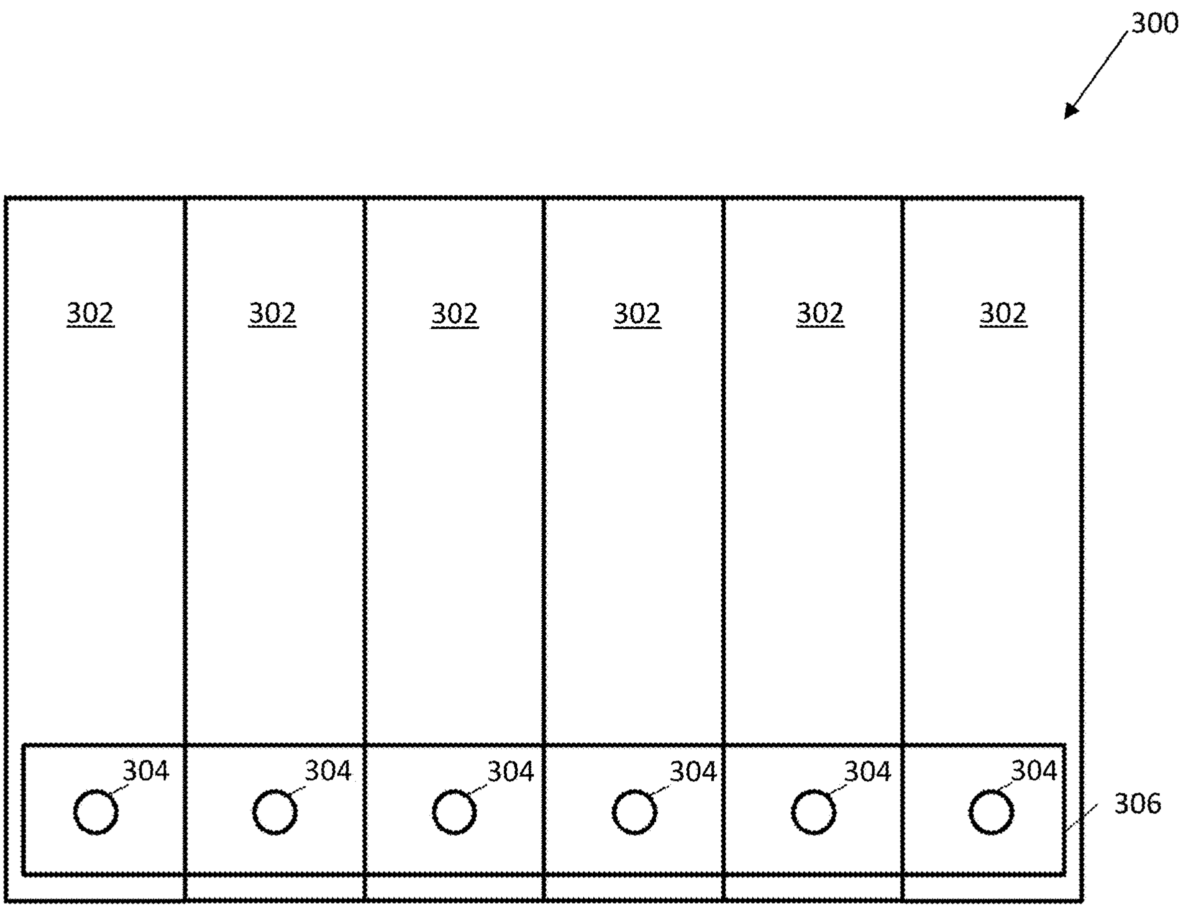
FIG. 3 illustrates an alternative embodiment of a beverage dispensing package having elongated rectangular compartments that may be used with the beverage dispensing system shown in FIG. 1.
Figure 4A:
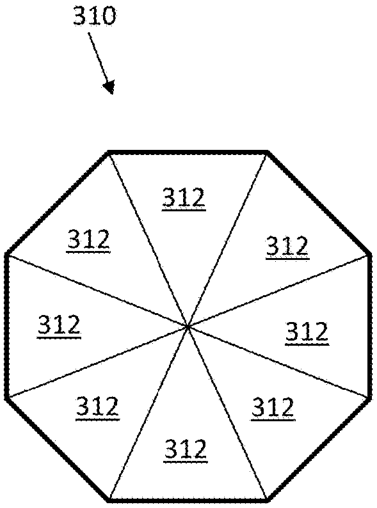
FIGS. 4A-4D illustrate alternative beverage dispensing packages and associated containers that may be used with the beverage dispensing system shown in FIG. 1.
Figure 4B:
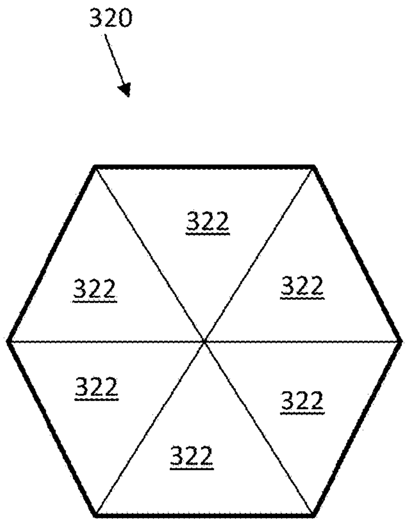
Figure 4C:
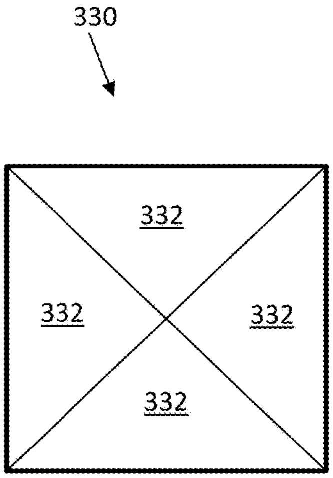
Figure 4D:
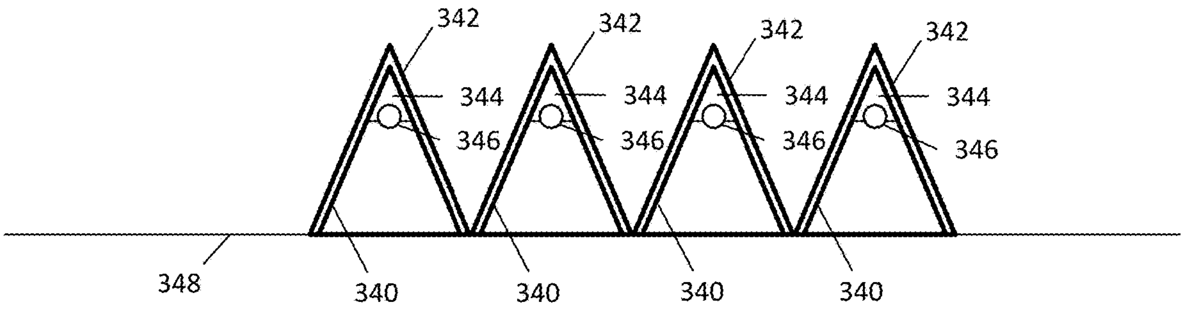

In the embodiment shown in FIG. 3, a bag (not shown) having a rectangular cross-section is placed within each compartment 302, and an outlet 304 of each bag is positioned near a bottom portion of each compartment 302. Alternatively, outlets 304 may be positioned in any suitable location with respect to the bags or compartments 302. A rectangular alignment plate 306 is coupled to the bags and outlets 304 in a similar manner as described above with reference to FIGS. 2A-2C.

Figure 6A:
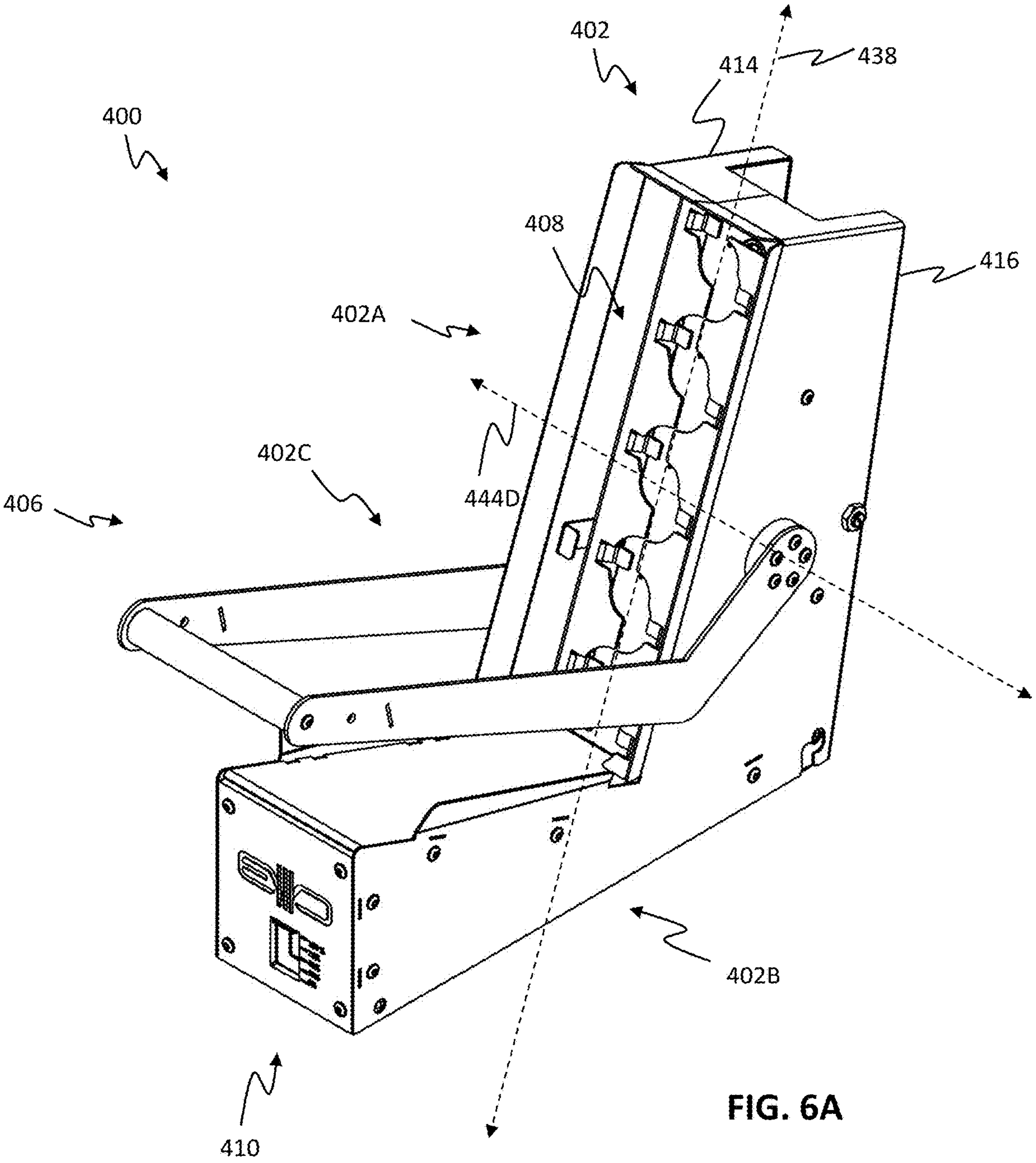
FIG. 6A is a perspective view of the multi-bag connector (MBC) assembly of FIG. 5A in a closed position, according to an embodiment of the present invention, in a closed position.
Figure 6B:
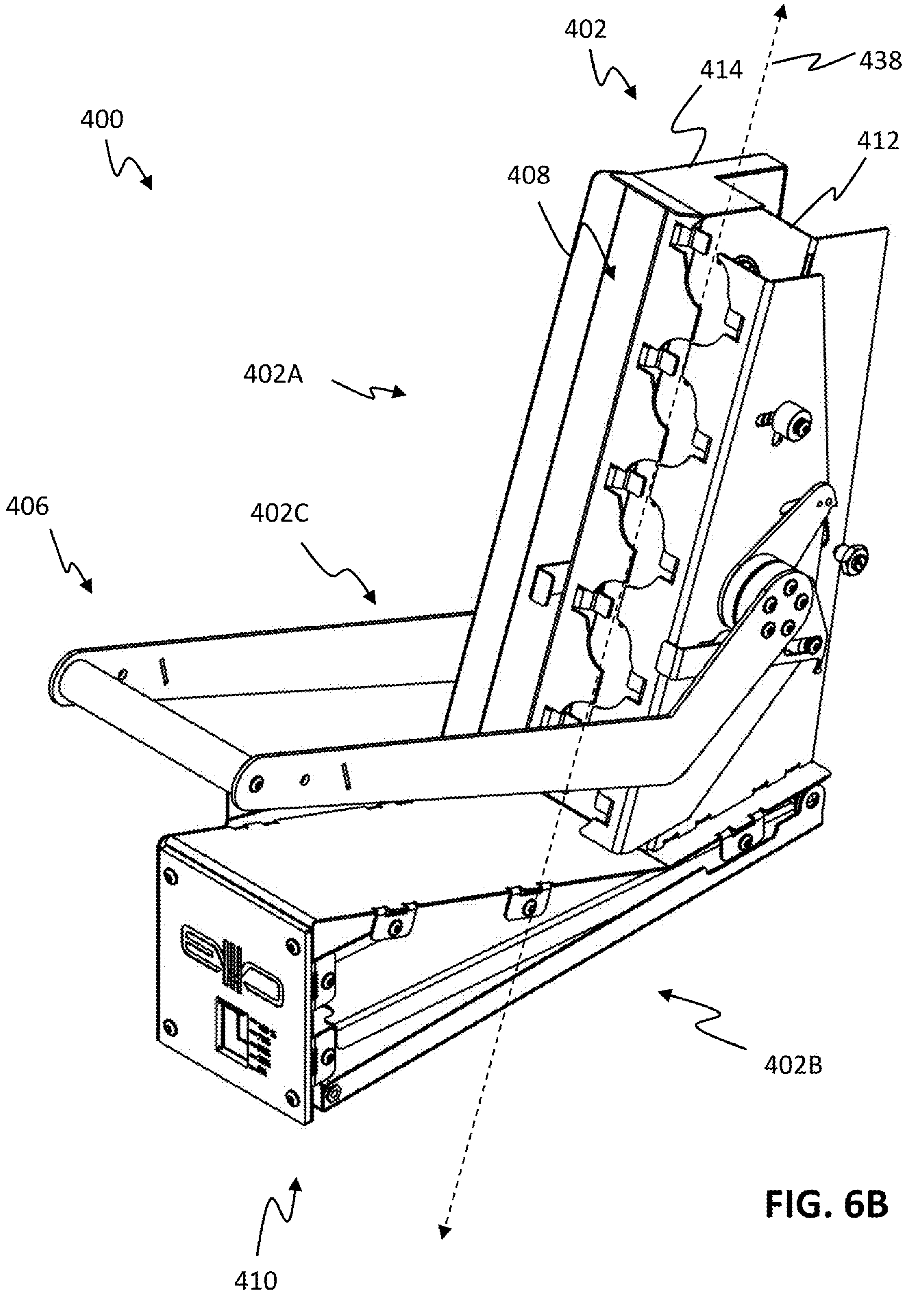
FIG. 6B is a perspective partial view of the multi-bag connector (MBC) assembly of FIG. 5A in the closed position.
Figure 6C:
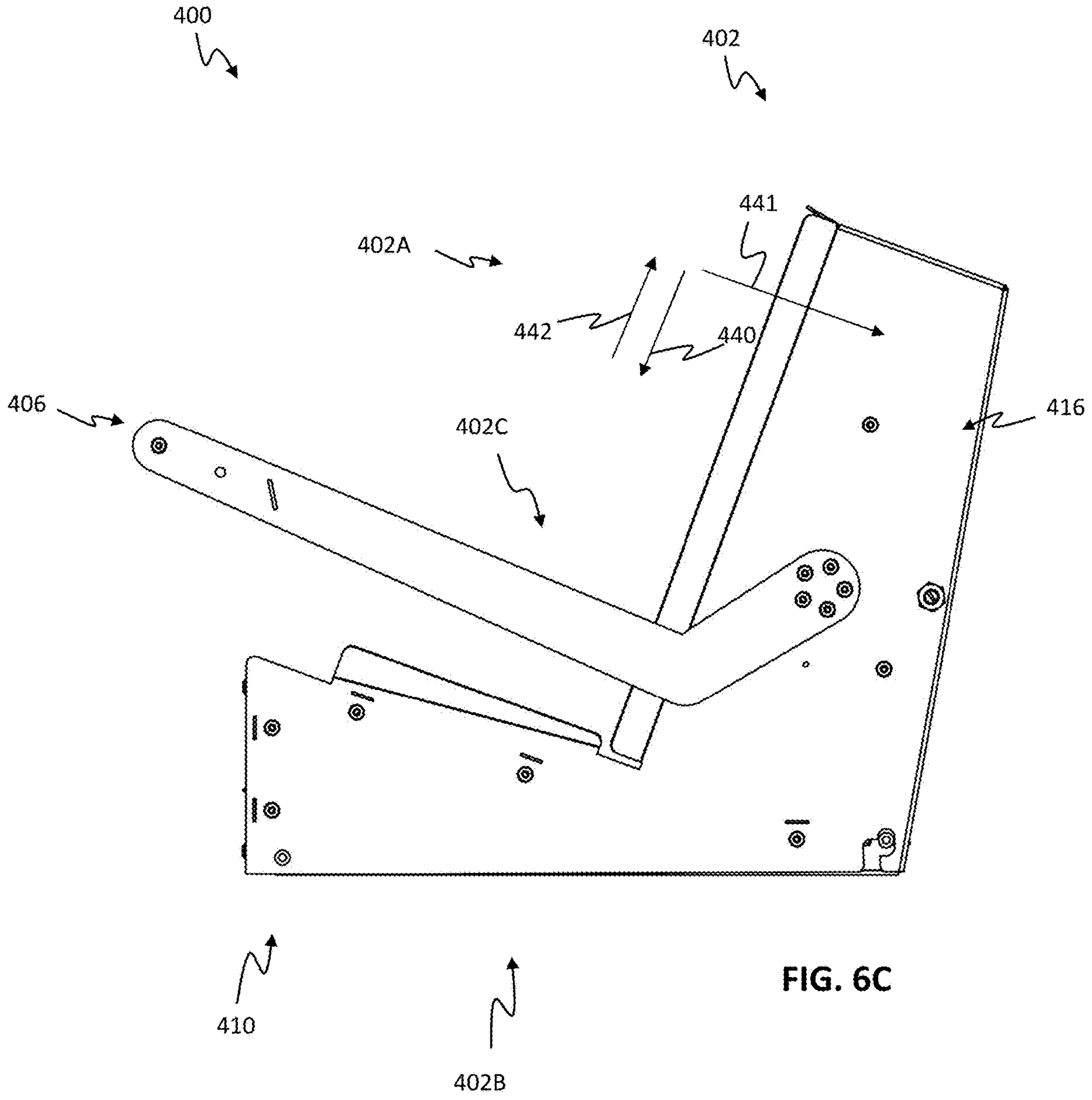
FIG. 6C is a side view of the multi-bag connector (MBC) assembly of FIG. 5A in the closed position.
Figure 6D:
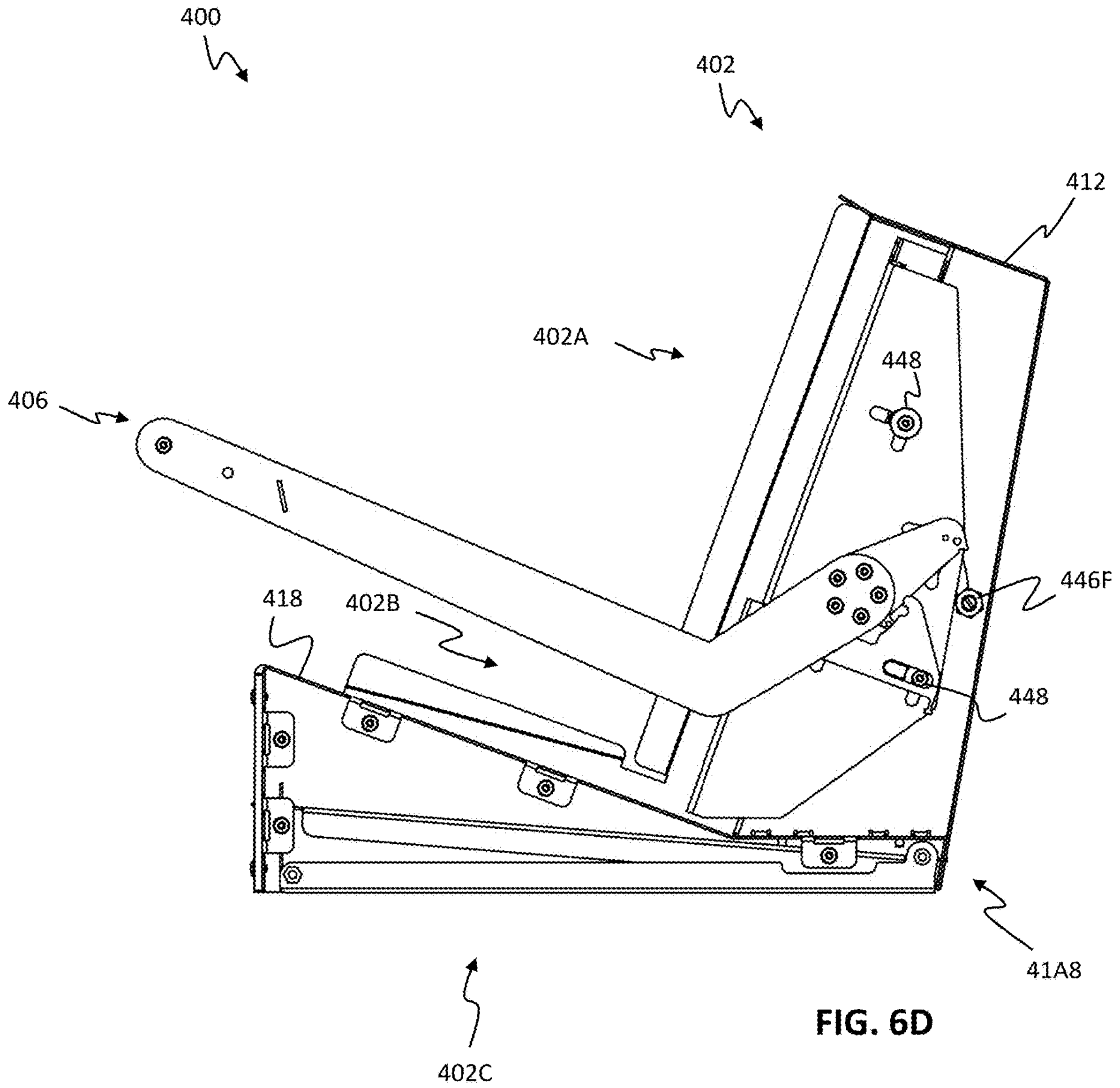
FIG. 6D is a side partial view of the multi-bag connector (MBC) assembly of FIG. 5A in the closed position.
Figure 6E:
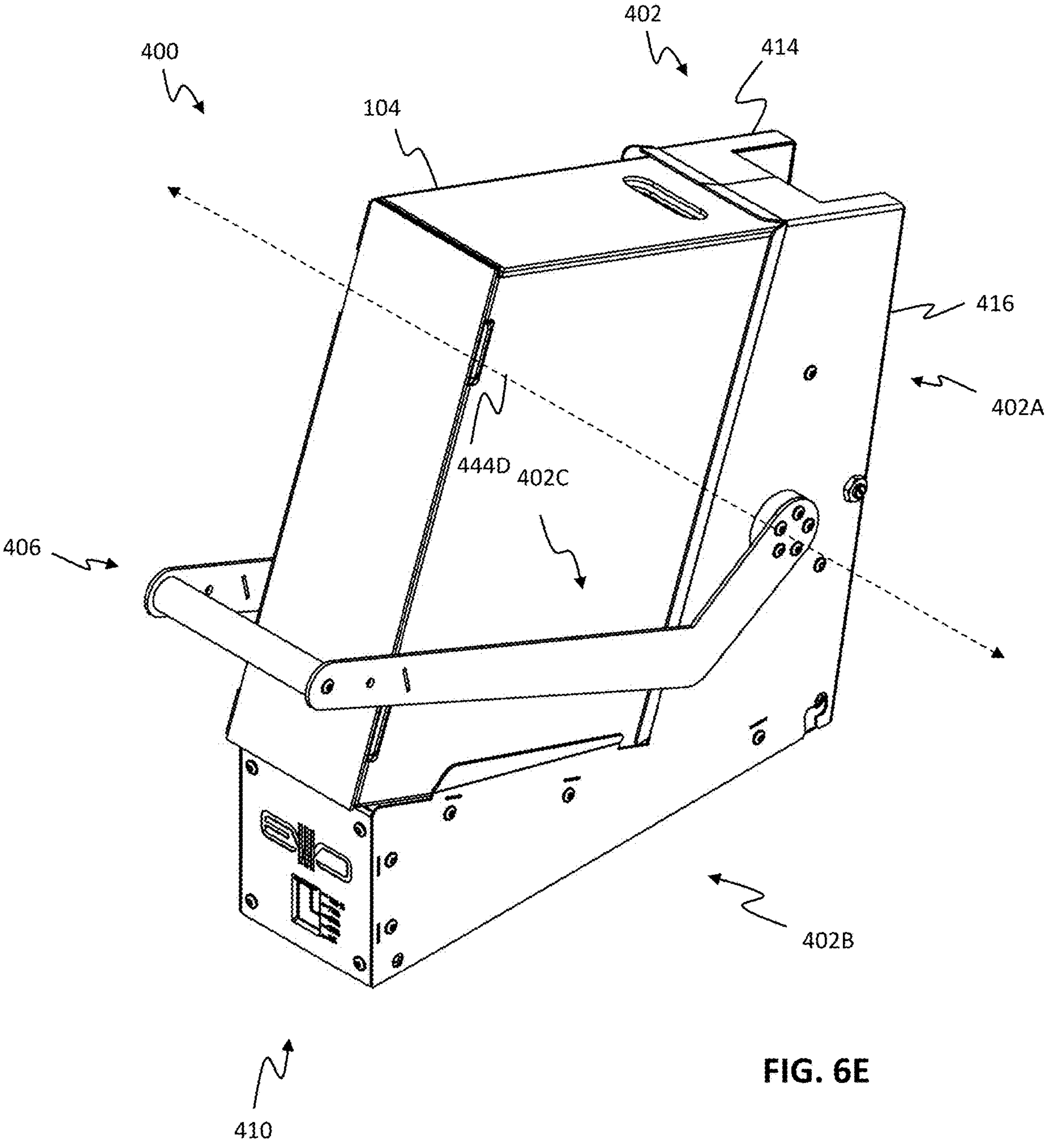
FIG. 6E is a perspective view of the multi-bag connector (MBC) assembly of FIG. 5A in the closed position with a multi-bag package, according to an embodiment of the present invention.
Figure 6F:
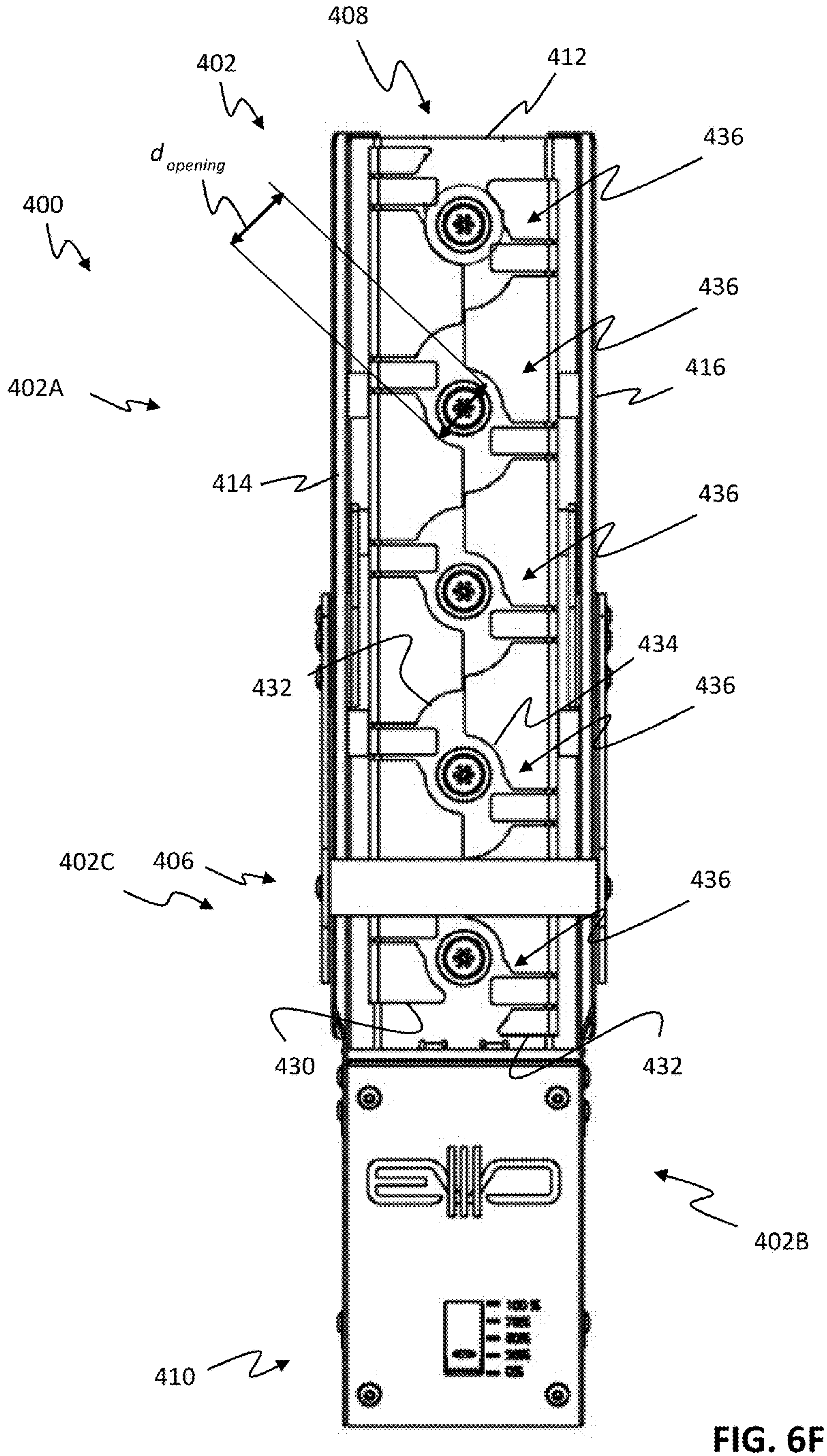
FIG. 6F is a front view of the multi-bag connector (MBC) assembly of FIG. 5A in the closed position.
Figure 6G:
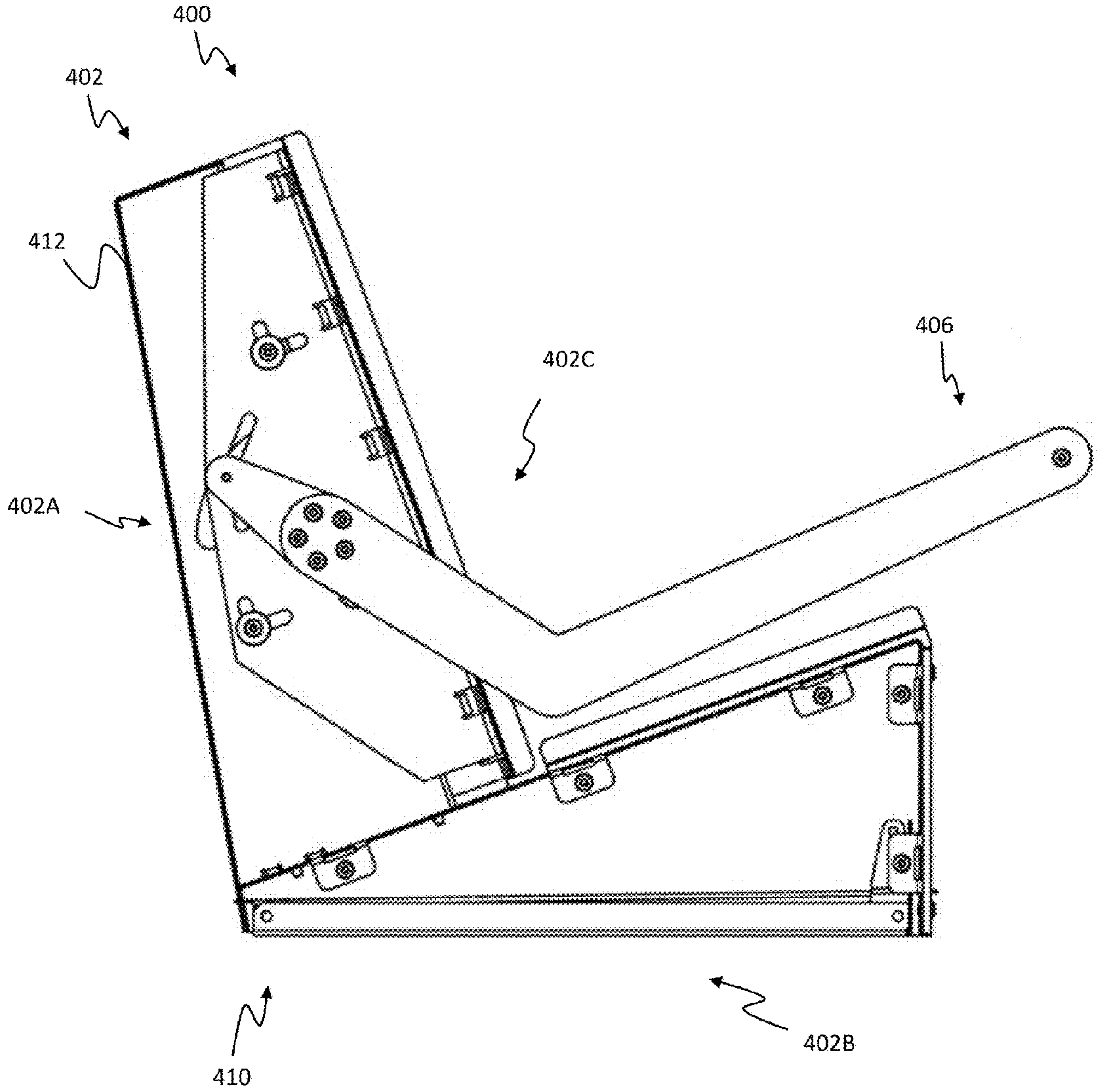
FIG. 6G is a second side partial view of the multi-bag connector (MBC) assembly of FIG. 5A in the closed position.
Figure 7A:
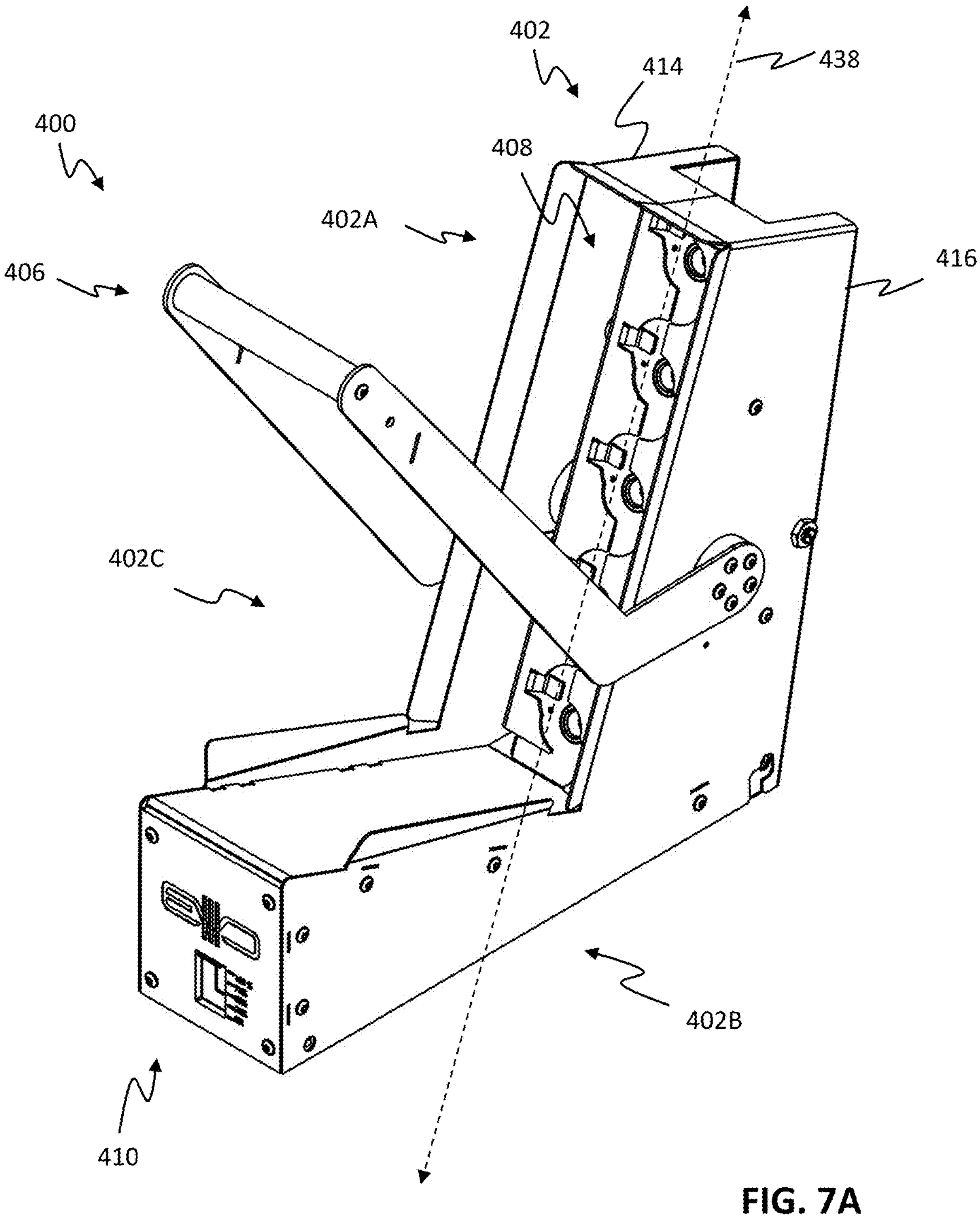
FIG. 7A is a perspective view of the multi-bag connector (MBC) assembly of FIG. 5A in an engaged position, according to an embodiment of the present invention, in a closed position.
Figure 7B:
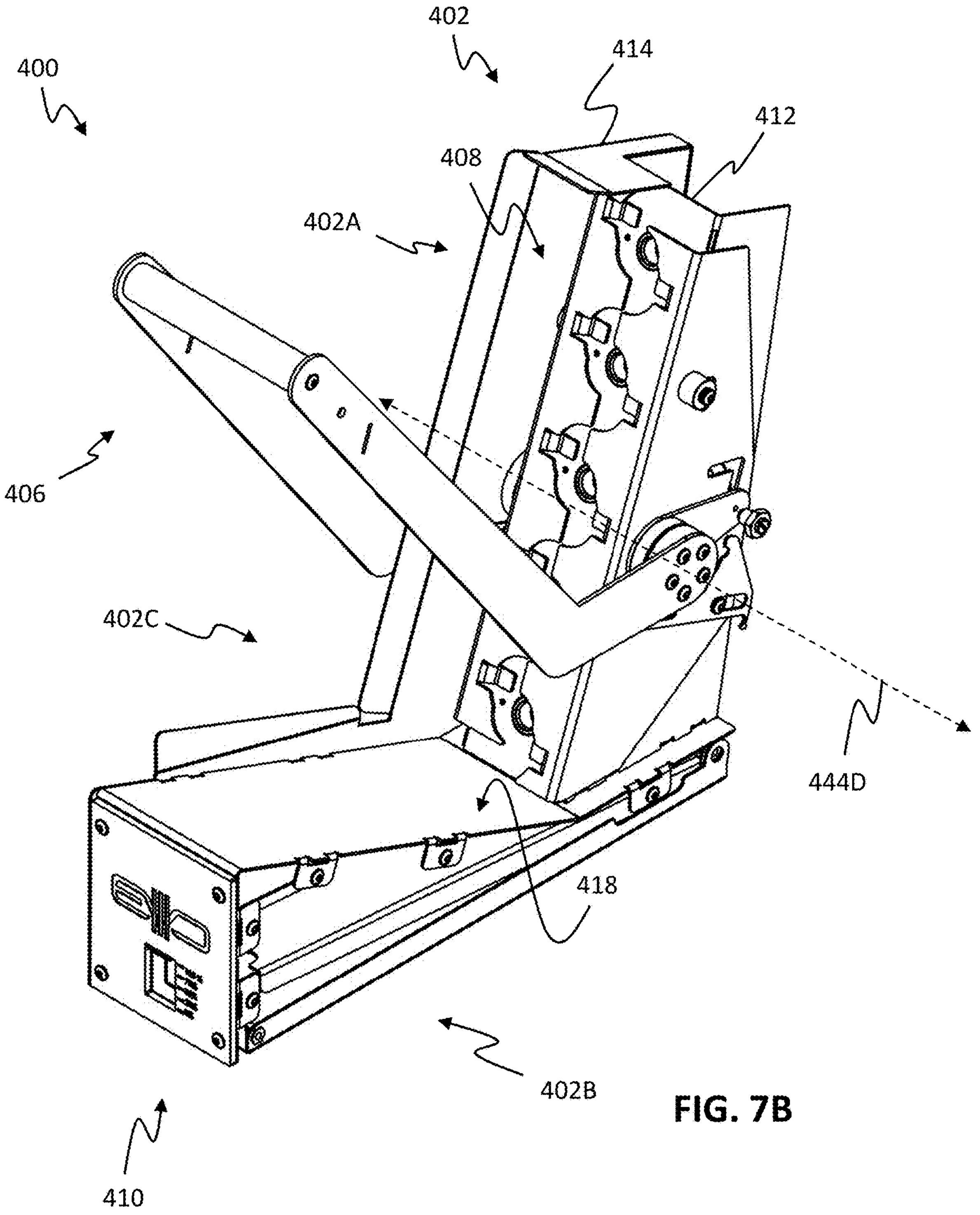
FIG. 7B is a perspective partial view of the multi-bag connector (MBC) assembly of FIG. 5A in the engaged position.
Figure 7C:
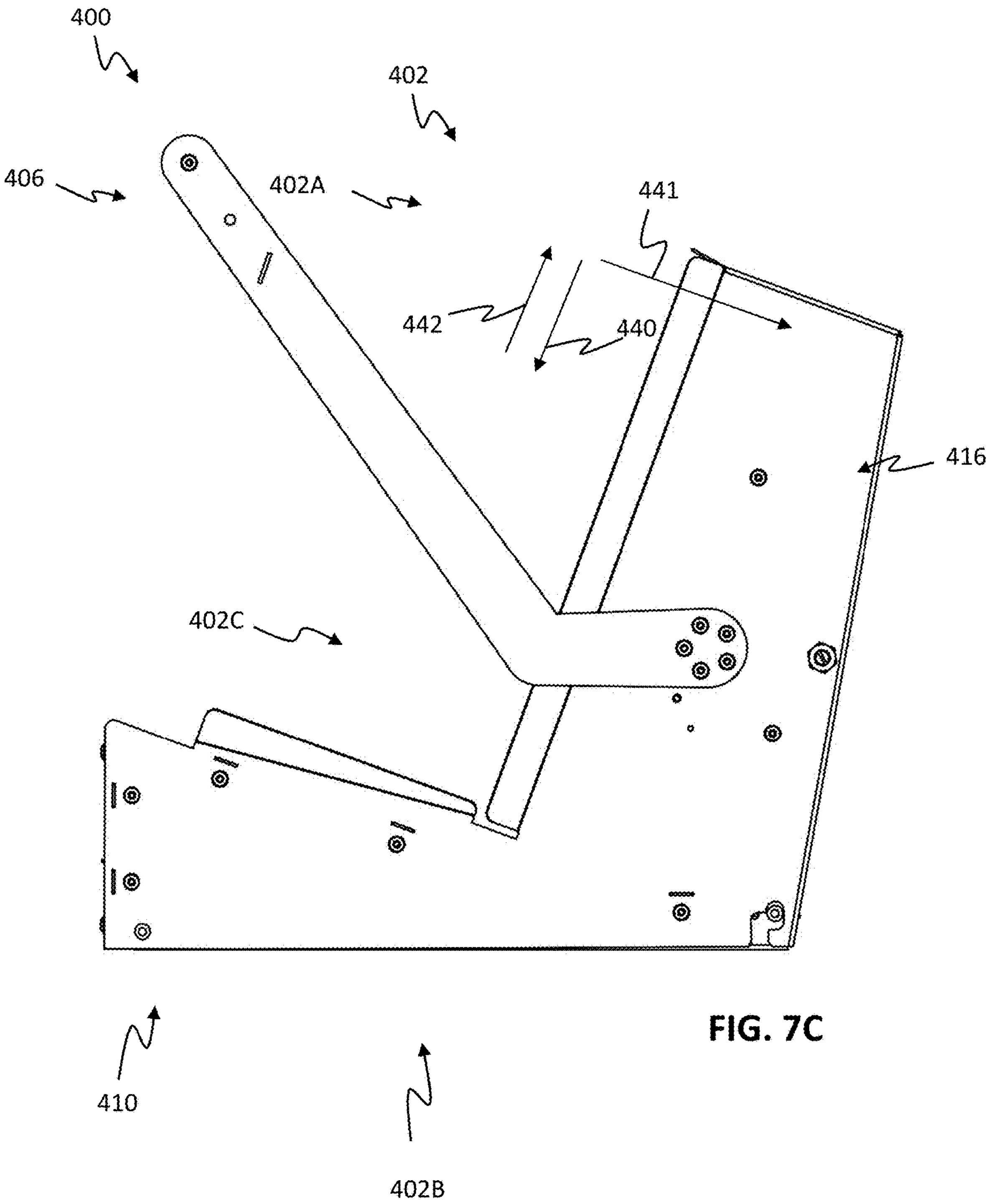
FIG. 7C is a side view of the multi-bag connector (MBC) assembly of FIG. 5A in the engaged position.
Figure 7D:
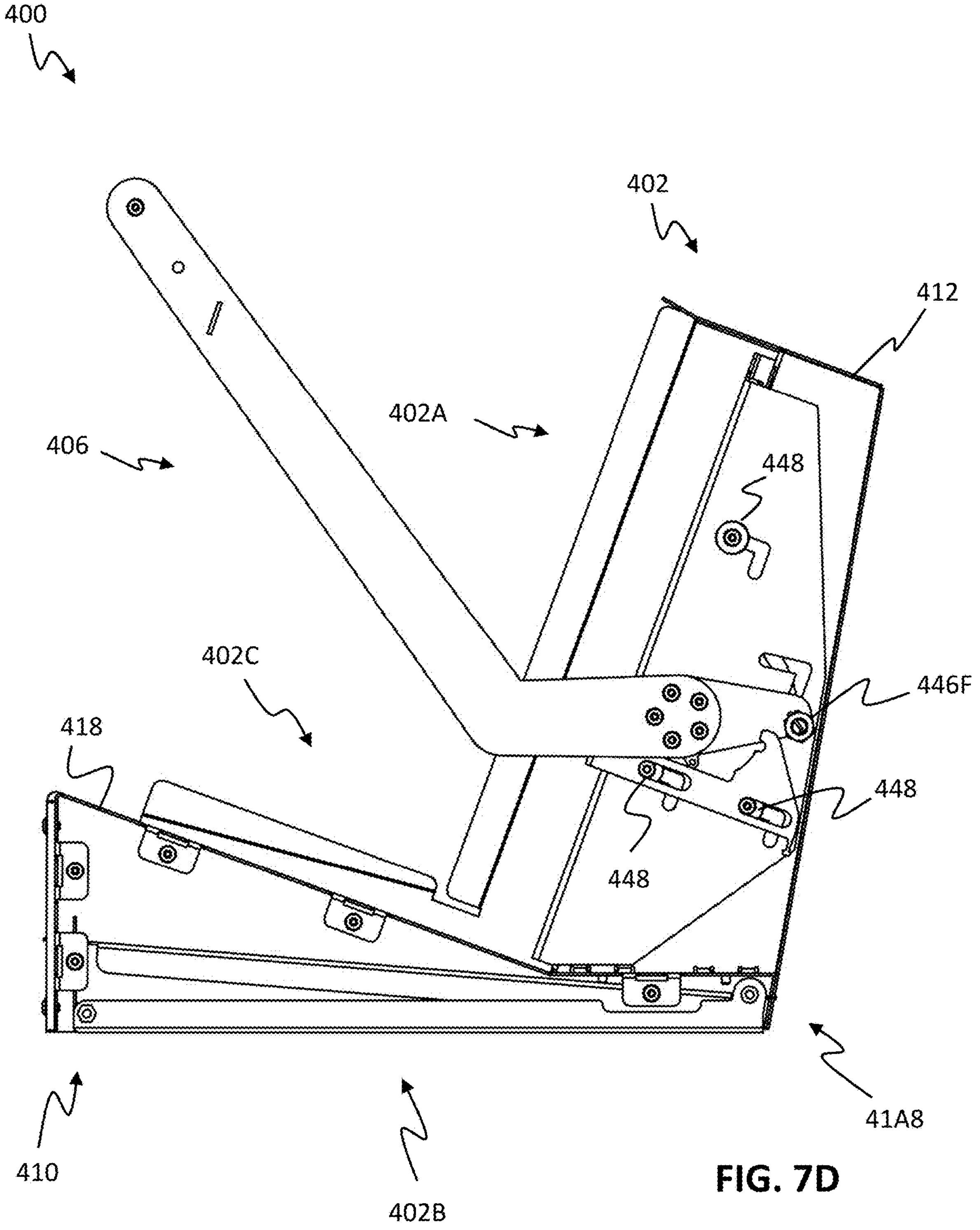
FIG. 7D is a side partial view of the multi-bag connector (MBC) assembly of FIG. 5A in the engaged position.
Figure 7E:
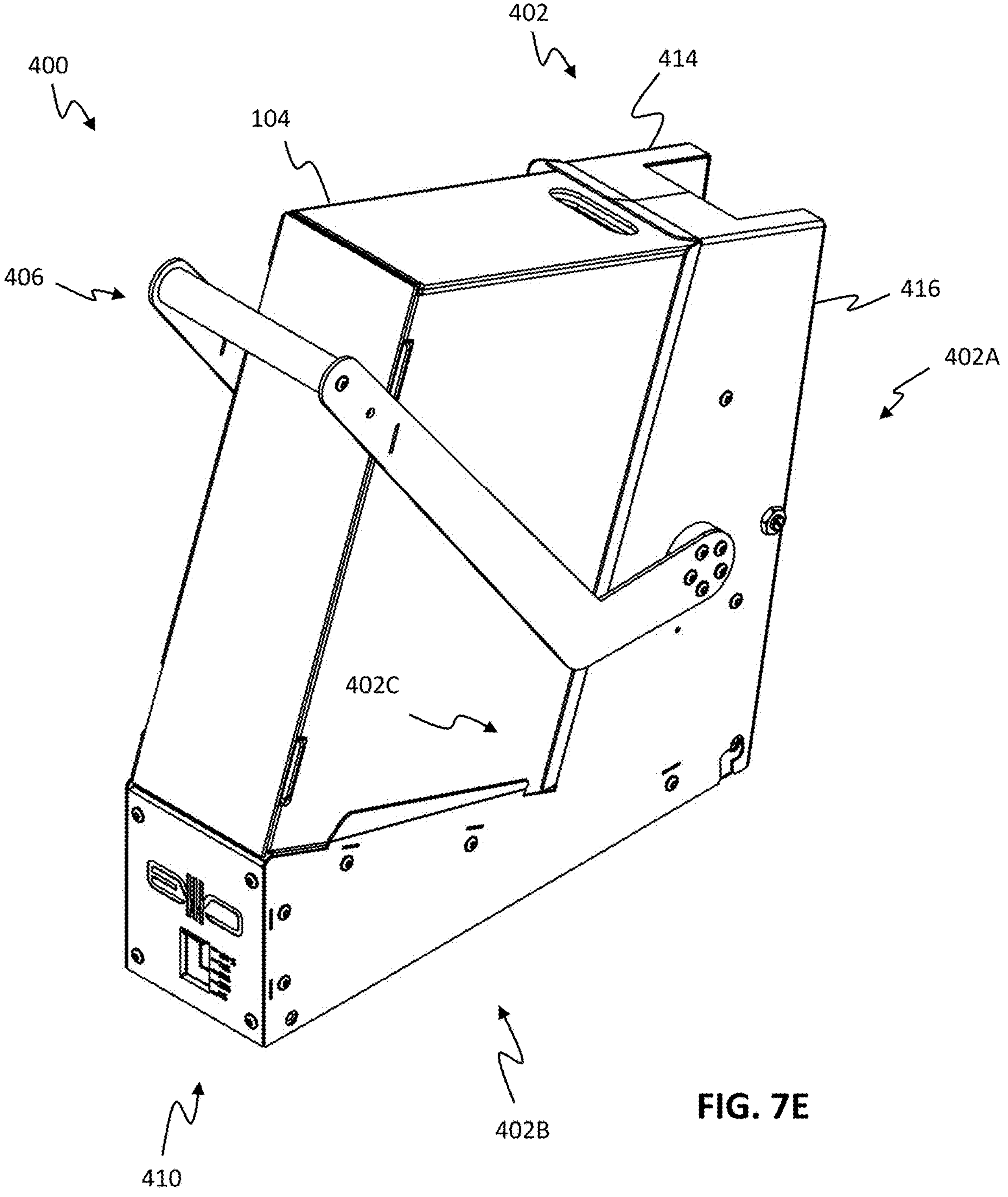
FIG. 7E is a perspective view of the multi-bag connector (MBC) assembly of FIG. 5A in the engaged position with a multi-bag package, according to an embodiment of the present invention.
Figure 7F:
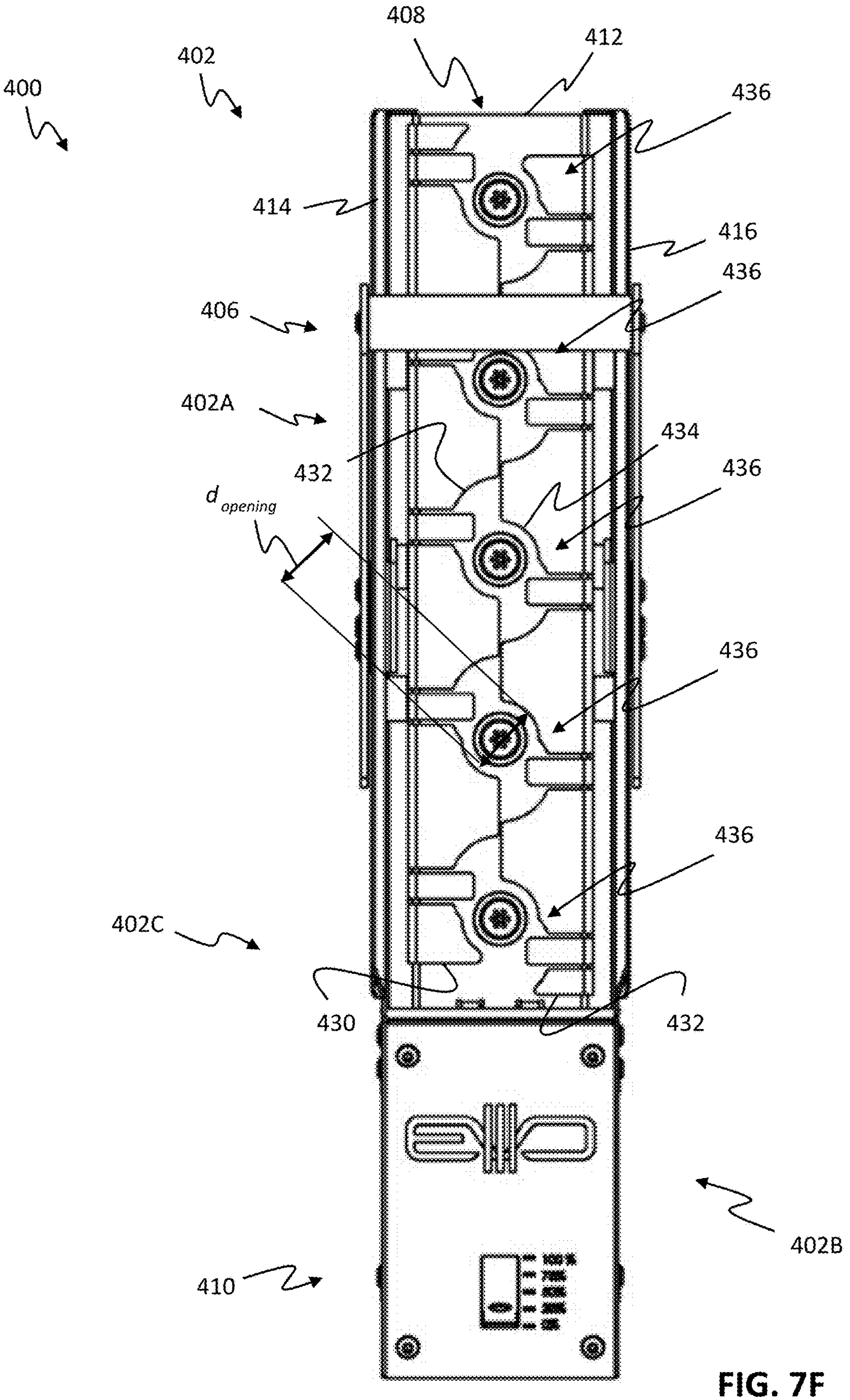
FIG. 7F is a front view of the multi-bag connector (MBC) assembly of FIG. 5A in the engaged position.
Figure 7G:
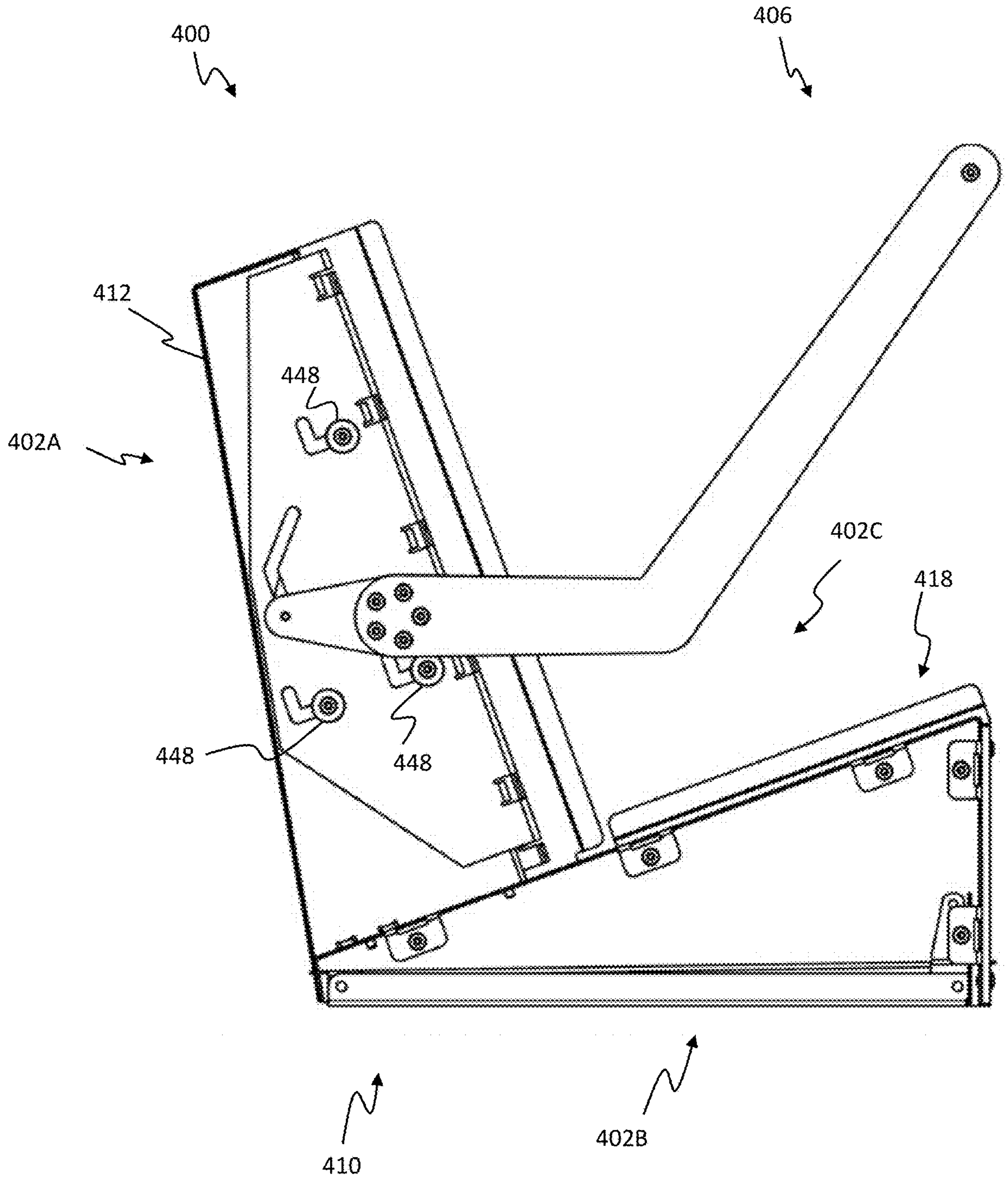
FIG. 7G is a second side partial view of the multi-bag connector (MBC) assembly of FIG. 5A in the engaged position.

FIGS. 4A-4D illustrate alternative boxes and associated bags that may be used with beverage dispensing system 100 (shown in FIG. 1). FIG. 3A is a block diagram of a substantially octagonal box 310. FIG. 6B is a block diagram of a substantially hexagonal box 320. FIG. 6C is a block diagram of a substantially square box 330. Each of the boxes 310, 320, 330 form a plurality of compartments 312, 322, 322 with a triangular cross-section.

FIG. 3D illustrates bags 340 having a substantially triangular cross-section that may be used with the boxes 310, 322, 332 shown in FIGS. 3A-3C.

Referring to FIG. 3D, a plurality of bags 340 having a triangular cross-section may be used with the boxes shown in FIGS. 3A-3C. The bags 340 may be housed or positioned within an intermediate container 342. Each bag 340 may include an alignment portion 344 that may be used to correctly position a respective fitment 346 with the box 310, 320, 330.

Each intermediate container 342 may be coupled to a common edge 348 that may form the exterior of the box 310, 320, 330. For example, in one embodiment, each intermediate container 342 is coupled to a common piece of cardboard that may be folded to form the box 310, 320, 330. Thus, if four intermediate containers 342 and associated bags 340 are provided, containers 342 may be folded along edge 342 to form the square box 330 shown in FIG. 3C. It should be recognized that other suitable shapes may be used for intermediate containers 342 and bags 340 to form a box of any suitable shape and size. It should also be recognized that intermediate containers 342 may be connected together along different edges to form boxes of any desired shape and configuration.

In one embodiment, the bags of the boxes described in FIGS. 3A-3C may be covered by a removable portion of the respective box. For example, in one embodiment, the box may include one or more tear-away portions or sides that may be pulled away from the bags by a user to reveal the bags and/or outlets.

Other details of a beverage dispensing system and connector assembly are shown in U.S. Pat. No. 10,233,003, issued Mar. 19, 2019, and U.S. Pat. No. 10,538,424, issued on Jan. 21, 2022, both of which are herein incorporated by reference.

As discussed in more detail below, an external connector assembly 110 is utilized to controllably, fluidly couple the outlet for the bags or containers 106 within a box 104. In general, the connector assembly 110, which may be referred to as a multi-bag connector or MBC assembly 110, includes a valve assembly 112 used to connect the outlet 224 of each bag 106 to the system 100. The valve assembly 112 connects the outlet 224 of the bags 106 together to jointly direct liquids from the bags 224 to a common main outlet 114 of the valve assembly 112.

As is described more fully herein, the components of the connector assembly cooperate together to enable a user to quickly, and accurately, attach the MBC assembly 110 to the MBP 104 when the user prepares the beverage dispensing system 100 for use. The components of the connector assembly 110 also cooperate together to enable the user to quickly and efficiently disengage the MBC assembly 110 from the MBP 104, for example, when the user wishes to replace empty bags or boxes with filled replacement bags or boxes.

Figure 14A:
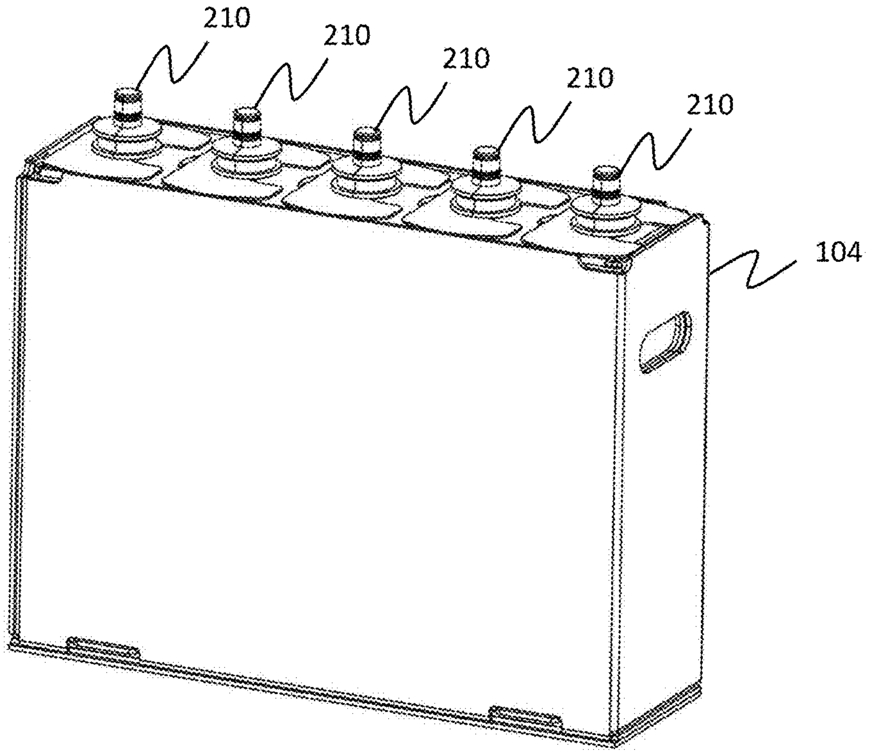
FIG. 14A is a perspective view of a multi-bag package (MBP) or box for use with the MBC assembly of FIG. 5A.
Figure 14B:
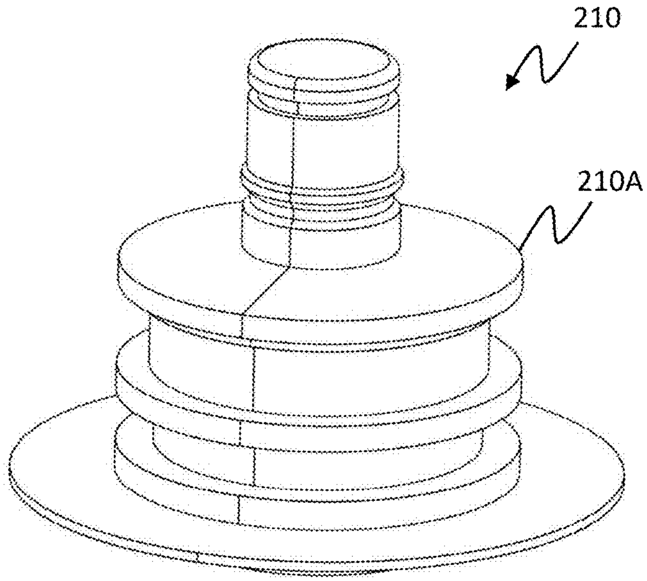
FIG. 14B is a perspective view of a fitment of the MBP of FIG. 14A.

With reference to FIGS. 5A-5G, 6A-6G, 7A-7G, 8A-8D, 9A-9F, 10A-10B, 10A-11D, 12A-12E. 13A-13B, and 15A-15C, a multi-bag connector (MBC), or connector, assembly 400 according to an embodiment of the present invention is shown. As discussed above, the MPC assembly 400 controllably couples a plurality of containers or bags 106 containing a liquid. The containers 106 are contained within a common package or box 104. Each container 106 has a fitment 210 (see FIGS. 14A-14B). Each fitment 210 has a channel and a flange 210A and configured to releasably connect a respective container 106 to the connector assembly 400. The containers 106 may be housed in a box 200 with the fitments 210 arranged in predetermined relative locations.

It should also be noted that the connector assembly 400 may also be adapted to work with a single container (or box or container) containing a single container.

In the illustrated embodiment, the MBC 400 includes a housing 402, a valve assembly 404, an actuator 406, and a locking plate assembly 408. The housing 402 includes a lower portion 402A and an upper portion 402B. The upper portion 402A extends from the lower portion 402B. The lower portion 402A and the upper portion 402B form a recess 402C for receiving the box or package 104.

While the MBC assembly 400 shown is configured to work with a box 104 containing five bags 106 linearly arranged, the MBC assembly 400 of the present invention may be configured or adapted to work with any box configuration, including, but not limited to the box arrangements discussed above.

With specific reference to FIGS. 9A-9F, an exemplary valve assembly 500 is shown. The valve assembly 500 includes a plurality of fitment receptacles or inlets 502. Each fitment receptacle 502 is associated with a respective fitment 108 of the package or box 104. The plurality of fitment receptacles 502 being arranged in a pattern coinciding with the predetermined relative locations of the fitments 104. As shown, the valve assembly 500 includes a liquid flow channel 504 and an outlet 506. The liquid flow channel 504 couples the fitment receptacles 502 to the outlet 506.

In the illustrated embodiment, the valve assembly 500 includes a top portion 508 and a bottom portion 510. The top portion 508 and the bottom portion 510 may be composed from Polyoxymethylene (POM, or other suitable material. The top portion 508 includes a plurality of apertures 512 that provide access to the fitment receptables 502 which are formed within the bottom portion 510. The top portion 508 and the bottom portion 510 are fastened together via a plurality of fasteners (not shown). A seal 514 located between the top portion 508 and the bottom portion 510 to provide sealing therebetween.

Figure 9D:
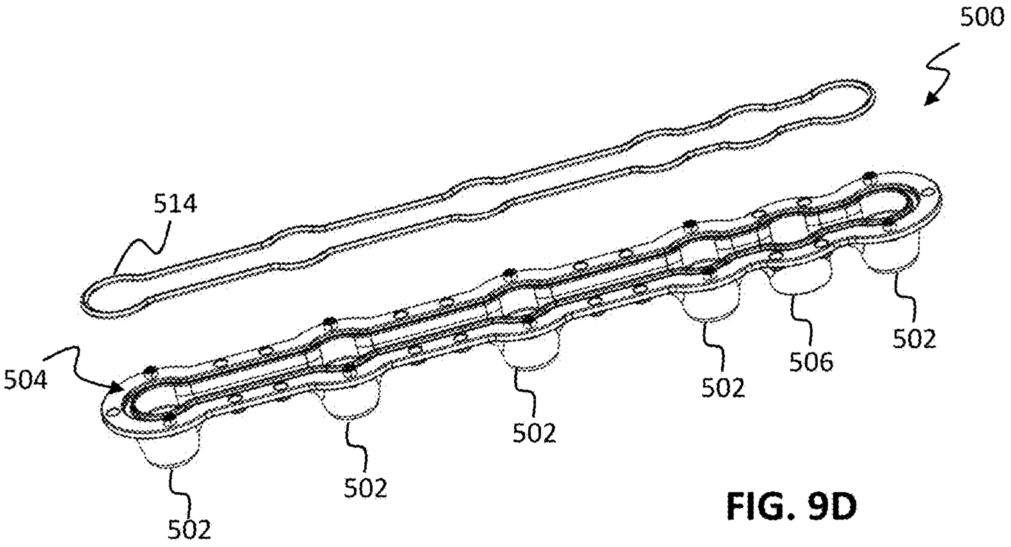
FIG. 9D is a perspective view of a bottom portion and a seal of the valve assembly of FIG. 9A.
Figure 9E:
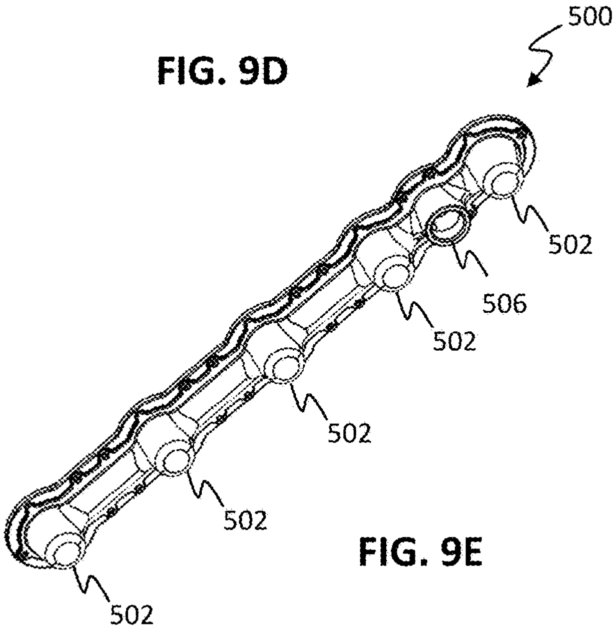
FIG. 9E is a second perspective view of the bottom portion of the valve assembly of FIG. 9A.
Figure 9F:
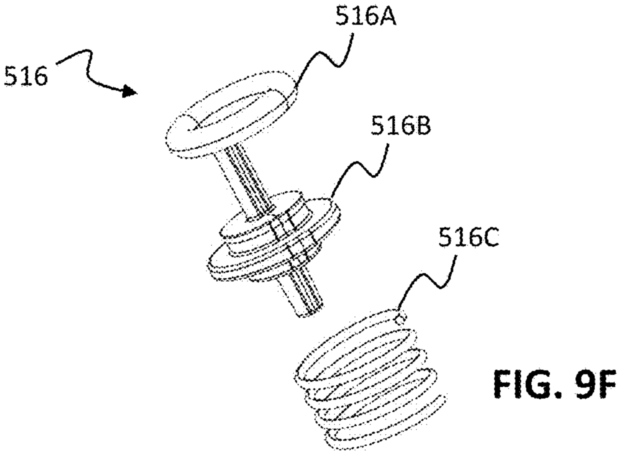
FIG. 9F is an exploded view of a valve sub-assembly of the valve assembly of FIG. 9A.

With specific reference to FIG. 9F, a valve sub-assembly 516 is located within each fitment receptacle 502. Each valve sub-assembly 516 includes an o-ring 516A, a valve element 516B, and a spring 516C. The valve sub-assembly 516 and the respective fitment receptable 502 form a respective valve within the valve assembly 500. The spring 516C acts against an underside of the valve element 516B to bias the valve element 916B towards the top portion 908 of the valve assembly 900. The When a fitment 104 is inserted into a fitment receptable 502, the fitment 104 is pushed against a top surface of the valve element 516 to open the respective valve 516, 502 to allow fluid to flow from a respective bag 106 through the liquid flow channel 504 to the outlet 506.

Returning to FIGS. 5A-5G, 6A-6G, 7A-7G, the actuator 406 is rotatably coupled to the housing 402. The actuator 406 is movable between an open (or first) position (shown in FIGS. 5A-5G), a closed (or second) position (shown in FIGS. 6A-6G), and an engaged (or third) position (shown in FIGS. 7A-7G).

With specific reference to FIGS. 12A-12E, the locking plate assembly 408 includes a first plate 430 and a second locking plate 432. The first and second locking plates 430, 432 are coupled to the actuator 406 form an opening 436 (see also FIGS. 5F, 6F, 7F) corresponding to each fitment 210. The openings 436 have a variable diameter, $d_{variable}$, as a function of the position of the actuator 406. In the illustrated embodiment, the opening 436 have has a first diameter (or diameter value) when the actuator 406 is in the open position and a second diameter (or diameter value) when the actuator 406 is in the closed and engaged positions. The first diameter of the openings 436 are configured to allow entry of the flange 210A of each fitment 210 into the respective opening 436. Movement of the actuator 406 from the open position to the closed position closes the openings 436 to the second diameter (or diameter value). The second diameter is smaller than the first diameter and is also smaller than a diameter of the fitments 210.

As will be explained in more depth below, further movement of the actuator 406 from the closed position to the engaged position, results in movement of the locking plate assembly 408 towards the rear of the housing 402. i.e., the valve assembly 404. With a package or box 104 within the recess 402 of the housing 400, when the locking plate assembly 408 is moved towards the valve assembly 404, since the variable diameter, $d_{variable}$, is smaller than a diameter of the fitments 210, the box or package 104 is drawn towards the rear of the housing 402 of the MBC assembly 400 such that the fitments 210 and the bags 106 are in fluid communication with the valve assembly 112. Essentially, the locking plate assembly 408 "grabs" the fitments 108 and pulls the fitments 108 and the package 104 towards the valve assembly 112 such that the fitments 108 are connected to the corresponding valve inlets or apertures 512.

Figure 8A:
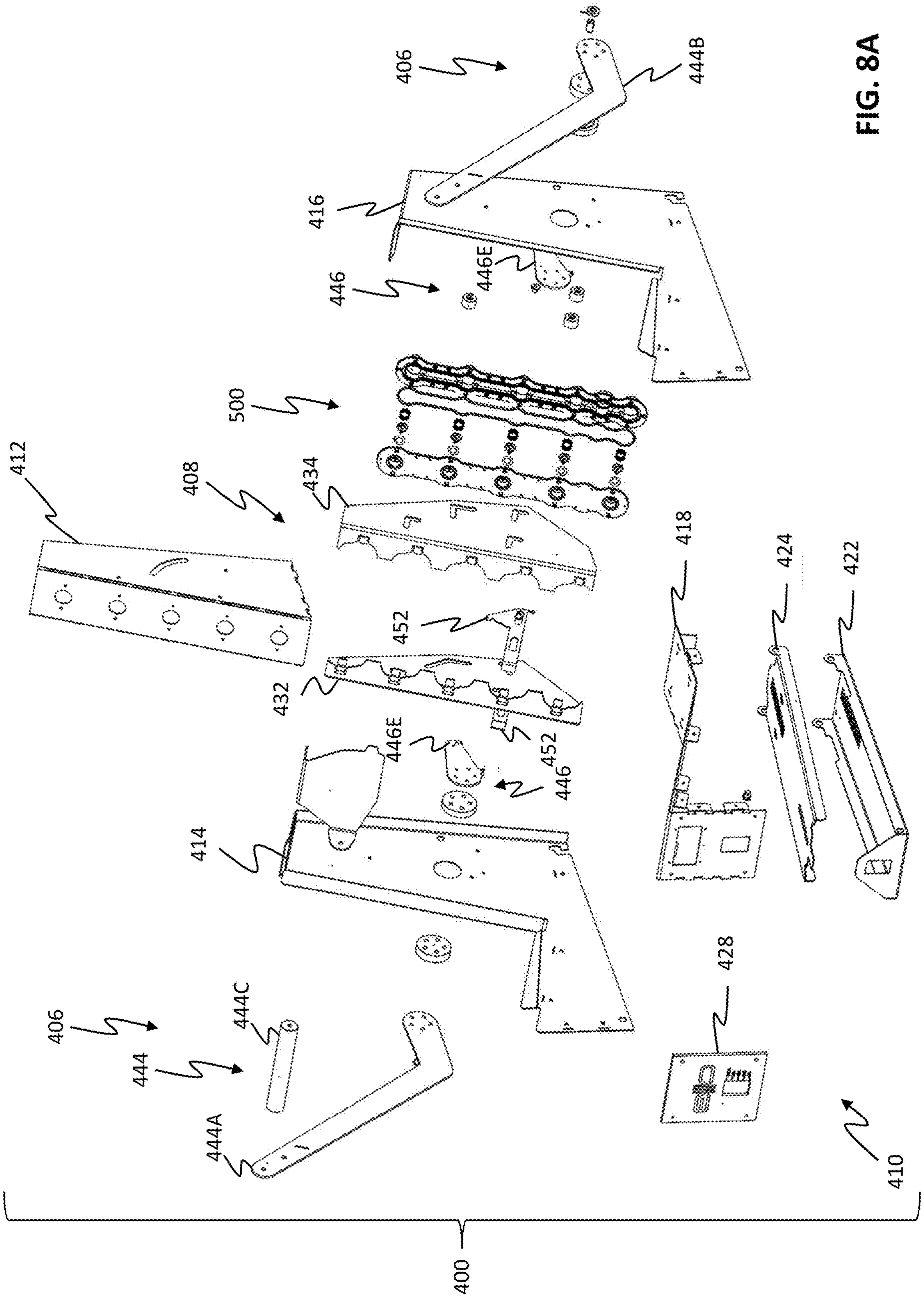
FIG. 8A is an exploded view of the multi-bag connector (MBC) assembly of FIG. 5A.
Figure 8B:
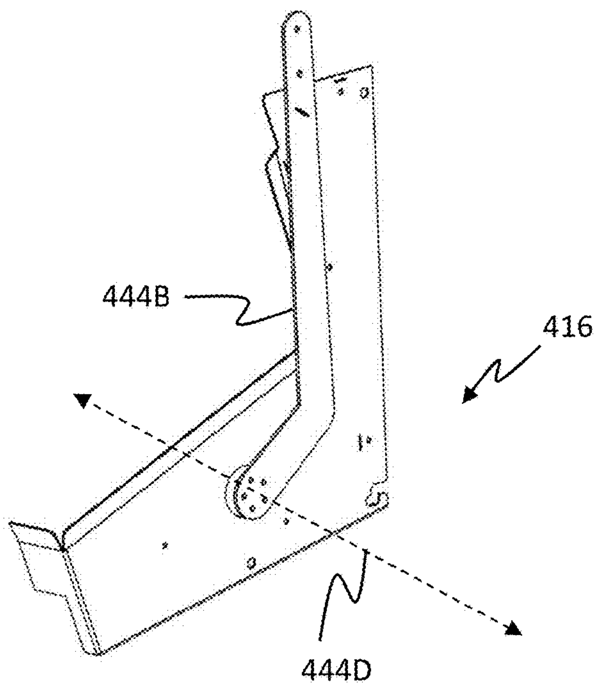
FIG. 8B is a first perspective view of a sub-assembly of the MBC assembly of FIG. 5A.
Figure 8C:
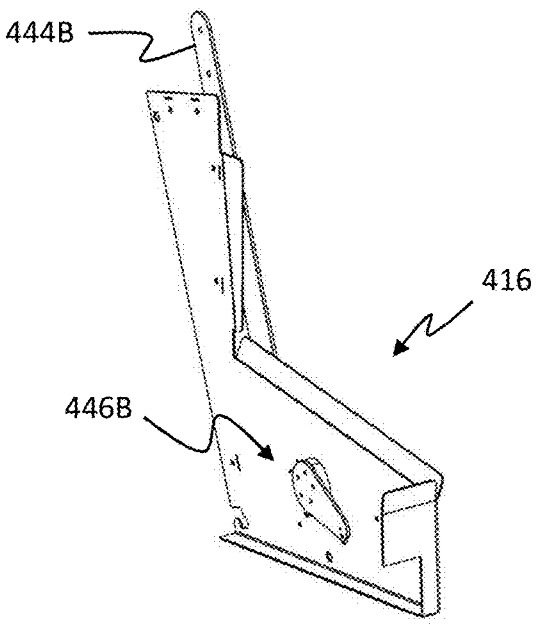
FIG. 8C is a second perspective view of the sub-assembly of FIG. 8B.
Figure 8D:
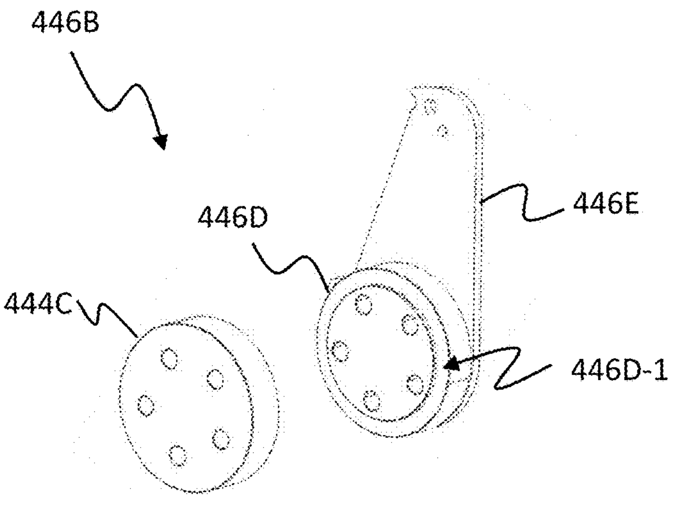
FIG. 8D is an exploded perspective view of a portion of the sub-assembly of FIG. 8B.
Figure 8E:
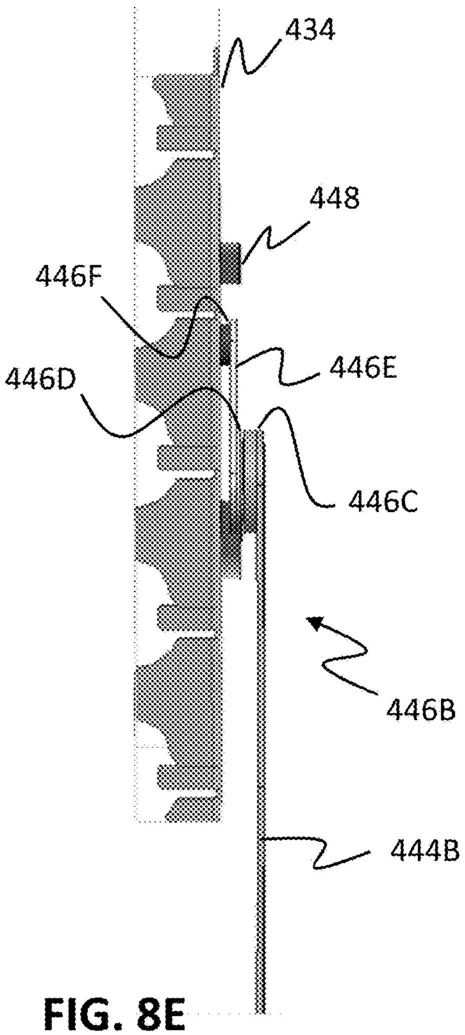
FIG. 8E is a side view of a portion of the sub-assembly of FIG. 8B.
Figure 8F:
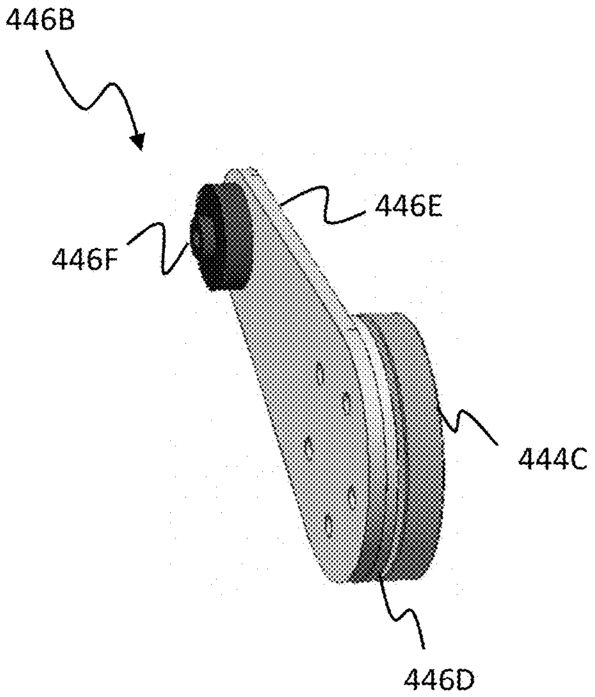
FIG. 8F is a second perspective view of the portion of the sub-assembly of FIG. 8B.

With reference to FIG. 8A, the housing 402 of the MBC assembly 110 includes a base assembly 410, a back bracket 412, and first and second outer housing portions 414, 416. The base assembly 410, the back bracket 412, and the first and second outer housing portions 414, 416 are fastened together using fasteners (not shown) to form the housing 402.

Figure 10A:
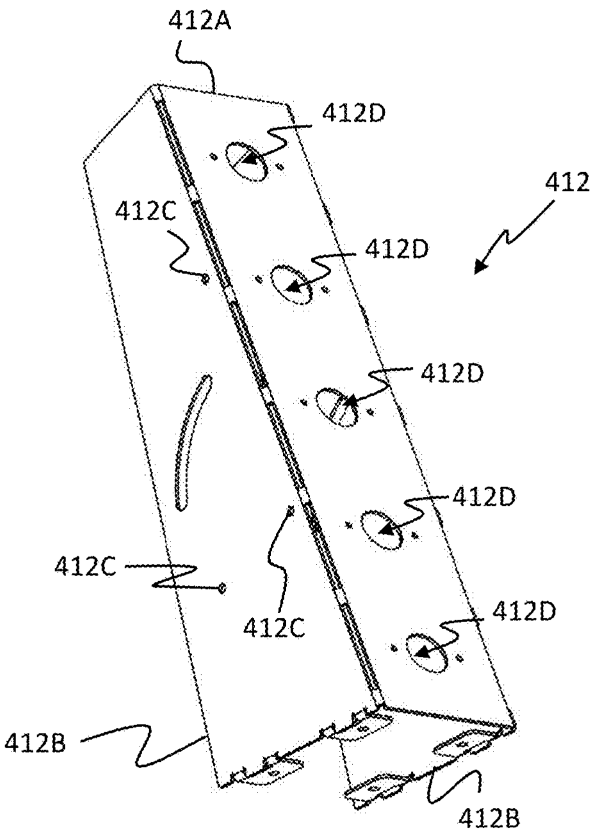
FIG. 10A is a first perspective view of a back bracket of the MBC assembly of FIG. 5A.
Figure 10B:
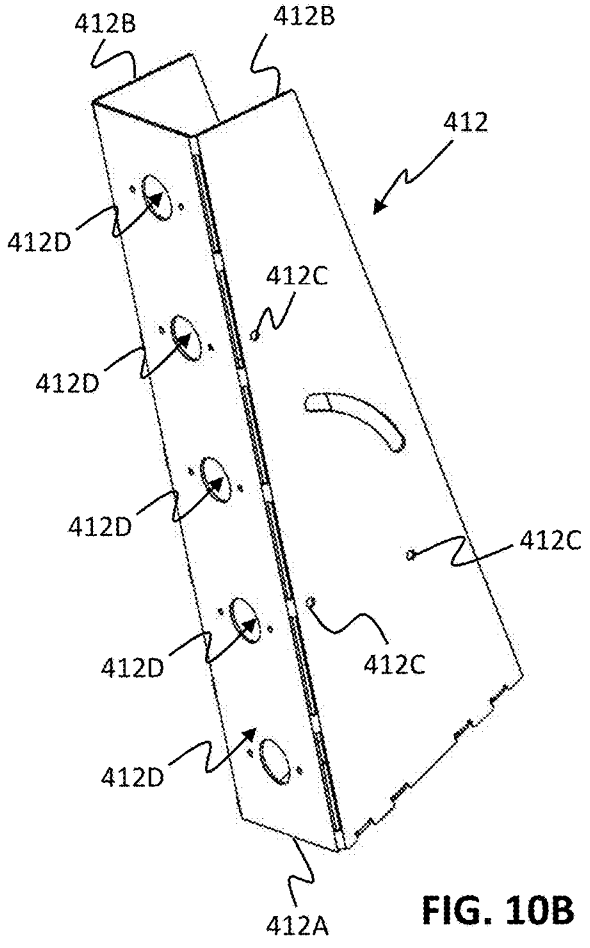
FIG. 10B is a second perspective view of the back bracket of FIG. 10A.
Figure 11A:
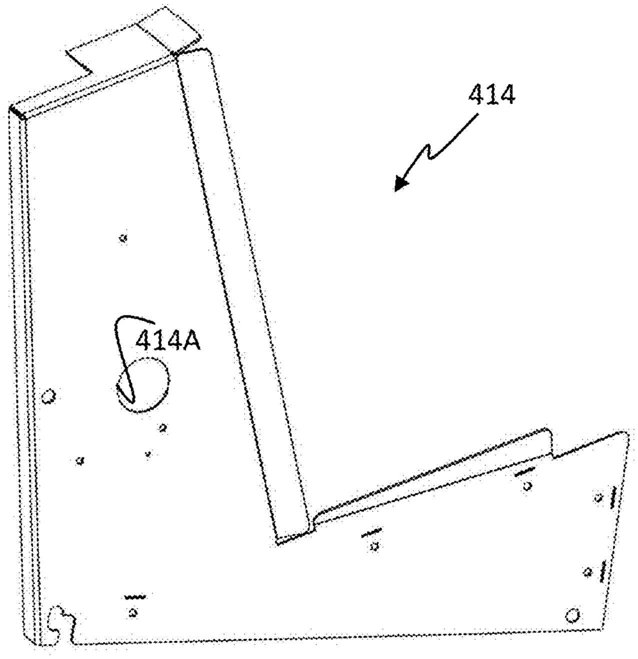
FIG. 11A is a first perspective view of a first portion of a housing of the MBC assembly of FIG. 5A.
Figure 11B:
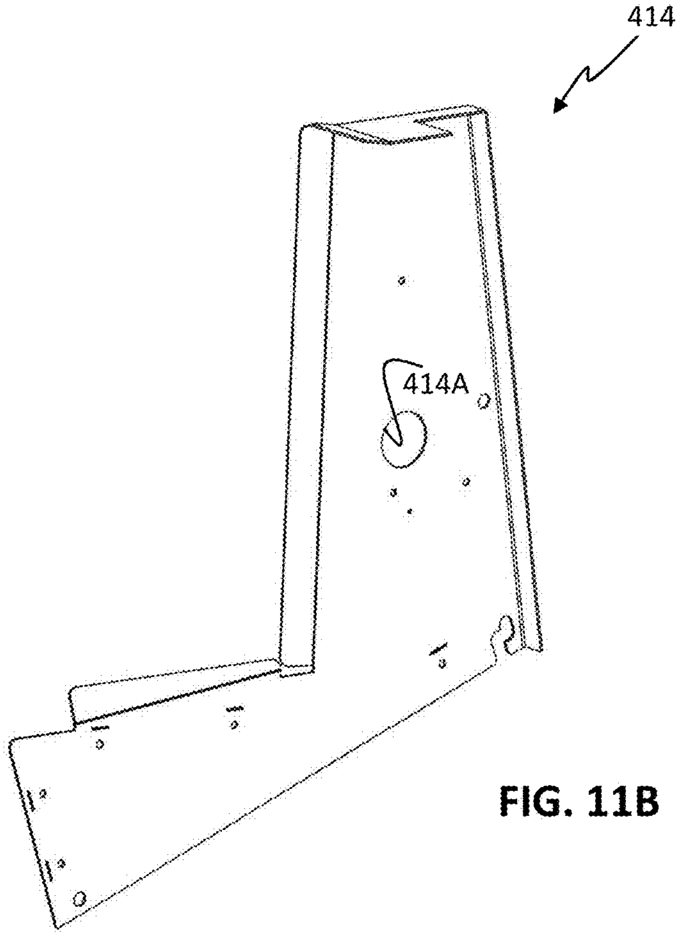
FIG. 11B is a second perspective view of the first portion of the housing of FIG. 11A.
Figure 11C:
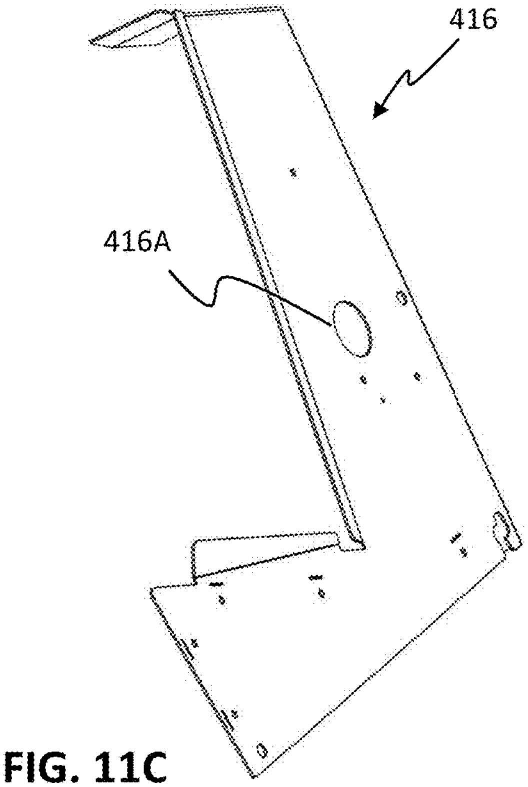
FIG. 11C is a first perspective view of a second portion of the housing of the MBC assembly of FIG. 5A.
Figure 11D:
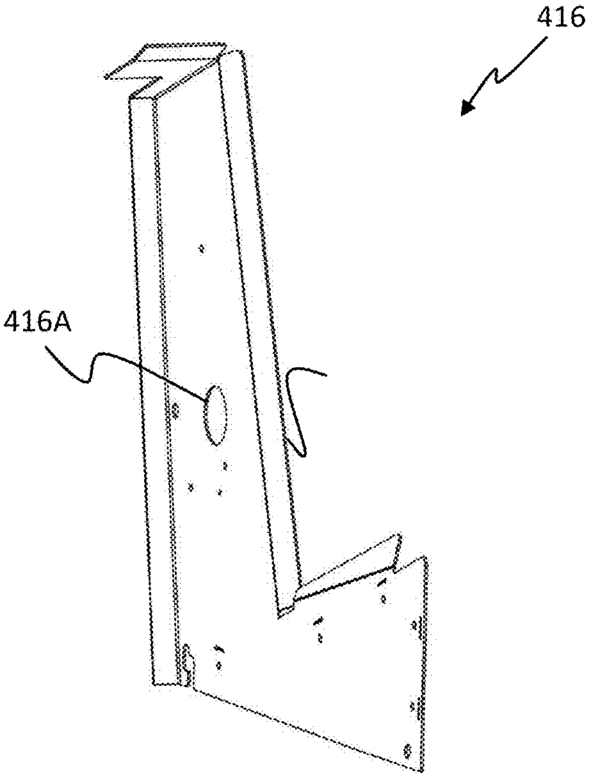
FIG. 11D is a second perspective view of the second portion of the housing of FIG. 11C.

As shown in FIGS. 10A. 10B, the back bracket 412 includes front panel 412A and two side panels 412B. The valve assembly 404 is mounted to a back surface of the front panel 412A using fasteners (not shown). A plurality of orifices 412D within the front panel 412A provide access to the fitment receptables 502.

Figure 13A:
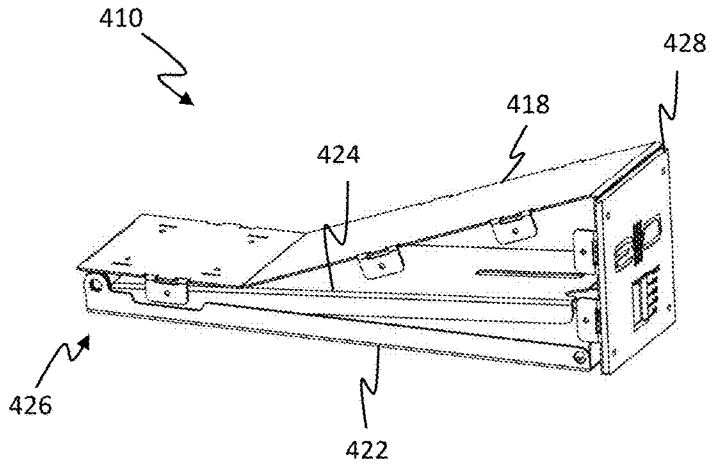
FIG. 13A is a perspective view of a base assembly of the MBC of FIG. 5A including a scale.
Figure 13B:
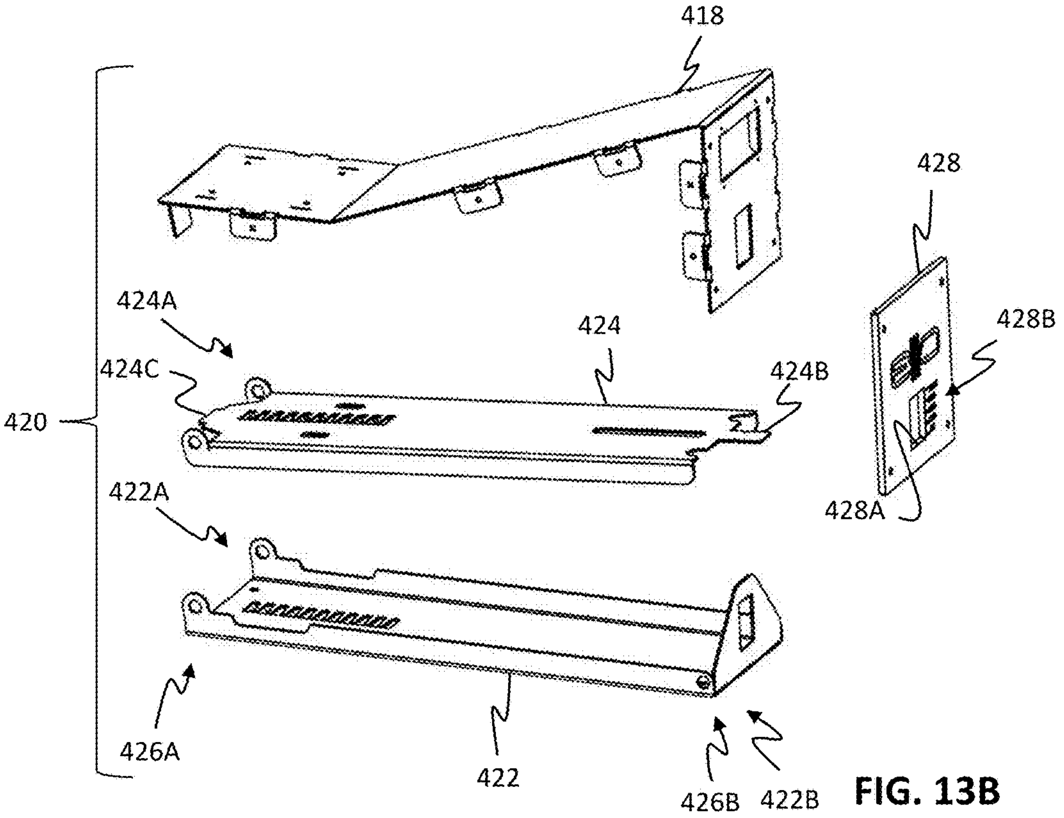
FIG. 13B is an exploded view of the base assembly of FIG. 13A.

As shown in FIGS. 13A-13B, the base assembly 410 includes a guide plate 418 configured to bear the weight associated with the containers 106. As shown, the guide plate 418 is inclined downward towards a back end of the housing 402 and forms part of the recess 402C.

In one aspect of the present invention, the base assembly 410 includes scale 420 configured to detect a weight associated with the package or box 104 and the containers 106 and provides a visual indication of the detected weight. In one embodiment, the scale 420 is an electronic scale (not shown) that includes an electronic display (not shown) to display the detected weight.

In another embodiment, the scale 420 is a mechanical scale. As shown in FIGS. 13A-13B, in the illustrated embodiment, the scale 420 includes the guide plate 418, a bottom plate 422, and a scale arm 424. Each of the bottom plate 422 and the scale arm 424 have a pair of orifices 422A. 424A located at a first end thereof. The orifices 422A. 424A are configured to receive fasteners (not shown) to form a first hinge 426A. A second end of the scale arm 424 is biased downward by a spring (not shown) located between the bottom plate 422 and the second end of the guide plate 418. The scale arm 424 includes a visual indicator 424B. The bottom plate 422 further includes a second pair of orifices 422B configured to receive fasteners (not shown) to couple the bottom plate 422 to the housing 102 to form a second hinge 426B.

The scale 420 may further include a plate 428 mounted to a front of the guide plate 418 and having an aperture 428A. The visual indicator 424B extends through the aperture 428A in the plate 428. The plate 428 may further include indicia 428B located on an outer surface thereof. The indicia 428B cooperate with the visual indicator 424B to provide an indication of the detected weight. In one embodiment, the indicia are expressed as a percentage of a level of liquid remaining within the package or box 104, e.g., between 0% and 100%. In the illustrated embodiment, the following values are included in the indicia 428B: 0%, 25%, 50%, 75%, 100%.

The guide plate 418, bottom plate 422 and scale arm 424 may be composed from stainless steel, such as Stainless Steel 430 and fastened together using any appropriate fastener(s). The plate 428 may be composed of a plastic, or other similar or suitable material. The scale arm 424 further includes a tab 424C which is positioned within a slot 418A (see FIGS. 5D, 6D, 7D) in the guide plate 418.

When a box or package 104 is inserted into the recess 402C of the housing 402, the weight of the box or package 104 results in the bottom plate 422 to pivot about the second hinge 426B. The tab 424C is held in place by the guide plate 418 and the guide plate 418 pivots about the first hinge 426A resulting in upward movement of the indicator 424B to provide the visual indication of the detected weight.

The other components of the housing 402, including the back bracket 412 and the first and second outer housing portions 414, 416 may also composed from stainless steel, such as Stainless Steel 304 (type 1.4301) fastened together (and to the base assembly 410) using any appropriate fastener(s).

With reference to FIGS. 8A and 12A-12E, the locking plate assembly 408 includes the first locking plate 432 and the second locking plate 434. As mentioned above, the locking plate assembly 408 includes a plurality of opening 436. Each of the openings 436 corresponds to one of the fitments 210 of the box 104. The first locking plate 432 includes a front panel 432A and a side panel 432B. The second locking plate 434 includes a front panel 434A and a side panel 434B. Each of the openings 436 is formed by a respective recess 432C in the front panel 432A of the first locking plate 432 and an opposing recess 434C in the front panel 434A of the second locking plate 434. Each recess 432B, 434B may include a recessed tab 432D, 434D that is located between the respective opening 436 to limit the amount of travel of the fitments 210.

In a first embodiment of the present invention, one of the first and second locking plates moves in a first direction (for example, as indicated by arrow 440 in FIG. 12A) along an axis of the housing in response to the actuator being moved from the open position to the closed position and the one of the first and second locking plates moves in a second direction opposite the first direction (for example, as indicated by arrow 442 in FIG. 12A) in response the actuator being moved from the closed position to the open position.

In a second embodiment of the present invention, in response to the actuator 406 being moved from the open position to the closed position, the first locking plate 432 moves in a first direction 440 along an axis 438 of the housing 402 and the second locking plate 434 moves in a second direction 442 along the axis 438. The first and second directions 440, 442 are opposite.

Figure 5A:
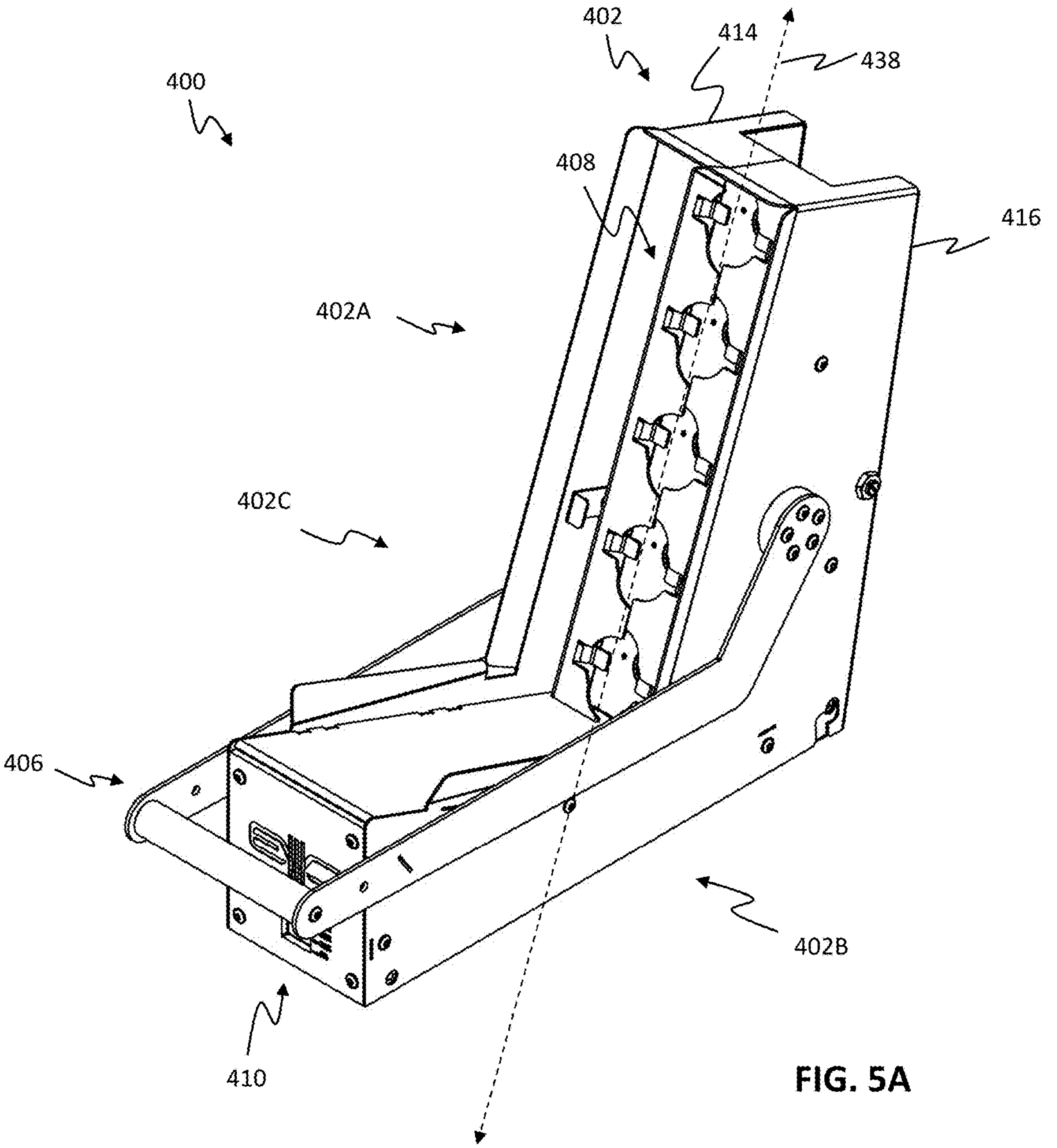
FIG. 5A is a perspective view of a multi-bag connector (MBC) assembly in an open position, according to an embodiment of the present invention, in an open position.
Figure 5B:
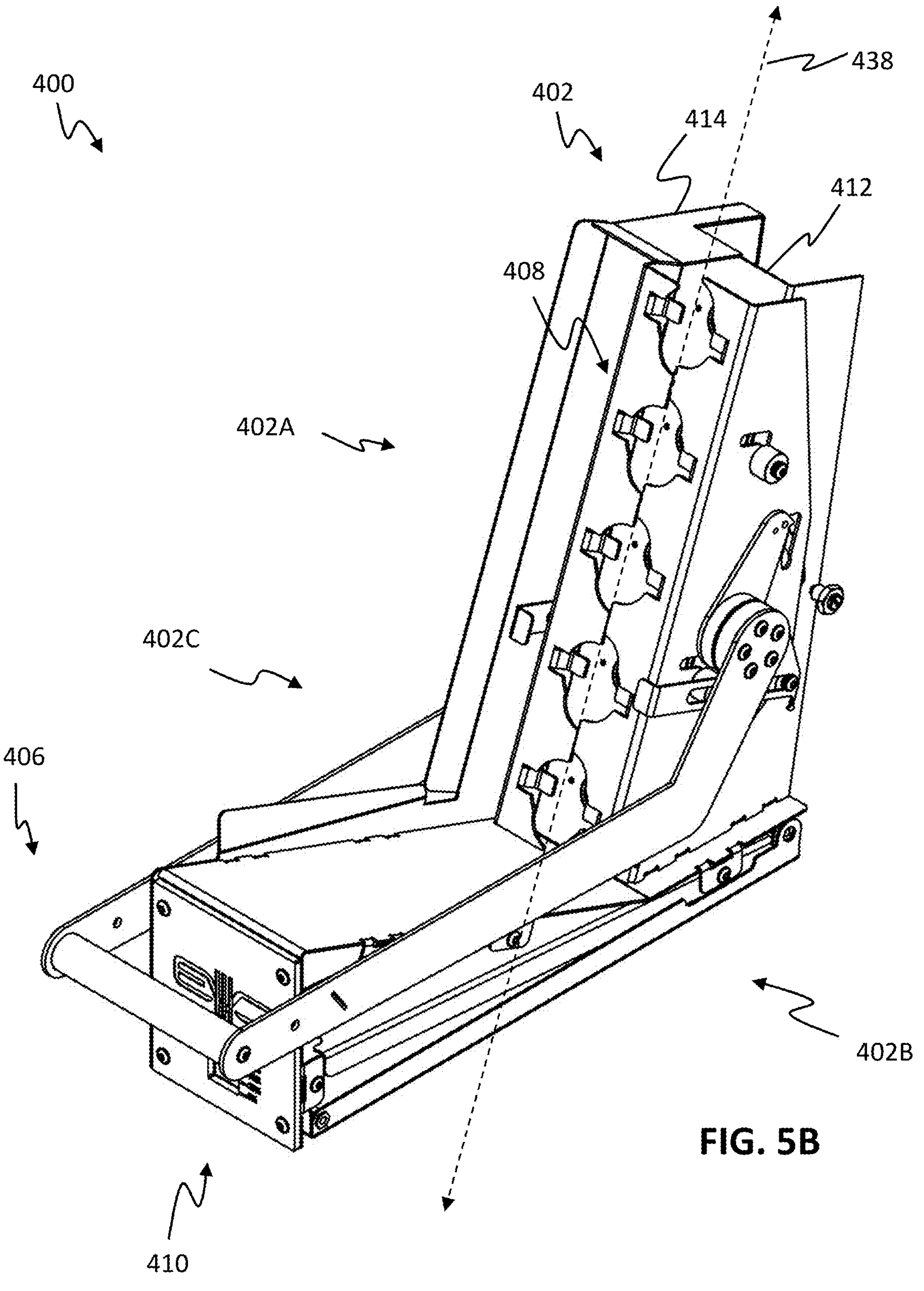
FIG. 5B is a perspective partial view of the multi-bag connector (MBC) assembly of FIG. 5A in the open position.
Figure 5C:
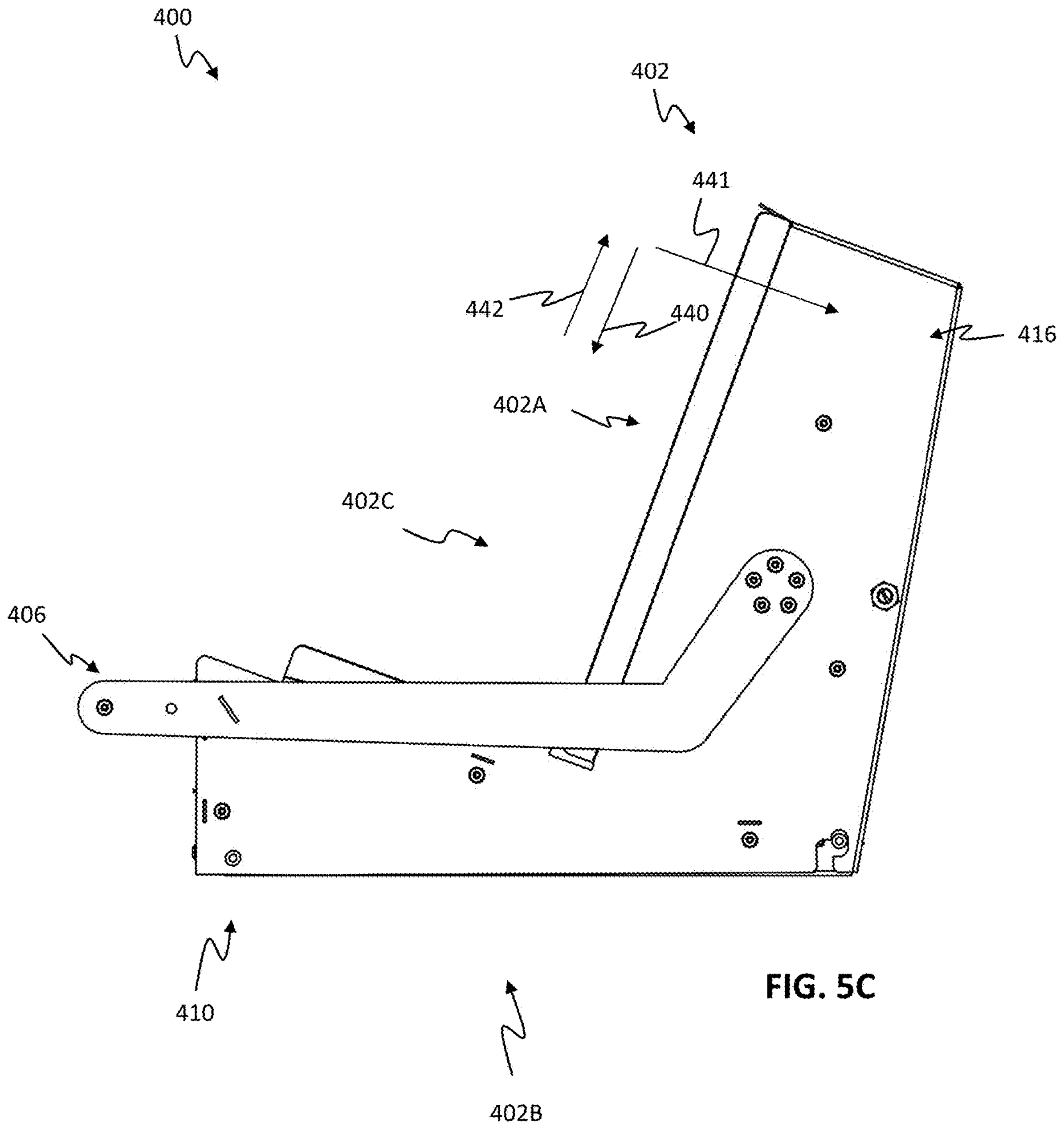
FIG. 5C is a side view of the multi-bag connector (MBC) assembly of FIG. 5A in the open position.
Figure 5D:
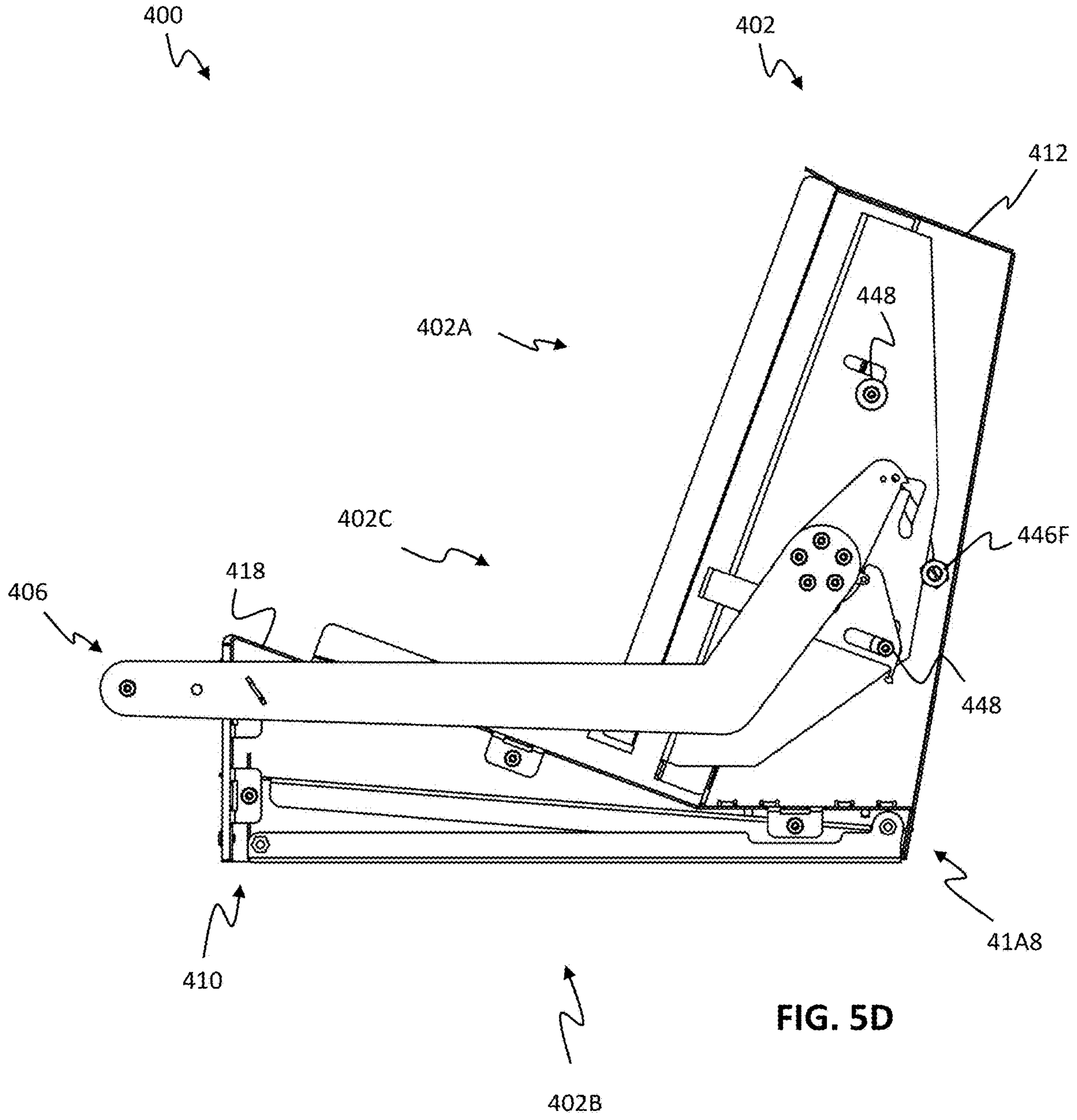
FIG. 5D is a side partial view of the multi-bag connector (MBC) assembly of FIG. 5A in the open position.
Figure 5E:
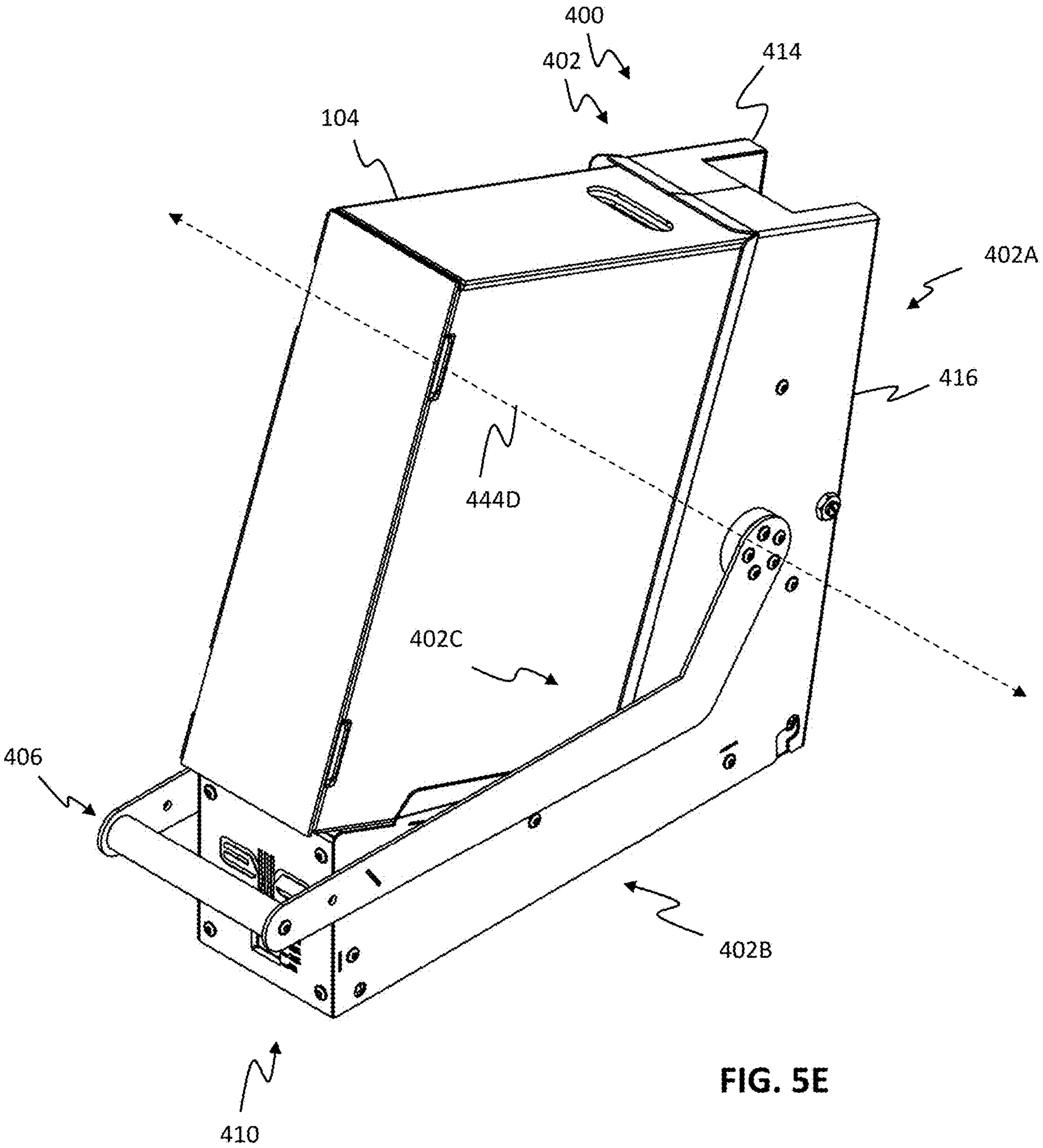
FIG. 5E is a perspective view of the multi-bag connector (MBC) assembly of FIG. 5A in the open position with a multi-bag package, according to an embodiment of the present invention.
Figure 5F:
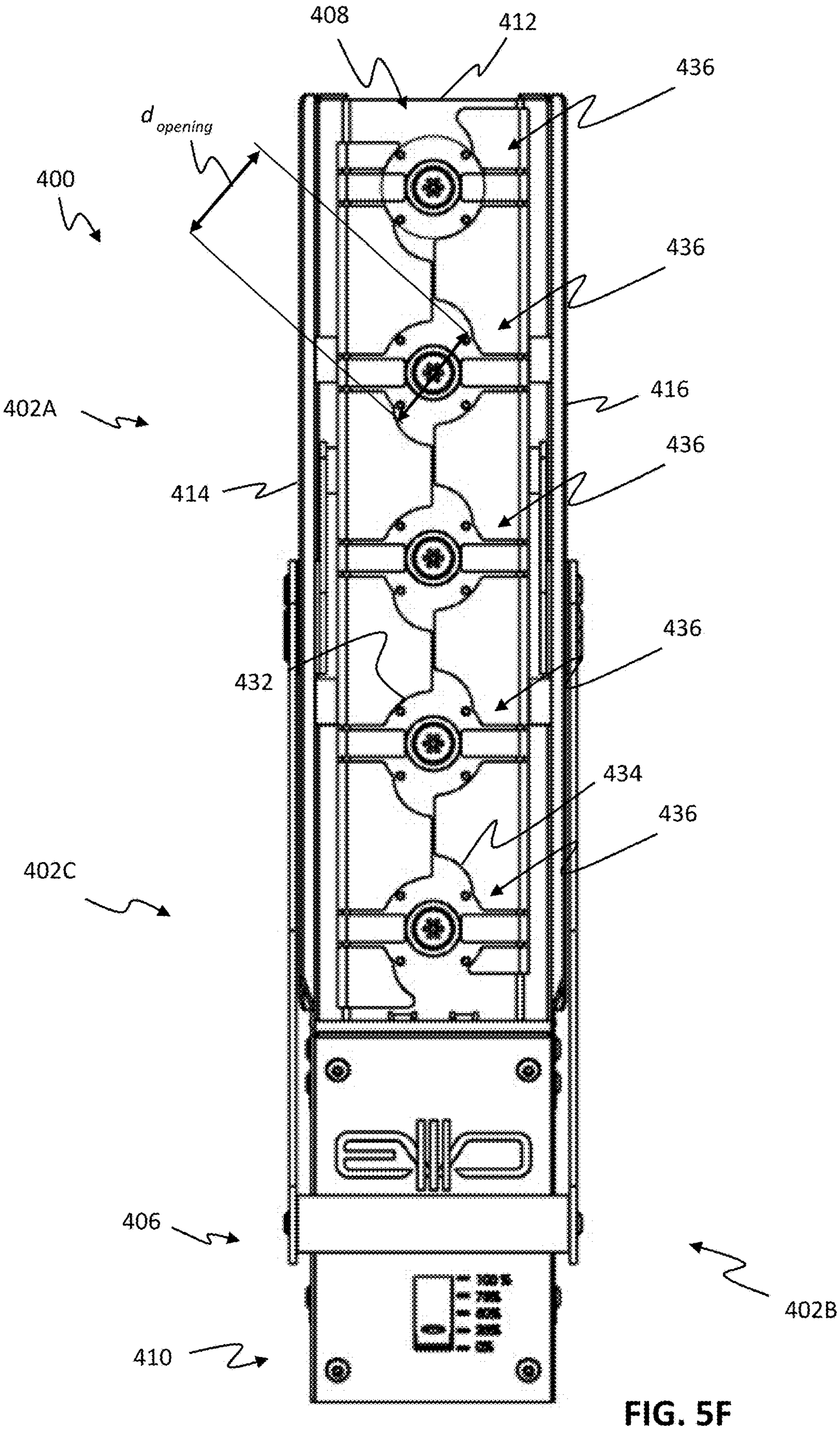
FIG. 5F is a front view of the multi-bag connector (MBC) assembly of FIG. 5A in the open position.
Figure 5G:
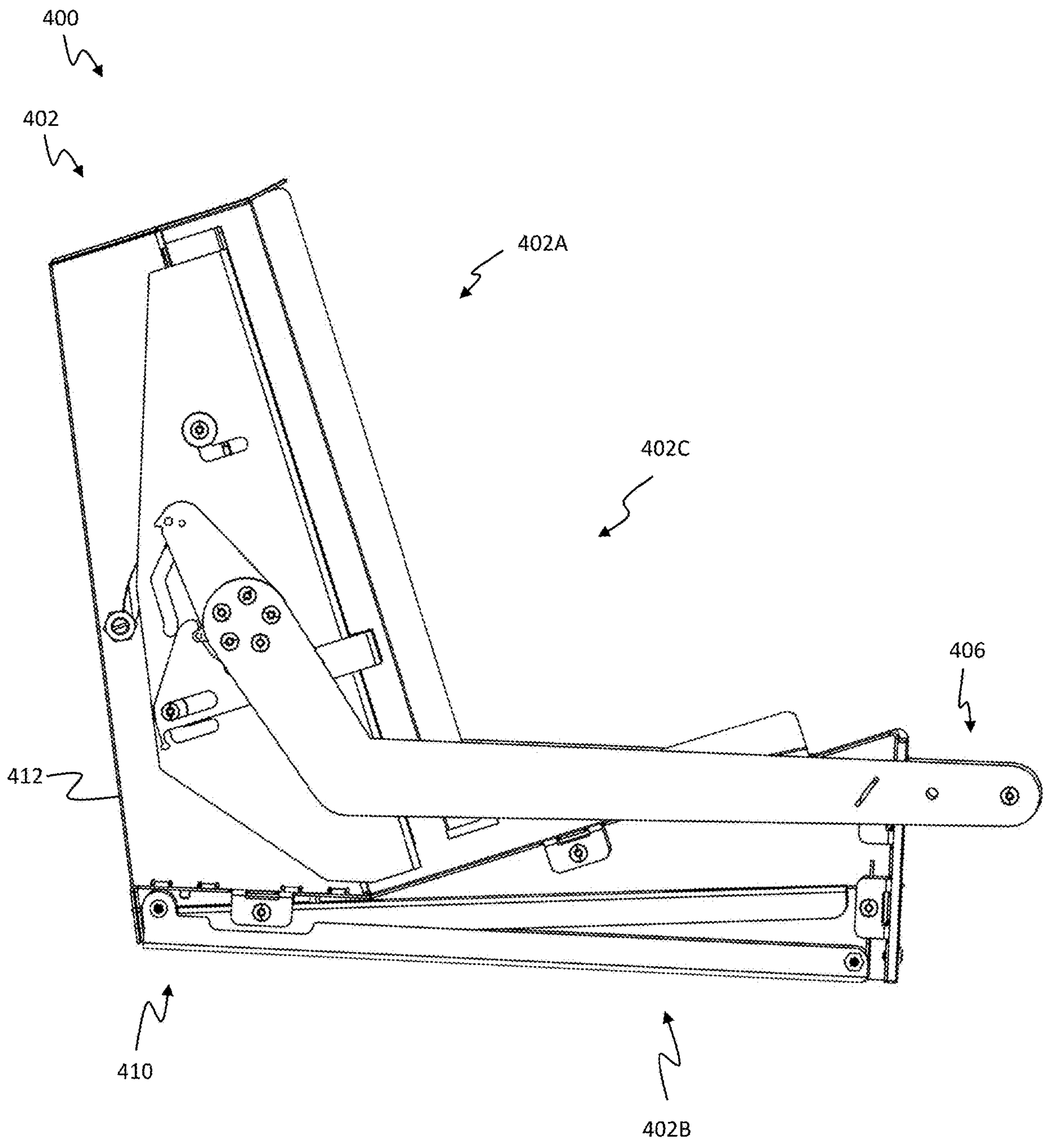
FIG. 5G is a second side partial view of the multi-bag connector (MBC) assembly of FIG. 5A in the open position.

In the illustrated embodiment, the actuator 406 includes a handle assembly 444. With reference to FIGS. 5A and 8A, the handle assembly 444 may include first and second arms 444A, 444B and a gripping portion 444B fastened between first ends of the first and second arms 444A, 444B. Opposite ends of the first and second arms 444A, 444B are rotatably coupled to the housing 402 (see below).

In the illustrated embodiment, the actuator 404 is moveable between an open position (shown in FIGS. 5A-5G) to closed position (shown in FIGS. 6A-6G) to an engaged position (shown in FIGS. 7A-7G). When in the open position, the first locking plate 432 is in a down position and the second locking plate 434 is in an upward position. In the open position, the variable diameter ($d_{variable}$) of the openings 436 is large enough to allow the fitments 210 to be received therethrough.

After a box 104 is inserted or placed in the recess 432C of the housing 402, the handle assembly 444 may be moved from the open position to the closed position resulting in the variable diameter ($d_{variable}$) of the openings 436 being reduced such that the fitments 210 are captured by the locking plate assembly 408. Thereafter, movement of the handle assembly 444 from the closed position to the engage position results in motion of the locking plate assembly 408 backwards (towards the valve assembly 500 and the back bracket 412). This action brings the fitments 210 into engagement with the valve assembly 500 (see above).

With specific reference to FIGS. 8A. 5B. 5G. 6B, 6G. 7B and 7G, the connector assembly may further include a guide assembly device 446. The guide assembly device 446 is coupled to the handle assembly 444 of the actuator 406 and is, at least partially, located between the housing 402 and the locking plate assembly 408. In the illustrated embodiment the guide assembly 446 includes a first guide assembly 446A coupled to the first arm 444A of the handle assembly 444 and a second guide assembly 446B coupled to the second arm 444B of the handle assembly 444.

An exploded view of a portion of the second guide assembly 446B is shown in FIGS. 8B-8F. The first guide assembly 446A is a mirror of the second guide assembly 446B and operates in a similar manner. As shown, the second guide assembly 446B is rotatably coupled to the second outer housing portion 416. In the illustrated embodiment, each of the first and second guide assemblies 446A. 446B includes a disk 446C, a bearing ring 446D, and a cam 446E. The disks 446C are located adjacent an outer surface of the first and second outer housing portions 414, 416, respectively. The bearing ring 446D has an inner portion with a reduced diameter 446D-1 that fits within an aperture 414A. 416A of the first and second outer housing portions 414, 416 (see FIGS. 11A-11D). The cam 446D is located at an outer surface of the bearing ring 446D. The disk 46C, bearing ring 446D, and cam 446E are fixedly coupled to the send end of the first and second arms 444A. 444B of the handle assembly 444, and thus are rotated about an axis 444D of the handle assembly 444.

The cam 446E is fixedly coupled to the respective first and second arms 444A. 444B at a first cam end. Each of the first and second guide assemblies 446A. 446B further include a primary guide pin 446F (see FIGS. 8D-8F).

Returning to FIGS. 8E. 8F and 12A-12G, each of the first and second locking plates 432, 434 includes a primary guide track 432E. 434E configured to receive the primary guide pin 446F connected to the second cam end of the cam 446E. Rotation of the handle assembly 444 moves the primary guide pins 446F connected to the second cam end of the cam 446E within the respective primary guide track 432E. 434E resulting in movement of the first and second locking plates 432, 434 relative to the housing 402.

In the illustrated embodiment, the first locking plate 432 includes at least one secondary guide track 432F and the second locking plate 434 includes at least one secondary guide track 434F. Each of the first and second guiding assemblies 446A 446B include associated secondary guide pins 448 coupled to the housing 402.

In the illustrated embodiment, each of the first and second locking plates 432, 434 include three secondary guide tracks 432F. 434F and the first and second guiding assemblies 446A. 446B include three guide pins 448 coupled to the back bracket 412 using fasteners at predetermined locations or fastener apertures 412D (see FIGS. 10A. 10B). The secondary guide tracks 432F. 434F are configured to receive respective secondary guide pins 448. The arrangement of the second guide tracks 432F. 434F and the guide pins 448 limit movement of the first locking plate 432 relative to the housing 402 along a first trajectory and to limit movement of the second locking plate 434 relative to the housing 432 along a second trajectory.

Figure 12A:
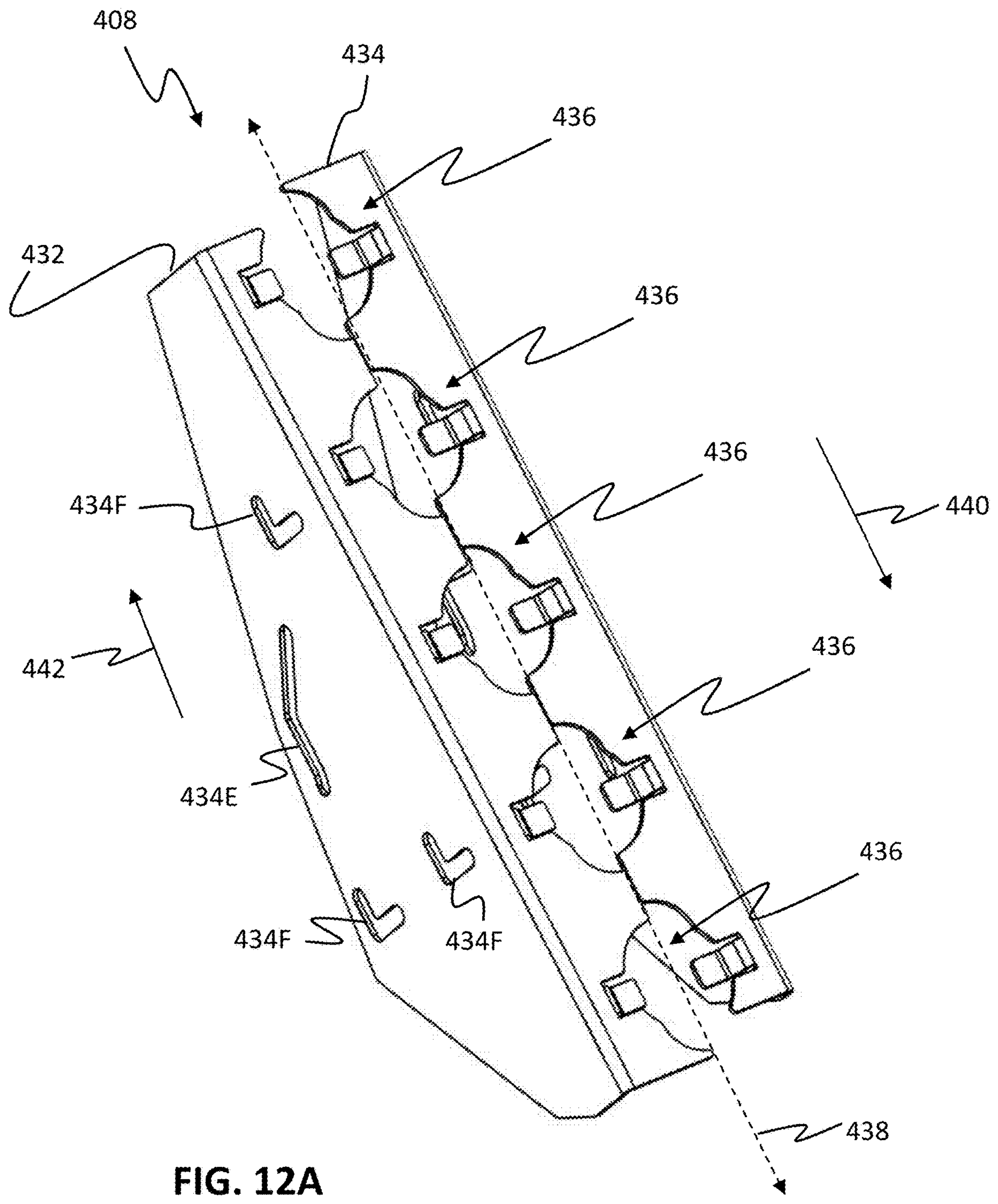
FIG. 12A is a perspective view of a locking plate assembly of the MBC assembly of FIG. 5A having first and second locking plates.
Figure 12B:
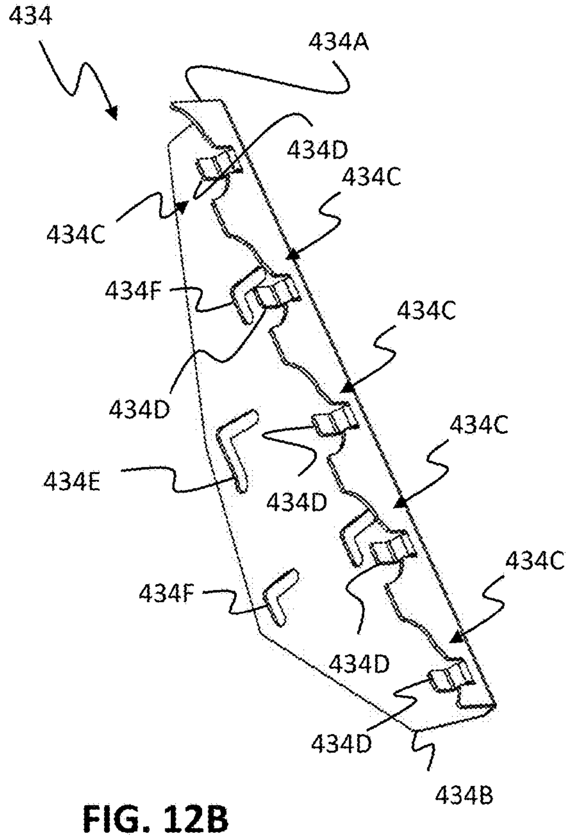
FIG. 12B is a first perspective view of the second locking plate of FIG. 12B.
Figure 12C:
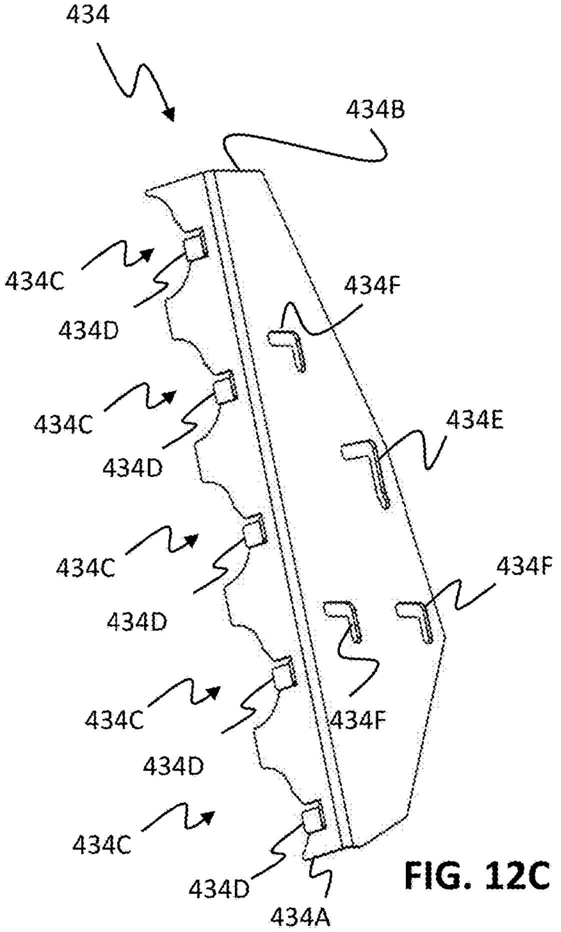
FIG. 12C is a second perspective view of the second locking plate of FIG. 12B.
Figure 12D:
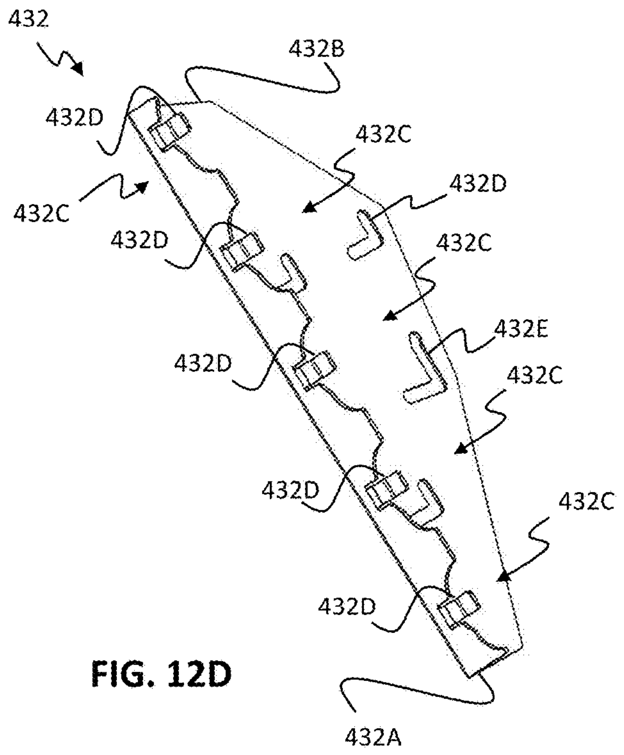
FIG. 12D is a first perspective view of the first locking plate of FIG. 12B.
Figure 12E:
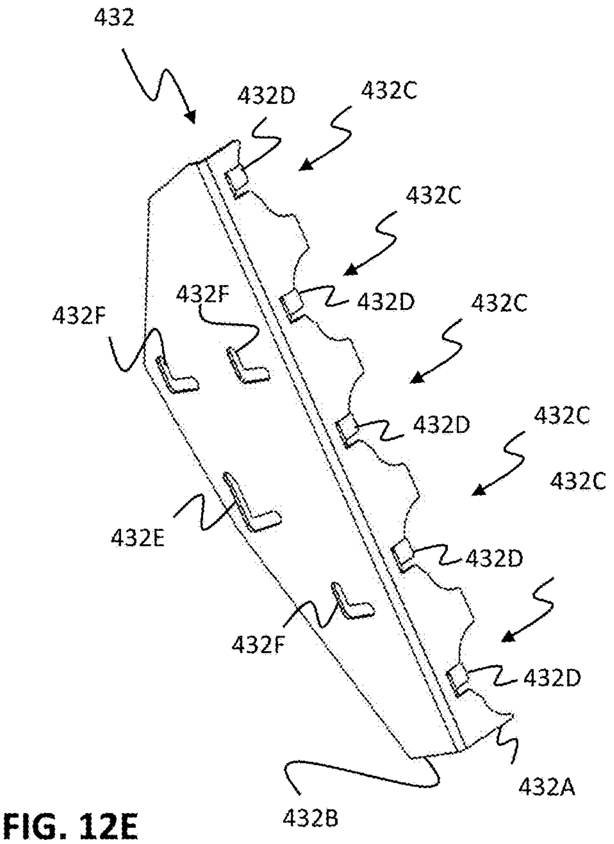
FIG. 12E is a second perspective view of the first locking plate of FIG. 12B.
Figure 12F:
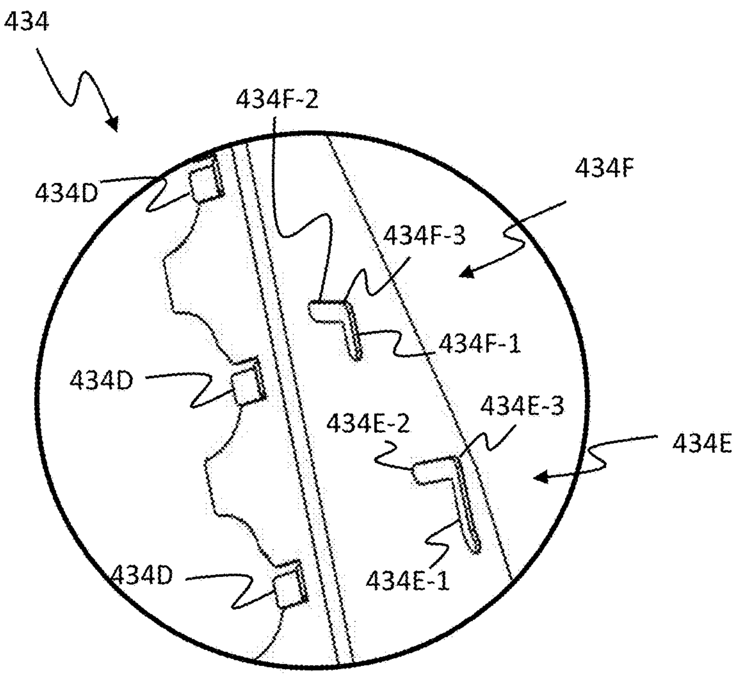
FIG. 12F is a partial enlarged view of the second locking plate of FIG. 12B.
Figure 12G:
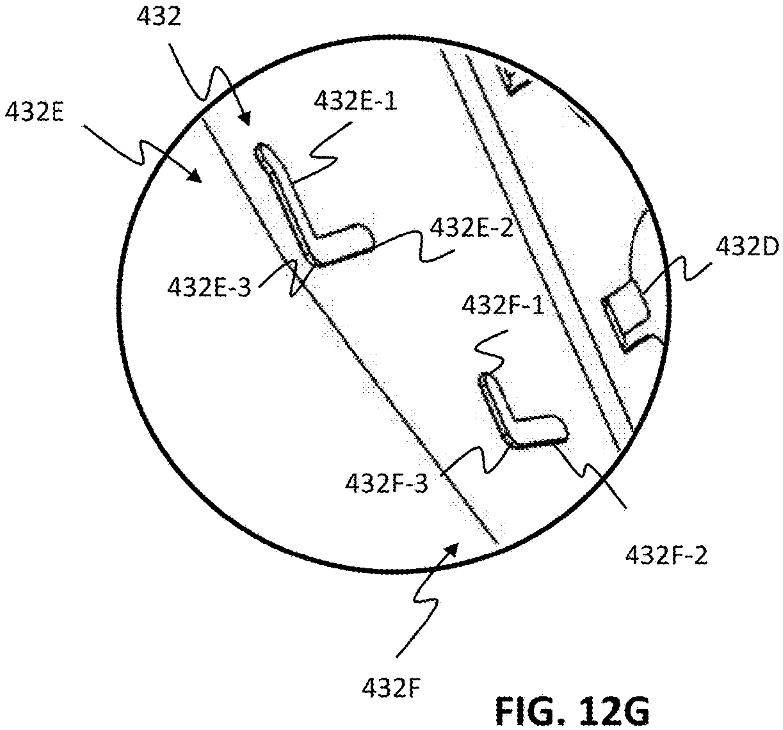
FIG. 12G is a partial enlarged view of the first locking plate of FIG. 12B.

With reference to FIG. 12F, an enlarged portion of the second locking plate 434 is shown illustrating the primary guide track 434E and one of the second guide tracks 434F. The primary guide track 434E of the second locking plate 434 includes a first leg 434E-1 and a second leg 434E-2 joined at an elbow 434E-3. As shown in FIG. 12G, the primary guide track 432E of the first locking plate 432 includes a first leg 432E-1 and a second leg 432E-2 joined at an elbow 432E-3.

When the handle assembly 444 is in the open position, the primary guide pins 446 are located at an end of the first leg 432E-1 (furthest from the elbow 432E-3) on the first locking plate 432 and at end of the first leg 434E-1 (furthest from the elbow 434E-3) on the second plate 434. A detent feature may be located at the end of the first legs 432E-1, 434E-1 to provide slight resistance to movement of the handle assembly 404 away from the open position. Also, when the handle assembly 444 is in the open position the secondary guide pins 448 which are mounted to the back bracket 412 are located at an end of a first leg 432F-1 (furthest from an elbow 43F-3) on the first locking plate 432 and at end of a first leg 434F-1 (furthest from the elbow 434F-3) on the second locking plate 434.

Rotation of the handle assembly 444 from the open position towards the closed position moves the primary guidance pins 446F along the respective first legs 434E-1, 432E-1 towards the respective elbows 434E-3, 432E-3 imparting motion to the first and second locking plates 434, 432. The secondary guidance pins 448 within the secondary guidance tracks 434F. 432F constrain movement of the first and second locking plates 432, 434. As the handles assembly 444 is moved towards the closed position, this arrangement provides movement of the first locking plate 432 upward (arrow 442) and movement of the second locking plate 434 downward (arrow 440) (resulting in decreasing the diameter).

Once the primary guidance pins 446F reach the elbows 434E-3, 432E-3, the handle assembly 444 is in the closed position (see above). Further movement of the handle assembly 444 towards the engaged position causes the primary guide pins 446F to travel from the elbows 434E-3, 432E-3 towards the opposite ends of the second legs 434E-2, 432E-2. Further movement of the handle assembly 444 from the closed position towards the engaged position results in motion of the first and second locking plates 432, 434 towards the back bracket 412 (arrow 441).

Figure 15A:
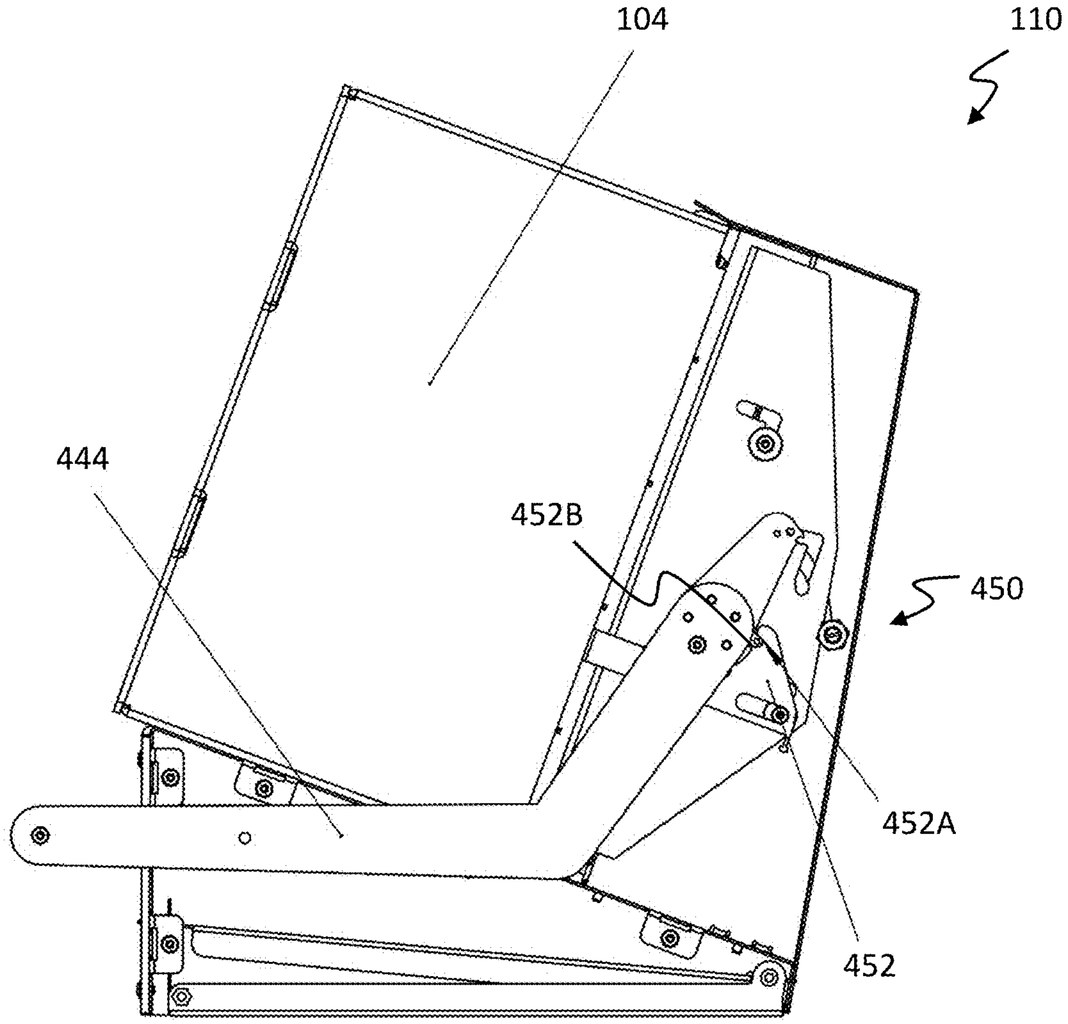
FIG. 15A is a side view of a multi-bag connector (MBC) assembly with a handle assembly in the open position and a locking mechanism in a locked configuration and a box or package partially inserted in the MBC assembly.
Figure 15B:
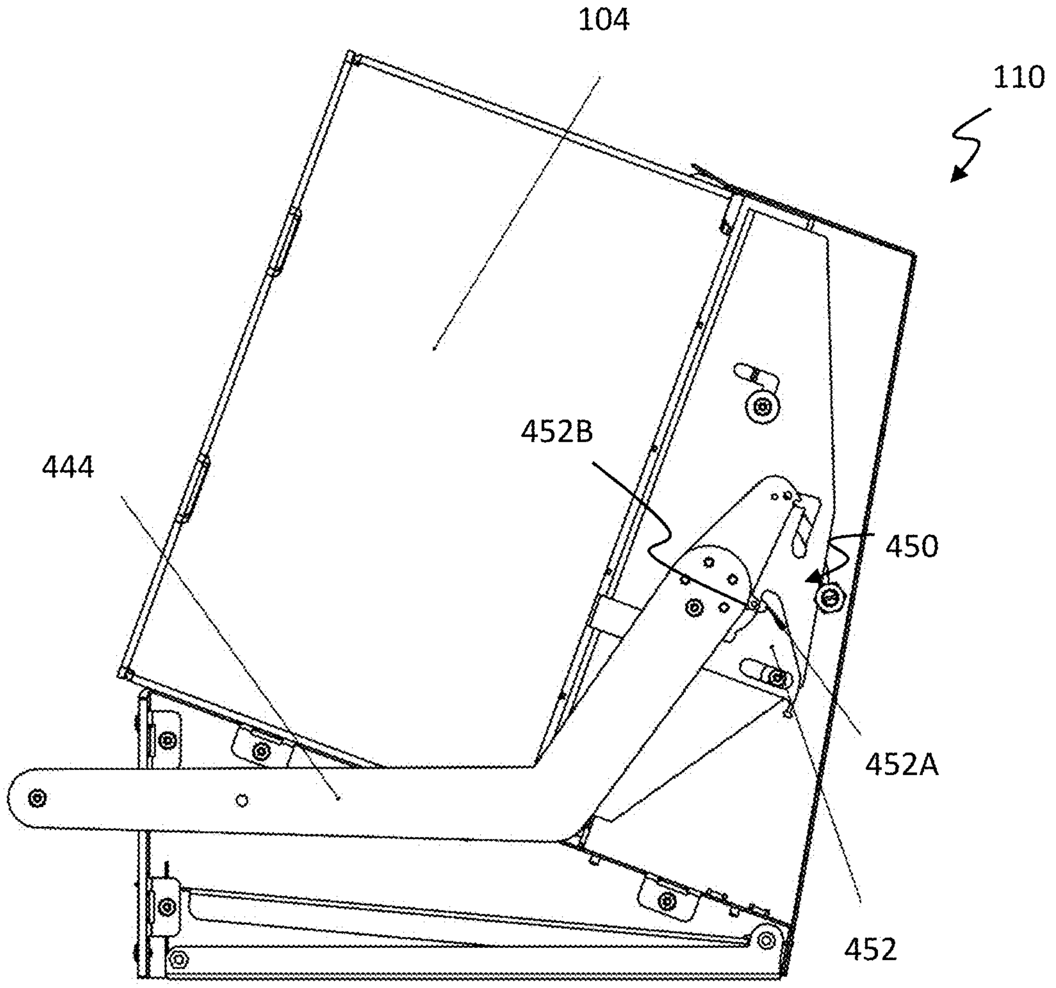
FIG. 15B is a side view of the locking mechanism of FIG. 15A with the handle assembly in the open position and the locking mechanism in an unlocked configuration and a box or package fully inserted in the MBC assembly.
Figure 15C:
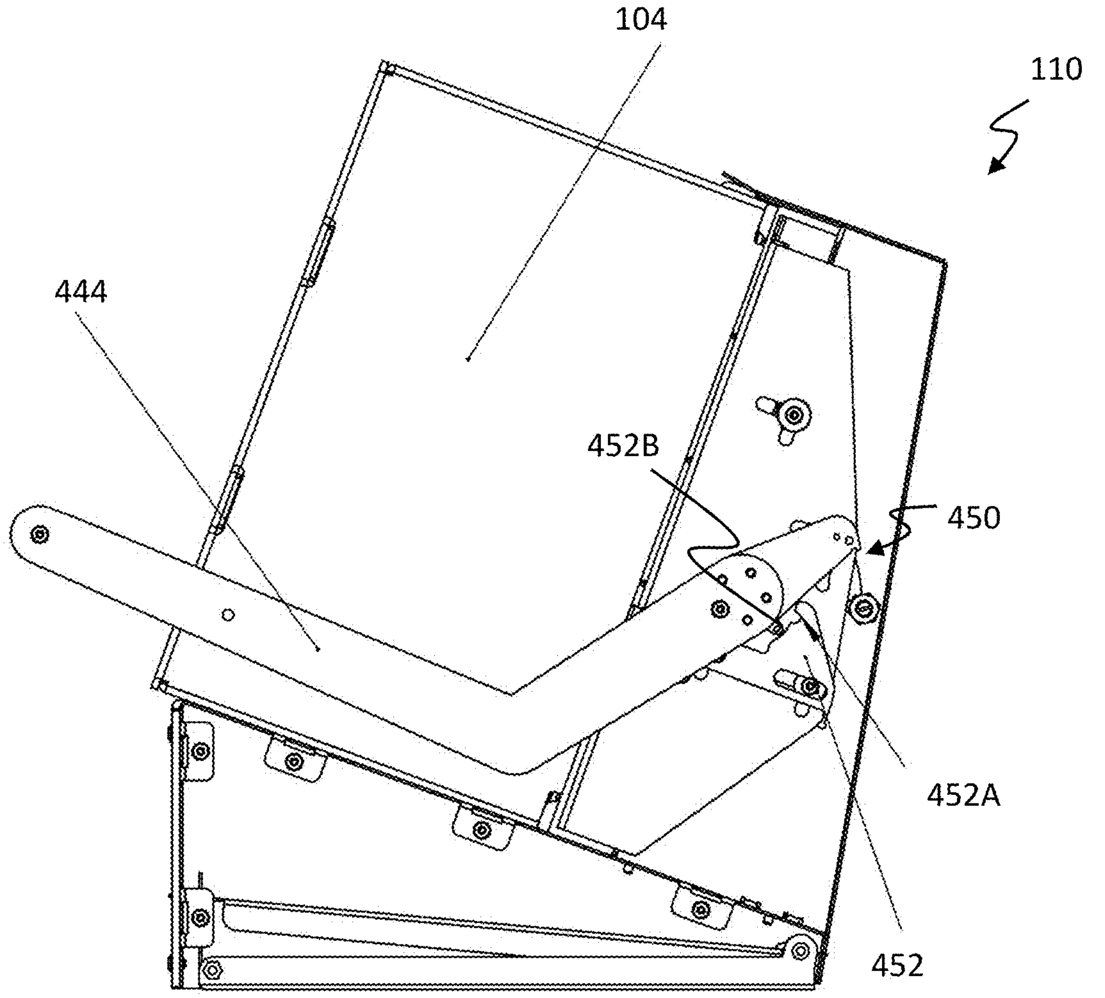
FIG. 15C is a side view of the locking mechanism of FIG. 15A with the handle assembly in the closed position and the locking mechanism in an unlocked configuration.

With reference to FIGS. 15A-15B, the MBC assembly 110 may further include a locking mechanism 450. The locking mechanism 450 is configured to controllably retain the handle position in the open position when there is a box or package 104 is not fully inserted within the recess 402C. The locking mechanism 450 may be moved between a locked and unlocked position. The locking mechanism 450 includes a pair of locking brackets 452 coupled to the first locking plate 432 and the second locking plate 434, respectively, which is moveably coupled to each guide assembly 446. The locking brackets 452 are spring biased forward (away from the back bracket 412. Only one of the locking brackets 452 is shown in FIGS. 15A-15C. Each locking bracket 452 includes a notch 452A that is configured to receive a pin 452B located on the respective guide assembly 446.

When the locking mechanism 450 is in the locked position, the pin 452B is retained within the notch 452A to prevent rotation of the handle assembly 444. When there is not a box or package 104 fully inserted, the locking brackets 452 are biased forward, thereby maintaining the locking mechanism 450 in the locked position.

When a box or package 104 in inserted in the recess 402C, the box or package 104 pushes back on the locking brackets 452 until it is fully inserted and the locking mechanism 450 has been moved from the locked position (shown in FIG. 15A) to an unlocked position (FIG. 15B). When in the unlocked position, the pin 452B is released from the notch 452A allowing the handle assembly 444 to rotate freely.

In a second embodiment, an electrically actuated locking mechanism may be used instead of the mechanical locking mechanism 450 illustrated above. In the second embodiment, a mechanical locking mechanism may be used in conjunction with the electrically actuated locking mechanism as a back-up in case of electrical failure.

Figure 16:
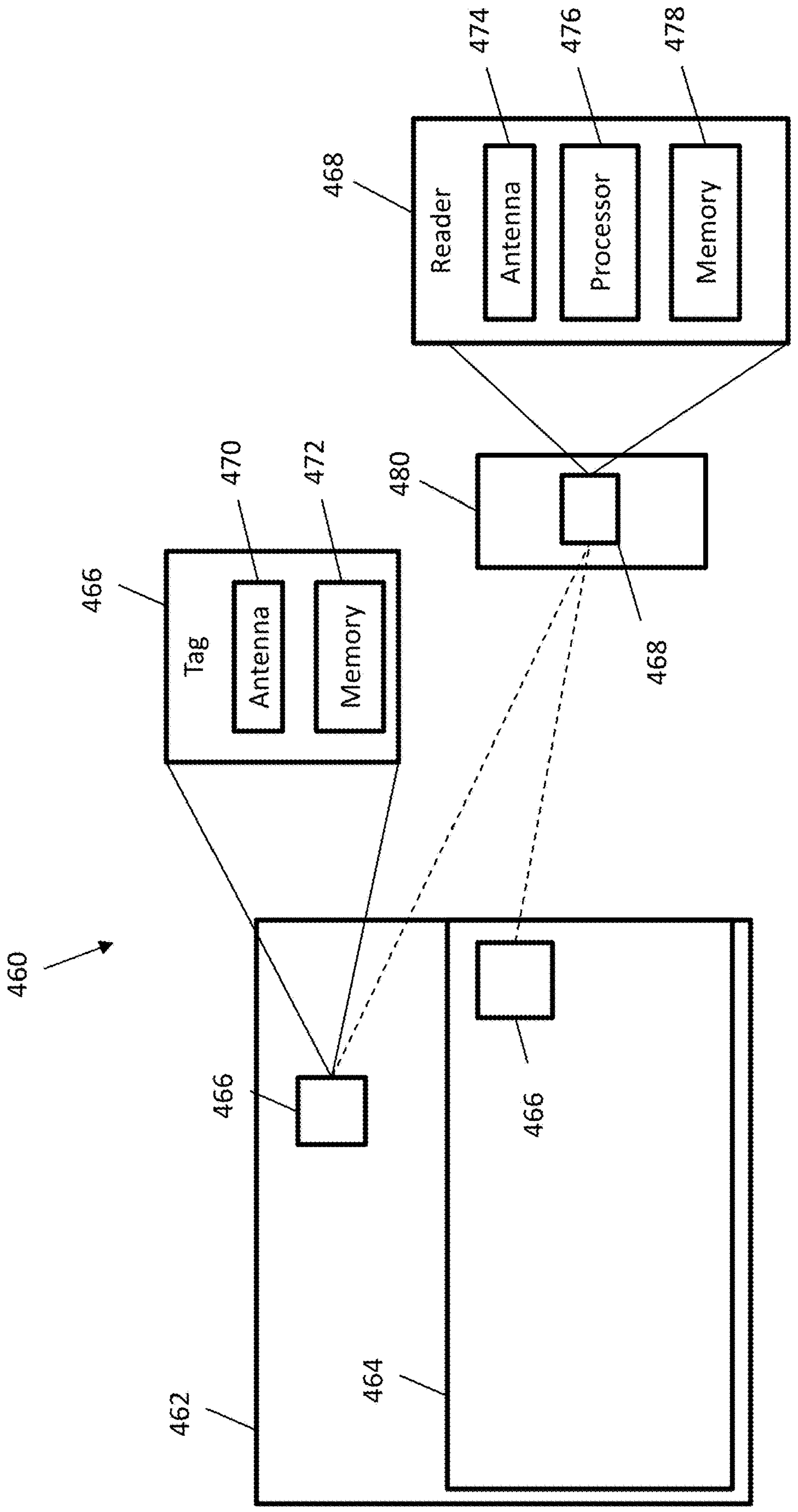
FIG. 16 is a block diagram of an exemplary system that may be used to monitor a multi-bag connector assembly in a beverage dispensing system, according to an embodiment of the present invention.

FIG. 16 is a block diagram of an exemplary system 460 that may be used to monitor an MBC and the functionality of the MBC within a beverage dispensing system. System 460 may be used with any of the beverage dispensing systems described herein.

In the example shown in FIG. 16, system 460 includes a box 462 that includes a plurality of bags 464 similar to the boxes and bags described in the foregoing embodiments. A programmable tag 466 is coupled to box 462 and/or to bags 464 in the exemplary embodiment. Tag 466 may be used to determine the contents of box 462 and/or bags 464 as described more fully herein. In addition, a tag reader 468 is provided that is able to read the contents of each tag 466.

Tag 466 may include an antenna 470 and a memory 472, such as a computer-readable memory. While tag 466 is described herein as a radio frequency identification (RFID) tag 466, it should be recognized that tag 466 may be any suitable tag that is readable by an associated reader. For example, tag 466 may be embodied as a quick response (QR) code, a bar code, a near field communication (NFC) tag, or any other suitable tag.

Antenna 470 is configured to receive signals from tag reader 468 and to provide data stored in memory 472 in response to the signals received from tag reader 468.

Memory 472 stores data related to box 462 or bag 464 to which tag 466 is attached. In an exemplary embodiment, memory 472 is programmed to include profile data for box 462 or bag 464, such as the type of alcoholic beverage (or other liquid) stored in each bag 464, the alcohol content, a brand name, an age, a production date, and/or a batch number of the alcoholic beverage stored in each bag 464. Additionally, or alternatively, the profile data may include a volume of bag 464 and/or a volume of the alcoholic beverage stored in bag 464, a unique identification number of the container (i.e., of bag 464 or box 462), a distributor of the alcoholic beverage, and/or any other suitable data. The profile data may be programmed or stored in memory 472 during a filling process of bag 464. Alternatively, the profile data may be included in pre-printed labels that may be attached to bags 464 or boxes 462 corresponding to the labels.

Still alternatively, a tag 466 may be affixed to, or included within, bags 464 and/or boxes 462 before shipping or transport. Upon receipt of boxes 462 and/or bags 464 by the end user, tag reader 468 scans each tag 466 and assigns the profile of the contents corresponding to each bag 464 or box 462 to the unique identification number of the respective bag 464 or box 462.

While tag reader 468 is described herein as an RFID reader, it should be recognized that tag reader 468 may be any suitable reader that is designed and capable of reading tags 466. In the exemplary embodiment, tag reader 468 includes an antenna 474, a processor 476, and a memory 478.

Antenna 474 is configured to transmit signals to tags 466 to request data from tags 466. In addition, antenna 474 is configured to receive the signals from tags 466 in response to the data request.

Processor 476 is configured to generate the signals to antenna 474 and to receive the signals from antenna 474. In addition, processor 476 may be configured to read data from memory 478 and to store data in memory 478.

Memory 478 is configured to store the data received from tags 466 when tags 466 are "read" (i.e., when signals requesting data from tags 466 are transmitted to tags 466 and when the data responsive to the requests are received).

In one embodiment, tag reader 468 is integrated into a connector assembly 480 to enable connector assembly 480 to read the profile data from tags 466 associated with bags 464 attached to connector assembly 480. For example, tag reader 468 may be integrated into each connector, into the holding plate, into the actuator plate, and/or into any suitable portion of connector assembly 480. Alternatively, tag reader 468 may be integrated into a stand-alone device, such as a handheld computing device or any other suitable device.

When bags 464 and boxes 462 have tags 466 included therein or affixed thereto, significant operational efficiencies can be gained. A tag reader mounted in close proximity to a container (e.g., a bag 464 or box 462) may read the unique identification number of the container.

In one embodiment, tag reader 468 may store data representative of the profiles (or profile data) associated with bags 464 that are intended to be used with the beverage dispensing system. If processor 476 determines that the profile data of a bag 464 connected to connector assembly 480, for example, does not match the expected profile data for the beverage dispensing system, processor 476 may notify a user that bag 464 does not include the expected profile data.

In another embodiment, tag reader 468, or another suitable device or system, may calculate the amount of liquids dispensed from each bag 464 or box 462. The amount of liquid dispensed can be compared to the amount of liquid expected to be inside bag 464 or box 462 based on the profile data of bag 464 or box 462. As a result, tag reader 468 or another suitable device may determine when bag 464 or box 462 is empty or has dispensed a predetermined amount or percentage of its contents. An example of such suitable device is the incorporation of weighting scale as part of the MBC or separately connected to the system 460. A user may then be notified which bag 464 or box 462 needs to be replaced.

When bag 464 or box 462 is replaced, tag reader 468 may read the profile data of the replacement bag 464 or box 462 and determine that the unique identification number is different than the replaced bag 464 or box 462, for example. Accordingly, tag reader 468 or another device or system may determine that a replacement bag or box has been provided, and may reset or begin to recalculate the amount of liquid dispensed by the new bag or box.

Tag reader 468 or another device may also verify that the same type of alcoholic beverage is included in the replacement bag or box as compared to the replaced bag or box. If the type of beverage is different, the beverage dispensing system may be prevented from dispensing the contents of the replacement bag or box unless a user explicitly approves the dispensing, for example.

Tag reader 468 or another device or component of the beverage dispensing system can store the profile data of each tag 466 of each bag 464 or box 462 and may, for example, store the amount of liquid dispensed by each container. In case a previously used container is put back in the beverage dispensing system, tag reader 468 is able to determine whether that container is empty or not. If the container is not empty, the system will continue to keep track of the amount of liquid dispensed by that specific container until the system determines that the container is empty. If the container is determined to be empty, tag reader 468 or another device or component of beverage dispensing system may notify a user and the container will need to be replaced before normal operations can continue. In one embodiment, an acceptable empty tolerance level (or waste level) can be pre-set by the user of tag reader 468 or the beverage dispensing system, thereby allowing containers to be exchanged before they are completely empty.

Tag reader 468 or another device or component of the beverage dispensing system can alert the user about the status of the tagged containers through a light or audible signal, for example, or in any other suitable manner. The status that the user may be notified of may include, for example, that a container needs to be replaced, a container is close to being replaced (falls within the waste tolerance zone), or that a container is still able to dispense its contents. The status can also indicate that the contents of the container have not been assigned to a particular box 462 or to a particular location within the beverage dispensing system, for example. This may help prevent cross-contamination of materials by the beverage dispensing system. The status can prevent the container MBP from being connected to the beverage dispensing system by preventing the connector assembly MBC from closing, for example.

INDUSTRIAL APPLICABILITY

A packaging and connection solution for distilled spirits that connect multiple single 1.8 1 bags together in a single outer packaging. The outer container can have one or multiple compartments each having an inner container with a capacity of 1.8 L of the same distilled spirit.

There are a variety of ways to achieve this expansion. Bags are placed in individual inner compartments that are housed in a single outer container. The bags can be stacked on top of each other (horizontally), next to each other (vertically). Bags can be packaged in multiple configurations—single in-line compartments to create configurations like (1.times.2, 1.times.3 . . . ) or multiple compartments to create configurations, e.g., 2.times.3, 3.times.3, etc. . . . After filling the individual bags, the bags may be placed inside the available inner compartments of the single outer container. All fitments of the bags are pre-aligned before the outer container is closed. Pre-alignment is achieved through an alignment form that can be part of the container and/or a separate part or alignment platc.

The container can be made from carton, sturdy plastic or other such material or a combination of carton and a sturdy part. If the container is sturdy or partially the sturdy it may be referred to as a sturdy container. The rigidity will be applicable to align the fitments and allow the container to be placed within an MBC assembly 110 without collapsing and making sure that the fitments don't move.

With reference to the FIGS., and in operation, in the illustrated embodiment, the MBC assembly 110 is moveable between open, closed and engaged positions. The MBC assembly 110 includes a handle assembly (or lever) 444, a valve assembly 500, and a mechanical level indicator or scale 420 showing the fill level of the contents of the inserted Multi Bag Packaging (MBP) product (package or box or carton 104). The MBC assembly 110 has three states or positions determined by the movement of the handle assembly 444: the open state, the closed state, and the connected or engaged state. When the handle assembly 444 is down it is in the open state, this indicates that the MBC assembly 110 is ready for a MBP 104 to be inserted or removed. When the handle assembly 444 is moved up into the closed state, the MBC assembly 110 locks the MBP 104 in place by grabbing the flange 210A of the fitments 210 with the locking plates 432, 434. When the handle assembly 444 is moved all the way up the MBC assembly moves the MBP 104 towards the valve assembly 500 plugging the fitments 210 into the valve assembly 500 creating the connected or engaged state. When an MBP 104 has been inserted into the MBC assembly 110, the handle assembly 444 may be also locked using a mechanical or electrically/electronically controlled lock (see, e.g., locking mechanism 450 above) to prevent the MBP 104 from being removed by unauthorized personnel preventing unauthorized access to, as well as tampering with, the MBP's content. The MBC assembly 110 may also be locked in its open position, handle down, to prevent the wrong liquid to be connected to the line or to ensure that nobody can move the handle while performing maintenance or removing the MBC assembly 110 for inspection, cleaning, or re-positioning.

The MPC assembly 110 includes a back bracket 412 (see FIGS. 10A-10B) with a set of holes or orifices 412D in which the valve assembly 500 is mounted. The back bracket also has two identical guide tracks, one on each side, that function to guide the movement of the handle assembly 444 from the open to/from the connected state.

A set of locking plates 432, 434 are positioned on the left and right side of the back bracket 412 and supported via three fixed guides (secondary guide pins) 448 per side that are mounted on the back bracket 412. The movement of the locking plates 432, 434 is determined by a guide assembly device 446 that is controlled by the handle assembly 444. The guide assembly device 446 includes a primary guide pin 446F, a cam 446E, a bearing ring 446D and a disk 446C. The bearing ring 446D and the disk 446C create a hinge for the handle assembly 444. The arms 444A. 444B of the handle assembly 444 are secured on the outside to the disk 446C. Movement of the handle assembly 444 is guided via the primary and second guide tracks 432E, 432F, 434E, 434F on the first and second locking plates 432, 434 (see above) using the primary and secondary guide pins 446F, 448. The primary guide pins 448 also move the locking plates 432, 434. The movement of the first and second locking plates 432, 434 is choreographed in such a way that in the open position the first or left locking plate 432 is lower than the second or right locking plate 434. Each locking plate 432, 434 has two different carveouts or recess 434C, 434C per fitment 210 (FIG. 2). These carveouts or recesses result in a larger diameter (open position) or smaller diameter (closed and engaged or connected positions)

When the first locking plate 432 is down and the second locking plate 434 is up, the variable diameter ($d_{variable}$) is large enough to allow the flange 210A of the fitments 210 to be inserted. As the handle assembly 444 moves towards the closed position, the first locking plate 432 moves upwards, whilst the second locking plate 434 moves down.

This movement is explained by looking at the primary guide tracks 432E. 434E. The primary guide track 434E on the second locking plate 434 curves slightly upwards when the handle assembly 444 moves from the open position to the closed position which moves the second locking plate 434 downwards. The primary guide track 432E on the second locking plate 432 is sloped downwards which moves the first locking plate 432 upwards during the same lever movement. The secondary guide tracks 432F move downwards along the vertical track section and supports the upwards movement created by the primary guide track 432E. The second guide tracks 434F move upwards along the vertical track section and supports the upwards movement of the first locking plate 432. As the handle assembly 444 moves from the closed position to the connected or engaged positions, both locking plates 432, 434 now move backwards guided by the primary and second guide tracks 432E, 432F, 434E, 434F and the guide pins track 446F, 448.

Movement of the handle assembly 444 into the Connected position, moves both locking plates 432, 434 backwards pulling the MBP 104 towards the valve assembly 500 thereby connecting the fitments 210 to their respective valves in the valve assembly 500. As shown in FIGS. 9A-9F, the valve assembly 500 includes a set of valves, a channel 504 that connects all valves and a single outlet 506. The valve assembly 500 connects all of the fitments 210 together when the handle assembly 444 is in the connected position. When the lever is in the connected position, the fitments 210 are now connected to the valve assembly 500.

As discussed above, the MBC assembly 110 may include a mechanical scale. Alternatively, the MBC assembly 110 may also be fitted with a visible electric or electronic MBC level indicator, using an RFD. NFC. QR code scanner that reads the liquid product within the MBP 104 as it is inserted into the MBC assembly 110. The indicator would not only show liquid level status but also the MBP product alignment to the MBC. In one embodiment, two or more MBCs are aligned and connected in parallel to prevent running out of the liquid product and to allow the replacement of one empty MBP while the other one is in use. Therefore, the ability to ensure that both MBPs have the same type of liquid product is important. This capability also prevents potential issues due to mixing of liquid products which will require distribution hose cleaning, and pump viscosity re-calibration. Level indication will be used for supply management and all the information provided by these sensors can be broadcast over any network, be it wired or wireless to a monitoring and alerting system. The Smart-MBC prevents human errors with product replacement as MBCs are refilled. In one embodiment, an MBC is outfitted with a pump that is remotely controlled thereby a creating stand-alone assembly to feed liquid to any system without the need for additional supporting components.

An additional electronic scale can be attached that allows (i) to precisely determine the fill status of the MBP and (ii) a connection to an ERP system to allow to plan replacement cycles of the MBP and automated ordering of materials that are forecasted to run out of stock.

A cleaning MBP (C-MBP) is available that can be connected to the MBC in the same way as any other MBP. This C-MBP consists of a tank for cleaning material, a fresh water, a grey water tank and a product reservoir. It also consists of an electrical pump, a controller and sensors and a power pack. When inserted into the MBC and switched on, it starts the automatic cleaning process of the MBC's valve assembly. The pump will suck out remaining product into the product reservoir. The C-MBC will then, for a defined period, run the cleaning material through the MBC which is collected in the grey water tank. After this process the C-MBC will rinse the MBC with fresh water which is collected by the grey water tank as well. It will then remove the water from the MBC and refill it with the product from the product reservoir to prevent air in the MBC's valve assembly. To avoid "product contamination" the product reservoir will be flushed with fresh water allowing the C-MBP to be used with another MBP. Internal sensors will measure the required time for the cleaning/rinsing.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A connector assembly for controllably coupling a container containing a liquid, the container having a fitment, the fitment having a channel and configured to releasably connect the container to the connector assembly, comprising:

a housing having a recess for receiving the container;

a valve assembly including a fitment receptacle, the valve assembly having a liquid flow channel and an outlet, wherein the liquid flow channel couples the fitment receptacle to the outlet; and, an actuator coupled to the housing, the actuator being movable between an open position, a closed position and an engaged position; and, a locking plate assembly coupled to the actuator and forming an opening corresponding to the fitment, wherein the opening has a first diameter when the actuator is in the open position, the first diameter of the opening configured to allow entry of the fitment into the opening, wherein movement of the actuator from the open position to the closed position closes the opening to a second diameter, the second diameter being smaller than the first diameter, the second diameter being smaller than a diameter of the fitment.

2. The connector assembly, as set forth in claim 1, wherein the locking plate assembly includes a first locking plate and a second locking plate, the first and second locking plates being coupled to the actuator and forming the opening.

3. The connector assembly, as set forth in claim 2, the locking plate assembly being configured to move towards the housing in response to the actuator being moved from the locked position to the engaged position.

4. The connector assembly, as set forth in claim 2, wherein the first locking plate and the second locking plate include a plurality of opposing recesses, each of the openings of the locking plate composed of a pair of opposing recesses.

5. The connector assembly, as set forth in claim 4, wherein one of the first and second locking plates moves in a first direction along an axis of the housing in response to the actuator being moved from the open position to the closed position and the one of the first and second locking plates moves in a second direction opposite the first direction in response the actuator being moved from the closed position to the open position.

6. The connector assembly, as set forth in claim 5, further including a guide assembly device coupled to the actuator and is located, at least partially, between the housing and the locking plate assembly.

7. The connector assembly, as set forth in claim 6, wherein the guide assembly device includes a first guide assembly and a second guide assembly, the actuator including a handle assembly having a first arm connected to the first guide assembly and a second arm connected to the second guide assembly.

8. The connector assembly, as set forth in claim 7, wherein each of the first and second guiding assemblies includes a cam fixedly coupled to the respective first and second arms at a first cam end and a primary guide pin connected to a second cam end, wherein each of the first and second locking plates includes a primary guide track configured to receive the guide pin connected to the second cam end, wherein rotation of the handle assembly moves the primary guide pin connected to the second cam end within the primary guide track resulting in movement of the first and second locking plates relative to the housing.

9. The connector assembly, as set forth in claim 8, wherein the first locking plate include a first secondary guide track and the second locking plate includes a second secondary guide track, the first and second guiding assemblies include a first and second secondary guide pins coupled to the housing and received within the first and second secondary guide tracks, respectively, wherein the first secondary guide pin and the first secondary guide track are configured to limit movement of the first locking plate relative to the housing along a first trajectory and the second secondary guide pin and the second secondary guide track are configured to limit movement of the second locking plate relative to the housing along a second trajectory.

10. A connector assembly for controllably coupling a plurality of containers containing a liquid, each container having a fitment, each fitment having a channel and configured to releasably connect a respective container to the connector assembly, the containers being housed in a box with the fitments being arranged in predetermined relative locations, comprising:

a housing having a lower portion and an upper portion, the upper portion extending from the lower portion, the lower portion and the upper portion forming a recess for receiving the box;

a valve assembly including a plurality of fitment receptacles, each fitment receptacle being associated with a respective fitment, the plurality of fitment receptacles being arranged in a pattern coinciding with the predetermined relative locations of the fitments, the valve assembly having a liquid flow channel and an outlet, wherein the liquid flow channel couples the fitment receptacles to the outlet; and, an actuator coupled to the housing, the actuator being movable between an open position, a closed position and an engaged position; and, a locking plate assembly having a first locking plate and a second locking plate, the first and second locking plates being coupled to the actuator and forming an opening corresponding to each fitment, wherein the opening has a first diameter when the actuator is in the open position, the first diameter of the opening configured to allow entry of the fitments into the opening, wherein movement of the actuator from the open position to the closed position closes the opening to a second diameter, the second diameter being smaller than the first diameter, the second diameter being smaller than a diameter of the fitments.

11. The connector assembly, as set forth in claim 10, further including a guide plate configured to bear the weight associated with the containers, the guide plate being inclined downward towards a back end of the housing.

12. The connector assembly, as set forth in claim 10, the locking plate assembly being configured to move towards the housing in response to the actuator being moved from the locked position to the engaged position.

13. The connector assembly, as set forth in claim 12, wherein the first locking plate and the second locking plate include a plurality of opposing recesses, each of the openings of the locking plate composed of a pair of opposing recesses.

14. The connector assembly, as set forth in claim 13, wherein one of the first and second locking plates moves in a first direction along an axis of the housing in response to the actuator being moved from the open position to the closed position and the one of the first and second locking plates moves in a second direction opposite the first direction in response the actuator being moved from the closed position to the open position.

15. The connector assembly, as set forth in claim 13, wherein the first locking plate moves in a first direction along an axis of the housing in response to the actuator being moved from the open position to the closed position, the second locking plate moves in a second direction along the axis of the housing in response to the actuator being from the open position to the second closed position, wherein the second direction along the axis of the housing is opposite the first direction along the axis of the housing.

16. The connector assembly, as set forth in claim 15, further including a guide assembly device coupled to the actuator and is located, at least partially, between the housing and the locking plate assembly.

17. The connector assembly, as set forth in claim 16, wherein the guide assembly device includes a first guide assembly and a second guide assembly, the actuator including a handle assembly having a first arm connected to the first guide assembly and a second arm connected to the second guide assembly.

18. The connector assembly, as set forth in claim 17, wherein each of the first and second guiding assemblies includes a cam fixedly coupled to the respective first and second arms at a first cam end and a primary guide pin connected to a second cam end, wherein each of the first and second locking plates includes a primary guide track configured to receive the guide pin connected to the second cam end, wherein rotation of the handle assembly moves the primary guide pin connected to the second cam end within the primary guide track resulting in movement of the first and second locking plates relative to the housing.

19. The connector assembly, as set forth in claim 18, wherein the first locking plate include a first secondary guide track and the second locking plate includes a second secondary guide track, the first and second guiding assemblies include a first and second secondary guide pins coupled to the housing and received within the first and second secondary guide tracks, respectively, wherein the first secondary guide pin and the first secondary guide track are configured to limit movement of the first locking plate relative to the housing along a first trajectory and the second secondary guide pin and the second secondary guide track are configured to limit movement of the second locking plate relative to the housing along a second trajectory.

20. The connector assembly, as set forth in claim 10, further including a scale coupled to the back frame configured to detect a weight associated with the containers within the box and to responsively provide a visual indication of the detected weight.

21. The connector assembly, as set forth in claim 20, wherein the scale includes:

a guide plate configured to bear the weight associated with the containers;

a bottom plate;

a scale arm rotatably coupled to the bottom plate at a first hinge and coupled to the guide plate at a first end thereof; and, a spring coupled between the bottom plate and a second end of the guide plate and configured to bias the guide plate in an upward direction; and, a visual indicator coupled to the second end of the scale arm.

22. The connector assembly, as set forth in claim 10, including a tag reader connected to the connector assembly, the tag reader for receiving information related to the box and/or containers within the box from a tag associated therewith and to communicate with a controller.

23. The connector assembly, as set forth 22, wherein the tag reader communicates includes one or more of the following a QR codes reader, a near field communication readers, an RFID reader, a camera and any other device capable of identifying information from the tag.

24. The connector assembly, as set forth in claim 23, the tag reader and controller are configured to establish one or more of the following: presence of the box within the connector assembly, position of the actuator, an employee badge number, packaging profile data associated with the box and/or containers, number and volume of individual containers within the box, packaging location, a Unique ID associated with the box and/or containers.

25. A connector assembly for controllably coupling a plurality of containers containing a liquid, each container having a fitment, each fitment having a channel and configured to releasably connect a respective container to the connector assembly, the containers being housed in a box with the fitments being arranged in predetermined relative locations, comprising:

- a housing having a lower portion and an upper portion, the upper portion extending from the lower portion, the lower portion and the upper portion forming a recess for receiving the box;
- a guide plate configured to bear the weight associated with the containers, the guide plate being inclined downward towards a back end of the housing;
- a valve assembly including a plurality of fitment receptacles, each fitment receptacle being associated with a respective fitment, the plurality of fitment receptacles being arranged in a pattern coinciding with the predetermined relative locations of the fitments, the valve assembly having a liquid flow channel and an outlet, wherein the liquid flow channel couples the fitment receptacles to the outlet; and,
- an actuator coupled to the housing, the actuator being movable between an open position, a closed position and an engaged position;
- a locking plate assembly having a first locking plate and a second locking plate, the first and second locking plates being coupled to the actuator and forming an opening corresponding to each fitment, wherein the opening has a first diameter when the actuator is in the open position, the first diameter of the opening configured to allow entry of the fitments into the opening, wherein movement of the actuator from the open position to the closed position closes the opening to a second diameter, the second diameter being smaller than the first diameter, the second diameter being smaller than a diameter of the fitments, the locking plate assembly being configured to move towards the housing in response to the actuator being moved from the locked position to the engaged position; and,
- a scale coupled to the back frame configured to detect a weight associated with the containers within the box and to responsively provide a visual indication of the detected weight.

26. The connector assembly, as set forth in claim 25, wherein the first locking plate and the second locking plate include a plurality of opposing recesses, each of the openings of the locking plate composed of a pair of opposing recesses.

27. The connector assembly, as set forth in claim 26, wherein one of the first and second locking plates moves in a first direction along an axis of the housing in response to the actuator being moved from the open position to the closed position and the one of the first and second locking plates moves in a second direction opposite the first direction in response the actuator being moved from the closed position to the open position.

28. The connector assembly, as set forth in claim 26, wherein the first locking plate moves in a first direction along an axis of the housing in response to the actuator being moved from the open position to the closed position, the second locking plate moves in a second direction along the axis of the housing in response to the actuator being from the open position to the second closed position, wherein the second direction along the axis of the housing is opposite the first direction along the axis of the housing.

29. The connector assembly, as set forth in claim 28, further including a guide assembly device coupled to the actuator and is located, at least partially between the housing and the locking plate assembly.

30. The connector assembly, as set forth in claim 29, wherein the guide assembly device includes a first guide assembly and a second guide assembly, the actuator including a handle assembly having a first arm connected to the first guide assembly and a second arm connected to the second guide assembly.

31. The connector assembly, as set forth in claim 30, wherein each of the first and second guiding assemblies includes a cam fixedly coupled to the respective first and second arms at a first cam end and a primary guide pin connected to a second cam end, wherein each of the first and second locking plates includes a primary guide track configured to receive the guide pin connected to the second cam end, wherein rotation of the handle assembly moves the primary guide pin connected to the second cam end within the primary guide track resulting in movement of the first and second locking plates relative to the housing.

32. The connector assembly, as set forth in claim 31, wherein the first locking plate include a first secondary guide track and the second locking plate includes a second secondary guide track, the first and second guiding assemblies include a first and second secondary guide pins coupled to the housing and received within the first and second secondary guide tracks, respectively, wherein the first secondary guide pin and the first secondary guide track are configured to limit movement of the first locking plate relative to the housing along a first trajectory and the second secondary guide pin and the second secondary guide track are configured to limit movement of the second locking plate relative to the housing along a second trajectory.

33. The connector assembly, as set forth in claim 25, wherein the scale includes:

- a guide plate configured to bear the weight associated with the containers;
- a bottom plate;
- a scale arm rotatably coupled to the bottom plate at a first hinge and coupled to the guide plate at a first end thereof; and,
- a spring coupled between the bottom plate and a second end of the guide plate and configured to bias the guide plate in an upward direction; and,
- a visual indicator coupled to the second end of the scale arm.

34. The connector assembly, as set forth in claim 25, including a tag reader connected to the connector assembly, the tag reader for receiving information related to the box and/or containers within the box from a tag associated therewith and to communicate with a controller.

35. The connector assembly, as set forth 34, wherein the tag reader communicates includes one or more of the following a QR codes reader, a near field communication readers, an RFID reader, a camera and any other device capable of identifying information from the tag.

36. The connector assembly, as set forth in claim 35, the tag reader and controller are configured to establish one or more of the following: presence of the box within the connector assembly, position of the actuator, an employee badge number, packaging profile data associated with the box and/or containers, number and volume of individual containers within the box, packaging location, a Unique ID associated with the box and/or containers.

* * * * *